(12) United States Patent  
Wang et al.

(10) Patent No.: US 12,504,363 B2  
(45) Date of Patent: Dec. 23, 2025

(54) THREE-DIMENSIONAL CONTOURED SCANNING PHOTOACOUSTIC IMAGING AND VIRTUAL STAINING

(71) Applicant: California Institute of Technology, Pasadena, CA (US)

(72) Inventors: Lihong Wang, Arcadia, CA (US); Rui Cao, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 414 days.

(21) Appl. No.: 17/820,496

(22) Filed: Aug. 17, 2022

(65) Prior Publication Data

US 2023/0055979 A1 Feb. 23, 2023

Related U.S. Application Data

(60) Provisional application No. 63/234,080, filed on Aug. 17, 2021.

(51) Int. Cl.
| | | |
|---|---|---|
| G01N 21/17 | (2006.01) | |
| G06V 10/82 | (2022.01) | |
| G06V 20/69 | (2022.01) | |
| H04N 13/15 | (2018.01) | |
| H04N 13/254 | (2018.01) | |
| H04N 13/271 | (2018.01) | |

(52) U.S. Cl.
CPC ......... *G01N 21/1702* (2013.01); *G06V 10/82* (2022.01); *G06V 20/69* (2022.01); *H04N 13/15* (2018.05); *H04N 13/254* (2018.05); *H04N 13/271* (2018.05); *G01N 2021/1706* (2013.01); *G01N 2021/1772* (2013.01); *G01N 2201/067* (2013.01); *G01N 2201/106* (2013.01); *G01N 2201/127* (2013.01)

(58) Field of Classification Search
None
See application file for complete search history.

(56) References Cited

U.S. PATENT DOCUMENTS

| | | | |
|---|---|---|---|
| 4,029,756 | A | 6/1977 | Gaafar |
| 4,127,318 | A | 11/1978 | Determann et al. |
| 4,255,971 | A | 3/1981 | Rosencwaig |
| 4,267,732 | A | 5/1981 | Quate |
| 4,284,324 | A | 8/1981 | Huignard et al. |
| 4,375,818 | A | 3/1983 | Suwaki et al. |
| 4,385,634 | A | 5/1983 | Bowen |

(Continued)

FOREIGN PATENT DOCUMENTS

| | | |
|---|---|---|
| CA | 3210010 A1 | 9/2022 |
| CN | 1883379 A | 12/2006 |

(Continued)

OTHER PUBLICATIONS

An, N., et al., Risk Factors for Brain Metastases in Patients With Non-small-cell Lung Cancer, Cancer medicine, 2018, vol. 7(12), pp. 6357-6364.

(Continued)

*Primary Examiner* — Anand P Bhatnagar
(74) *Attorney, Agent, or Firm* — Sheila Martinez-Lemke; Kwan & Olynick LLP

(57) ABSTRACT

Methods, devices, apparatus, and systems for three-dimensional (3D) contoured scanning photoacoustic imaging and/or deep learning virtual staining.

15 Claims, 21 Drawing Sheets
(9 of 21 Drawing Sheet(s) Filed in Color)

(56) References Cited

U.S. PATENT DOCUMENTS

| | | |
|---|---|---|
| 4,430,897 A | 2/1984 | Quate |
| 4,430,987 A | 2/1984 | Heller |
| 4,462,255 A | 7/1984 | Guess et al. |
| 4,468,136 A | 8/1984 | Murphy et al. |
| 4,489,727 A | 12/1984 | Matsuo et al. |
| 4,546,771 A | 10/1985 | Eggleton et al. |
| 4,596,254 A | 6/1986 | Adrian et al. |
| 4,687,304 A | 8/1987 | Piller et al. |
| 4,740,081 A | 4/1988 | Martens et al. |
| 4,802,461 A | 2/1989 | Cho |
| 4,802,487 A | 2/1989 | Martin et al. |
| 4,809,703 A | 3/1989 | Ishikawa et al. |
| 4,850,363 A | 7/1989 | Yanagawa |
| 4,860,758 A | 8/1989 | Yanagawa et al. |
| 4,869,256 A | 9/1989 | Kanno et al. |
| 4,872,758 A | 10/1989 | Miyazaki et al. |
| 4,921,333 A | 5/1990 | Brody et al. |
| 4,929,951 A | 5/1990 | Small |
| 4,995,396 A | 2/1991 | Inaba et al. |
| 5,070,455 A | 12/1991 | Singer et al. |
| 5,083,549 A | 1/1992 | Cho et al. |
| 5,107,844 A | 4/1992 | Kami et al. |
| 5,115,814 A | 5/1992 | Griffith et al. |
| 5,125,410 A | 6/1992 | Misono et al. |
| 5,140,463 A | 8/1992 | Yoo et al. |
| 5,170,793 A | 12/1992 | Takano et al. |
| 5,194,723 A | 3/1993 | Cates et al. |
| 5,207,672 A | 5/1993 | Roth et al. |
| 5,227,912 A | 7/1993 | Ho et al. |
| 5,305,759 A | 4/1994 | Kaneko et al. |
| 5,321,501 A | 6/1994 | Swanson et al. |
| 5,329,817 A | 7/1994 | Garlick et al. |
| 5,331,466 A | 7/1994 | Van Saarloos |
| 5,345,938 A | 9/1994 | Nishiki et al. |
| 5,373,845 A | 12/1994 | Gardineer et al. |
| 5,414,623 A | 5/1995 | Lu et al. |
| 5,445,155 A | 8/1995 | Sieben |
| 5,465,722 A | 11/1995 | Fort et al. |
| 5,546,187 A | 8/1996 | Pepper et al. |
| 5,546,947 A | 8/1996 | Yagami et al. |
| 5,546,948 A | 8/1996 | Hamm et al. |
| 5,606,975 A | 3/1997 | Liang et al. |
| 5,615,675 A | 4/1997 | O'Donnell et al. |
| 5,635,784 A | 6/1997 | Seale |
| 5,651,366 A | 7/1997 | Liang et al. |
| 5,713,356 A | 2/1998 | Kruger |
| 5,718,231 A | 2/1998 | Dewhurst et al. |
| 5,781,294 A | 7/1998 | Nakata et al. |
| 5,836,872 A | 11/1998 | Kenet et al. |
| 5,840,023 A | 11/1998 | Oraevsky et al. |
| 5,860,934 A | 1/1999 | Sarvazyan |
| 5,913,234 A | 6/1999 | Julliard et al. |
| 5,971,998 A | 10/1999 | Russell et al. |
| 5,977,538 A | 11/1999 | Unger et al. |
| 5,991,697 A | 11/1999 | Nelson et al. |
| 6,055,097 A | 4/2000 | Lanni et al. |
| 6,102,857 A | 8/2000 | Kruger |
| 6,104,942 A | 8/2000 | Kruger |
| 6,108,576 A | 8/2000 | Alfano et al. |
| 6,111,645 A | 8/2000 | Tearney et al. |
| 6,134,003 A | 10/2000 | Tearney et al. |
| 6,216,025 B1 | 4/2001 | Kruger |
| 6,233,055 B1 | 5/2001 | Mandella et al. |
| 6,282,011 B1 | 8/2001 | Tearney et al. |
| 6,292,682 B1 | 9/2001 | Kruger |
| 6,309,352 B1 | 10/2001 | Oraevsky et al. |
| 6,341,036 B1 | 1/2002 | Tearney et al. |
| 6,379,325 B1 | 4/2002 | Benett et al. |
| 6,405,069 B1 | 6/2002 | Oraevsky et al. |
| 6,409,671 B1 | 6/2002 | Eriksen et al. |
| 6,413,228 B1 | 7/2002 | Hung et al. |
| 6,421,164 B2 | 7/2002 | Tearney et al. |
| 6,432,067 B1 | 8/2002 | Martin et al. |
| 6,466,806 B1 | 10/2002 | Geva et al. |
| 6,485,413 B1 | 11/2002 | Boppart et al. |
| 6,490,470 B1 | 12/2002 | Kruger |
| 6,498,942 B1 | 12/2002 | Esenaliev et al. |
| 6,498,945 B1 | 12/2002 | Alfheim et al. |
| 6,501,551 B1 | 12/2002 | Tearney et al. |
| 6,545,264 B1 | 4/2003 | Stern |
| 6,564,087 B1 | 5/2003 | Pitris et al. |
| 6,567,688 B1 | 5/2003 | Wang |
| 6,590,830 B1 | 7/2003 | Garlick et al. |
| 6,626,834 B2 | 9/2003 | Dunne et al. |
| 6,628,404 B1 | 9/2003 | Kelley et al. |
| 6,633,774 B2 | 10/2003 | Kruger |
| 6,654,630 B2 | 11/2003 | Zuluaga et al. |
| 6,658,279 B2 | 12/2003 | Swanson et al. |
| 6,694,173 B1 | 2/2004 | Bende et al. |
| 6,701,181 B2 | 3/2004 | Tang et al. |
| 6,751,490 B2 | 6/2004 | Esenaliev et al. |
| 6,764,450 B2 | 7/2004 | Yock |
| 6,831,781 B2 | 12/2004 | Tearney et al. |
| 6,833,540 B2 | 12/2004 | Mackenzie et al. |
| 6,839,496 B1 | 1/2005 | Mills et al. |
| 6,846,288 B2 | 1/2005 | Nagar et al. |
| 6,853,446 B1 | 2/2005 | Almogy et al. |
| 6,877,894 B2 | 4/2005 | Vona et al. |
| 6,937,886 B2 | 8/2005 | Zavislan |
| 6,956,650 B2 | 10/2005 | Boas et al. |
| 7,072,045 B2 | 7/2006 | Chen et al. |
| 7,198,778 B2 | 4/2007 | Achilefu et al. |
| 7,231,243 B2 | 6/2007 | Tearney et al. |
| 7,245,789 B2 | 7/2007 | Bates et al. |
| 7,266,407 B2 | 9/2007 | Li et al. |
| 7,322,972 B2 | 1/2008 | Viator et al. |
| 7,357,029 B2 | 4/2008 | Falk |
| 7,382,949 B2 | 6/2008 | Bouma et al. |
| 7,541,602 B2 | 6/2009 | Metzger et al. |
| 7,610,080 B1 | 10/2009 | Winchester, Jr. et al. |
| 7,917,312 B2 | 3/2011 | Wang et al. |
| 8,016,419 B2 | 9/2011 | Zhang et al. |
| 8,025,406 B2 | 9/2011 | Zhang et al. |
| 8,143,605 B2 | 3/2012 | Metzger et al. |
| 8,397,573 B2 | 3/2013 | Kobayashi |
| 8,416,421 B2 | 4/2013 | Wang et al. |
| 8,454,512 B2 | 6/2013 | Wang et al. |
| 8,891,088 B2 | 11/2014 | Goldschmidt et al. |
| 8,997,572 B2 | 4/2015 | Wang et al. |
| 9,086,365 B2 | 7/2015 | Wang et al. |
| 9,096,365 B2 | 8/2015 | Kim |
| 9,182,387 B2 | 11/2015 | Goldkorn et al. |
| 9,220,415 B2 | 12/2015 | Mandelis et al. |
| 9,226,666 B2 | 1/2016 | Wang et al. |
| 9,234,841 B2 | 1/2016 | Wang et al. |
| 9,335,605 B2 | 5/2016 | Wang et al. |
| 9,426,455 B2 | 8/2016 | Horstmeyer et al. |
| 9,528,966 B2 | 12/2016 | Wang et al. |
| 9,554,738 B1 | 1/2017 | Gulati et al. |
| 9,618,445 B2 | 4/2017 | Sun et al. |
| 9,739,783 B1 | 8/2017 | Kumar et al. |
| 9,864,184 B2 | 1/2018 | Ou et al. |
| 10,285,595 B2 | 5/2019 | Zalev et al. |
| 10,359,400 B2 | 7/2019 | Wang et al. |
| 10,433,733 B2 | 10/2019 | Wang et al. |
| 10,448,850 B2 | 10/2019 | Wang et al. |
| 10,572,996 B2 | 2/2020 | Eurèn |
| 10,665,001 B2 | 5/2020 | Horstmeyer et al. |
| 10,666,928 B2 * | 5/2020 | Liu ............... A61B 1/045 |
| 10,679,763 B2 | 6/2020 | Zheng et al. |
| 10,740,896 B2 | 8/2020 | Georgescu et al. |
| 10,992,922 B2 * | 4/2021 | Liu ............... G06T 7/30 |
| 11,020,006 B2 | 6/2021 | Wang et al. |
| 11,029,287 B2 | 6/2021 | Wang et al. |
| 11,135,375 B2 | 10/2021 | Brady et al. |
| 11,137,375 B2 | 10/2021 | Wang et al. |
| 11,369,280 B2 | 6/2022 | Wang et al. |
| 11,530,979 B2 | 12/2022 | Wang et al. |
| 11,592,652 B2 | 2/2023 | Wang et al. |
| 11,672,426 B2 | 6/2023 | Wang et al. |
| 11,893,739 B2 | 2/2024 | Ozcan et al. |
| 11,915,360 B2 | 2/2024 | Ozcan et al. |
| 11,986,269 B2 | 5/2024 | Wang et al. |
| 12,050,201 B2 | 7/2024 | Wang et al. |

(56) References Cited

U.S. PATENT DOCUMENTS

| | | | |
|---|---|---|---|
| 12,166,953 B2* | 12/2024 | Liu | A61B 6/508 |
| 12,182,940 B2* | 12/2024 | Li | G06V 20/64 |
| 2001/0052979 A1 | 12/2001 | Treado et al. | |
| 2002/0093637 A1 | 7/2002 | Yuan et al. | |
| 2002/0173780 A1 | 11/2002 | Altshuler et al. | |
| 2002/0176092 A1 | 11/2002 | Deck | |
| 2003/0097066 A1 | 5/2003 | Shelby et al. | |
| 2003/0160957 A1 | 8/2003 | Oldham et al. | |
| 2003/0160967 A1 | 8/2003 | Houston et al. | |
| 2004/0030255 A1 | 2/2004 | Alfano et al. | |
| 2004/0039379 A1 | 2/2004 | Viator et al. | |
| 2004/0082070 A1 | 4/2004 | Jones et al. | |
| 2004/0111023 A1 | 6/2004 | Edic | |
| 2004/0254474 A1 | 12/2004 | Seibel et al. | |
| 2005/0015002 A1 | 1/2005 | Dixon et al. | |
| 2005/0028482 A1 | 2/2005 | Cable et al. | |
| 2005/0085725 A1 | 4/2005 | Nagar et al. | |
| 2005/0143664 A1 | 6/2005 | Chen et al. | |
| 2005/0154313 A1 | 7/2005 | Desilets et al. | |
| 2005/0168749 A1 | 8/2005 | Ye et al. | |
| 2005/0217381 A1 | 10/2005 | Falk | |
| 2005/0234315 A1 | 10/2005 | Mayevsky et al. | |
| 2005/0277824 A1 | 12/2005 | Aubry et al. | |
| 2006/0055936 A1 | 3/2006 | Yun et al. | |
| 2006/0058614 A1 | 3/2006 | Tsujita | |
| 2006/0078196 A1 | 4/2006 | Sumanaweera et al. | |
| 2006/0122516 A1 | 6/2006 | Schmidt et al. | |
| 2006/0181791 A1 | 8/2006 | Van Beek et al. | |
| 2006/0184042 A1 | 8/2006 | Wang et al. | |
| 2006/0235299 A1 | 10/2006 | Martinelli | |
| 2006/0247510 A1 | 11/2006 | Wiemker et al. | |
| 2006/0264717 A1 | 11/2006 | Pesach et al. | |
| 2007/0075063 A1 | 4/2007 | Wilbanks et al. | |
| 2007/0088206 A1 | 4/2007 | Peyman et al. | |
| 2007/0093702 A1 | 4/2007 | Yu et al. | |
| 2007/0213590 A1 | 9/2007 | Squicciarini | |
| 2007/0213618 A1 | 9/2007 | Li et al. | |
| 2007/0213693 A1 | 9/2007 | Plunkett | |
| 2007/0282200 A1 | 12/2007 | Johnson et al. | |
| 2007/0299341 A1 | 12/2007 | Wang et al. | |
| 2008/0029711 A1 | 2/2008 | Viellerobe et al. | |
| 2008/0037367 A1 | 2/2008 | Gross et al. | |
| 2008/0088838 A1 | 4/2008 | Raicu et al. | |
| 2008/0123083 A1 | 5/2008 | Wang et al. | |
| 2008/0173093 A1* | 7/2008 | Wang | A61B 5/0095 73/602 |
| 2008/0230717 A1 | 9/2008 | Ashkenazi et al. | |
| 2009/0051900 A1 | 2/2009 | Moon et al. | |
| 2009/0054763 A1 | 2/2009 | Wang et al. | |
| 2009/0088631 A1 | 4/2009 | Dietz et al. | |
| 2009/0112096 A1 | 4/2009 | Tamura | |
| 2009/0116518 A1 | 5/2009 | Patel et al. | |
| 2009/0138215 A1 | 5/2009 | Wang et al. | |
| 2009/0185191 A1 | 7/2009 | Boppart et al. | |
| 2009/0227997 A1 | 9/2009 | Wang et al. | |
| 2010/0053618 A1 | 3/2010 | Nakajima et al. | |
| 2010/0079768 A1 | 4/2010 | Wang et al. | |
| 2010/0134793 A1 | 6/2010 | Krishnamachari et al. | |
| 2010/0151188 A1 | 6/2010 | Ishizuka | |
| 2010/0245766 A1 | 9/2010 | Zhang et al. | |
| 2010/0245769 A1 | 9/2010 | Zhang et al. | |
| 2010/0245770 A1 | 9/2010 | Zhang et al. | |
| 2010/0249562 A1 | 9/2010 | Zhang et al. | |
| 2010/0268042 A1 | 10/2010 | Wang et al. | |
| 2010/0285518 A1 | 11/2010 | Viator et al. | |
| 2010/0309466 A1 | 12/2010 | Lucassen et al. | |
| 2010/0322497 A1 | 12/2010 | Dempsey et al. | |
| 2011/0071402 A1 | 3/2011 | Masumura | |
| 2011/0077526 A1 | 3/2011 | Zwirn | |
| 2011/0122416 A1 | 5/2011 | Yang et al. | |
| 2011/0201914 A1 | 8/2011 | Wang et al. | |
| 2011/0251515 A1 | 10/2011 | Leuthardt et al. | |
| 2011/0275890 A1 | 11/2011 | Wang et al. | |
| 2011/0282181 A1* | 11/2011 | Wang | A61B 5/0095 600/407 |
| 2011/0282192 A1 | 11/2011 | Axelrod et al. | |
| 2012/0065490 A1 | 3/2012 | Zharov et al. | |
| 2012/0070817 A1 | 3/2012 | Wang et al. | |
| 2012/0074294 A1 | 3/2012 | Streuber et al. | |
| 2012/0118052 A1 | 5/2012 | O'Donnell et al. | |
| 2012/0204648 A1 | 8/2012 | Wang et al. | |
| 2012/0275262 A1 | 11/2012 | Song et al. | |
| 2012/0307250 A1 | 12/2012 | Wang et al. | |
| 2013/0151188 A1 | 6/2013 | Rokni et al. | |
| 2013/0199299 A1 | 8/2013 | Wang et al. | |
| 2013/0218002 A1 | 8/2013 | Kiraly | |
| 2013/0245406 A1 | 9/2013 | Wang et al. | |
| 2013/0296684 A1 | 11/2013 | Miller | |
| 2014/0009808 A1 | 1/2014 | Wang et al. | |
| 2014/0029829 A1 | 1/2014 | Jiang et al. | |
| 2014/0118529 A1 | 5/2014 | Zheng et al. | |
| 2014/0142404 A1* | 5/2014 | Wang | A61B 8/4444 600/324 |
| 2014/0356897 A1* | 12/2014 | Wang | G01N 21/33 600/407 |
| 2015/0005613 A1 | 1/2015 | Kim et al. | |
| 2015/0036038 A1 | 2/2015 | Horstmeyer et al. | |
| 2015/0105672 A1 | 4/2015 | Ishikawa et al. | |
| 2015/0160450 A1 | 6/2015 | Ou et al. | |
| 2015/0178959 A1* | 6/2015 | Huang | A61B 5/0095 600/407 |
| 2015/0185187 A1 | 7/2015 | Wang et al. | |
| 2015/0245771 A1* | 9/2015 | Wang | A61B 5/725 600/407 |
| 2015/0272444 A1 | 10/2015 | Maslov et al. | |
| 2015/0272446 A1 | 10/2015 | Wang et al. | |
| 2015/0297176 A1 | 10/2015 | Rincker et al. | |
| 2015/0316510 A1 | 11/2015 | Fukushima et al. | |
| 2016/0081558 A1 | 3/2016 | Wang et al. | |
| 2016/0235305 A1 | 8/2016 | Wang et al. | |
| 2016/0242651 A1 | 8/2016 | Wang et al. | |
| 2016/0249812 A1 | 9/2016 | Wang et al. | |
| 2016/0262628 A1 | 9/2016 | Wang et al. | |
| 2016/0305914 A1 | 10/2016 | Wang et al. | |
| 2016/0310083 A1 | 10/2016 | Wang et al. | |
| 2016/0345886 A1 | 12/2016 | Wang et al. | |
| 2016/0361042 A1 | 12/2016 | Razansky et al. | |
| 2017/0065182 A1 | 3/2017 | Wang et al. | |
| 2017/0105636 A1 | 4/2017 | Wang et al. | |
| 2017/0367586 A9 | 12/2017 | Wang et al. | |
| 2017/0372471 A1* | 12/2017 | Eurèn | G06F 18/214 |
| 2018/0020920 A1 | 1/2018 | Ermilov et al. | |
| 2018/0088041 A1 | 3/2018 | Zhang et al. | |
| 2018/0132728 A1 | 5/2018 | Wang et al. | |
| 2018/0177407 A1 | 6/2018 | Hashimoto et al. | |
| 2018/0232883 A1 | 8/2018 | Sethi et al. | |
| 2019/0008444 A1 | 1/2019 | Wang et al. | |
| 2019/0008484 A1 | 1/2019 | Irisawa et al. | |
| 2019/0125583 A1 | 5/2019 | Wang et al. | |
| 2019/0206056 A1 | 7/2019 | Georgescu et al. | |
| 2019/0227038 A1 | 7/2019 | Wang et al. | |
| 2019/0244347 A1 | 8/2019 | Buckler et al. | |
| 2019/0298304 A1 | 10/2019 | Igarashi et al. | |
| 2019/0307334 A1 | 10/2019 | Wang et al. | |
| 2019/0343758 A1 | 11/2019 | Wang et al. | |
| 2019/0365355 A1 | 12/2019 | Eldar et al. | |
| 2020/0056986 A1 | 2/2020 | Wang et al. | |
| 2020/0073103 A1 | 3/2020 | Wang et al. | |
| 2020/0124691 A1 | 4/2020 | Douglas et al. | |
| 2020/0268253 A1 | 8/2020 | Wang et al. | |
| 2020/0275846 A1 | 9/2020 | Wang et al. | |
| 2020/0294231 A1 | 9/2020 | Tosun et al. | |
| 2020/0371335 A1 | 11/2020 | Amthor et al. | |
| 2020/0397523 A1 | 12/2020 | Gao et al. | |
| 2021/0010976 A1 | 1/2021 | Wang et al. | |
| 2021/0018742 A1 | 1/2021 | Stumpe | |
| 2021/0022702 A1 | 1/2021 | Yoshikawa | |
| 2021/0132005 A1 | 5/2021 | Wang et al. | |
| 2021/0145399 A1 | 5/2021 | Xie et al. | |
| 2021/0164883 A1 | 6/2021 | Imakubo et al. | |
| 2021/0164886 A1 | 6/2021 | Shirai et al. | |
| 2021/0321874 A1 | 10/2021 | Wang et al. | |
| 2021/0333241 A1 | 10/2021 | Wang et al. | |
| 2021/0349075 A1 | 11/2021 | Bronevetsky et al. | |

(56) References Cited

U.S. PATENT DOCUMENTS

| | | | |
|---|---|---|---|
| 2022/0028116 A1 | 1/2022 | Sieckmann et al. | |
| 2022/0058776 A1 | 2/2022 | Ozcan et al. | |
| 2022/0122313 A1 | 4/2022 | Ozcan et al. | |
| 2022/0237783 A1* | 7/2022 | Wong | G06T 7/0012 |
| 2022/0351347 A1 | 11/2022 | Yang et al. | |
| 2023/0030424 A1 | 2/2023 | Ozcan et al. | |
| 2023/0085827 A1 | 3/2023 | Ozcan et al. | |
| 2023/0098031 A1 | 3/2023 | Weissleder et al. | |
| 2023/0404407 A1 | 12/2023 | Garrett et al. | |
| 2023/0404520 A1 | 12/2023 | Zhang et al. | |
| 2024/0020955 A1* | 1/2024 | Frick | G06T 3/40 |
| 2024/0065555 A1 | 2/2024 | Hu | |
| 2024/0241239 A1 | 7/2024 | Wang et al. | |
| 2024/0341603 A1 | 10/2024 | Zhang et al. | |
| 2024/0354942 A1 | 10/2024 | Yang et al. | |
| 2024/0386629 A1 | 11/2024 | Hu | |

FOREIGN PATENT DOCUMENTS

| | | |
|---|---|---|
| CN | 106338473 A | 1/2017 |
| EP | 0012262 A1 | 6/1980 |
| EP | 0919180 A1 | 6/1999 |
| EP | 1227525 A2 | 7/2002 |
| EP | 1493380 A1 | 1/2005 |
| EP | 2749208 A1 | 7/2014 |
| EP | 3521808 A1 | 8/2019 |
| JP | H05126725 A | 5/1993 |
| JP | 2000292416 A | 10/2000 |
| JP | 4060615 B2 | 3/2008 |
| JP | 2009068977 A | 4/2009 |
| JP | 2010017426 A | 1/2010 |
| JP | 2010040161 A | 2/2010 |
| JP | 2012143384 A | 8/2012 |
| JP | 2013244122 A | 12/2013 |
| JP | 2014124242 A | 7/2014 |
| JP | 2014224806 A | 12/2014 |
| JP | 2016101260 A | 6/2016 |
| JP | 6086718 B2 | 3/2017 |
| JP | 6390516 B2 | 9/2018 |
| KR | 100946550 B1 | 3/2010 |
| KR | 20160091059 A | 8/2016 |
| KR | 20170006470 A | 1/2017 |
| WO | WO-9633656 A1 | 10/1996 |
| WO | WO-2006111929 A1 | 10/2006 |
| WO | WO-2007088709 A1 | 8/2007 |
| WO | WO-2007148239 A2 | 12/2007 |
| WO | WO-2008062354 A1 | 5/2008 |
| WO | WO-2008100386 A2 | 8/2008 |
| WO | WO-2009055705 A2 | 4/2009 |
| WO | WO-2009141467 A1 | 11/2009 |
| WO | WO-2009154298 A1 | 12/2009 |
| WO | WO-2010048258 A1 | 4/2010 |
| WO | WO-2010080991 A2 | 7/2010 |
| WO | WO-2011060101 A2 | 5/2011 |
| WO | WO-2011091360 A2 | 7/2011 |
| WO | WO-2011127428 A2 | 10/2011 |
| WO | WO-2012035472 A1 | 3/2012 |
| WO | WO-2012133295 A1 | 10/2012 |
| WO | WO-2013086293 A1 | 6/2013 |
| WO | WO-2015069827 A2 | 5/2015 |
| WO | WO-2015118881 A1 | 8/2015 |
| WO | WO-2016081321 A2 | 5/2016 |
| WO | WO-2018102446 A2 | 6/2018 |
| WO | WO-2018102467 A1 | 6/2018 |
| WO | WO-2018116963 A1 | 6/2018 |
| WO | WO-2018209046 A1 | 11/2018 |
| WO | WO-2021067754 A1 | 4/2021 |

OTHER PUBLICATIONS

Bai, B., et al., "Deep Learning-enabled Virtual Histological Staining of Biological Samples," Light, science & applications, 2023, vol. 12(1), pp. 1-20.

Beck A., et al., "A Fast Iterative Shrinkage-Thresholding Algorithm for Linear Inverse Problems" (2009) Siam J. Imaging Sciences, vol. 2, No. 1, pp. 183-202.

Binnewies, M., et al., Understanding the Tumor Immune Microenvironment (Time) for Effective Therapy, Nature medicine, 2018, vol. 24(5), pp. 541-550.

Bunn, P., "Early-Stage Non-Small-Cell Lung Cancer: Current Perspectives in Combined-Modality Therapy," Journal of the National Comprehensive Cancer Network, 2004, vol. 6(2), pp. 85-98.

Bychkov, D., et al., Deep learning based tissue analysis predicts outcome in colorectal cancer, Scientific reports, 2018, vol. 8(1), 1-11.

Campanella, G., et al., Clinical-grade Computational Pathology Using Weakly Supervised Deep Learning on Whole Slide Images, Nature medicine, 2019, vol. 25(8), pp. 1301-1309.

Carolan, H., et al., "Does the Incidence and Outcome of Brain Metastases in Locally Advanced Non-small Cell Lung Cancer Justify Prophylactic Cranial Irradiation or Early Detection?," Lung cancer, 2005, vol. 49(1), pp. 109-115.

Chen, R., et al., "Scaling Vision Transformers to Gigapixel Images via Hierarchical Self-Supervised Learning," IEEE, 2022, pp. 16123-16134.

Choi, H., et al., "S100b and S100b Autoantibody as Biomarkers for Early Detection of Brain Metastases in Lung Cancer," Translational lung cancer research, 2016, vol. 5(4), pp. 413-419.

Coudray, N., et al., Classification and Mutation Prediction From Non-small Cell Lung Cancer Histopathology Images Using Deep Learning, Nature medicine, 2018, vol. 24(10), pp. 1559-1567.

Darvas, F., et al., "Mapping Human Brain Function With Meg and Eeg: Methods and Validation," NeuroImage, 2004, vol. 23, pp. S289-S299.

Demene, C., et al., "Transcranial Ultrafast Ultrasound Localization Microscopy of Brain Vasculature in Patients," Nature biomedical engineering, 2021, vol. 5(3), pp. 219-228.

Echle, A., et al., "Deep Learning in Cancer Pathology: a New Generation of Clinical Biomarkers," British journal of cancer, 2021, vol. 124(4), pp. 686-696.

Eggebrecht, A., et al., "Mapping Distributed Brain Function and Networks With Diffuse Optical Tomography," Nature photonics, 2014, vol. 8(6), pp. 448-454.

Fatima A., et al., "Review of Cost Reduction Methods in Photoacoustic Computed Tomography", Photoacoustics, 2019, vol. 15(100137), pp. 1-12.

Felip, E., et al., "Overall Survival with Adjuvant Atezolizumab After Chemotherapy in Resected Stage II-IIIA Non-small-cell Lung Cancer (IMpower010): A Randomised, Multicentre, Open-label, Phase III Trial," Annals of Oncology, 2023, vol. 34(10), pp. 907-919.

Ganti, A., et al., "Update of Incidence, Prevalence, Survival, and Initial Treatment in Patients With Non-Small Cell Lung Cancer in the US," JAMA oncology, 2021, vol. 7(12), pp. 1824-1832.

Godoy, L., et al., "Emerging Precision Neoadjuvant Systemic Therapy for Patients With Resectable Non-small Cell Lung Cancer: Current Status and Perspectives," Biomarker research, 2023, vol. 11(1), pp. 1-29.

He, K. et al., "deep Residual Learning for Image Recognition", Microsoft Research, 2015, pp. 1-12 URL: https://arxiv.org/abs/1512.03385v1.

International Search Report and Written Opinion dated Aug. 5, 2024 in PCT Application No. PCT/US2024/024868.

International Search Report and Written Opinion dated May 9, 2024 in PCT Application No. PCT/US2024/011281.

Johnson, B., et al., "Patient Subsets Benefiting From Adjuvant Therapy Following Surgical Resection of Non-small Cell Lung Cancer," Clinical cancer research, 2005, vol. 11(13), pp. 5022s-5026s.

Lai P., et al., "Time-reversed Ultrasonically Encoded Optical Focusing in Biological Tissue," Journal of Biomedical Optics, 2012, vol. 17 (3), pp. 1-4.

Li Z., et al., Broadband Gradient Impedance Matching Using an Acoustic Metamaterial for Ultrasonic Transducers, Scientific Reports, 2017, vol. 7(42863), pp. 1-9.

(56) References Cited

OTHER PUBLICATIONS

Logothetis, N., "What we can do and what we cannot do with fMRI," Nature, 2008, vol. 453(7197), pp. 869-878.
Luo Y. et al., "Single-shot Autofocusing of Microscopy Images Using Deep Learning," ACS Photonics, vol. (8)2, 2021, pp. 625-638.
Merck & Co., Inc., "FDA Approves KEYTRUDA® (pembrolizumab) as Adjuvant Treatment Following Surgical Resection and Platinum-Based Chemotherapy for Patients With Stage IB (T2a ≥4 Centimeters), II, or IIIA Non-Small Cell Lung Cancer (NSCLC)," Jan. 2023, 23 pages.
Otsu, N., "A Threshold Selection Method from Gray-Level Histograms," IEEE, 1979, vol. 9(1), pp. 62-66.
Shintani, Y., et al., "Therapeutic Targeting of Cancer-Associated Fibroblasts in the Non-Small Cell Lung Cancer Tumor Microenvironment," Cancers, 2023, vol. 15(2), p. 335.
Souza, V., et al., Advances in the Molecular Landscape of Lung Cancer Brain Metastasis, Cancers, 2023, vol. 15(3), pp. 1-28.
Stogbauer, F., et al., Tumour Cell Budding and Spread Through Air Spaces in Squamous Cell Carcinoma of the Lung—Determination and Validation of Optimal Prognostic Cut-offs, Lung cancer, 2022, vol. 169, pp. 1-12.
Tomita, M., et al., "Attention-based Deep Neural Networks for Detection of Cancerous and Precancerous Esophagus Tissue on Histopathological Slides," JAMA network open, 2019, vol. 2(11), pp. 1-13.
Townsend, D., et al., "PET/CT today and tomorrow," Journal of nuclear medicine, 2004, vol. 45, pp. 4S-14S.
Tsai, P., et al., "Histopathology images predict multi-omics aberrations and prognoses in colorectal cancer patients," Nature communications, 2023, vol. 14(1), pp. 1-13.
Tsui, D., et al., "Managing Central Nervous System Spread of Lung Cancer: The State of the Art," Journal of clinical oncology, 2022, vol. 40(6), pp. 642-660.
U.S. Advisory Action dated Dec. 8, 2023 in U.S. Appl. No. 17/302,041.
U.S. Final Office Action dated May 24, 2024 in U.S. Appl. No. 16/946,496.
U.S. Non-Final Office Action dated Apr. 30, 2024 in U.S. Appl. No. 17/652,667.
U.S. Non-Final Office Action dated Jul. 26, 2024 in U.S. Appl. No. 16/798,204.
U.S. Non-Final Office Action dated Mar. 27, 2024 in U.S. Appl. No. 17/302,041.
U.S. Non-Final Office Action dated Sep. 25, 2024 in U.S. Appl. No. 18/336,834.
U.S. Notice of Allowance dated Apr. 18, 2024 in U.S. Appl. No. 17/090,752.
U.S. Notice of Allowance dated Apr. 25, 2024 in U.S. Appl. No. 17/090,752.
U.S. Notice of Allowance dated Jan. 10, 2024 in U.S. Appl. No. 17/090,752.
U.S. Notice of Allowance dated Mar. 13, 2024 in U.S. Appl. No. 17/302,313.
U.S. Notice of Allowance dated Nov. 29, 2023 in U.S. Appl. No. 17/302,313.
U.S. Notice of Allowance dated Sep. 25, 2024 in U.S. Appl. No. 17/652,667.
U.S. Appl. No. 18/658,435, inventors Hu P, et al., filed May 8, 2024.
U.S. Appl. No. 18/658,823, inventors Hu P, et al., filed May 8, 2024.
Vahadane, A., et al., Structure-Preserving Color Normalization and Sparse Stain Separation for Histological Images, IEEE transactions on medical imaging, 2016, vol. 35(8), pp. 1962-1971.
Visona, G., et al., Machine-Learning-Aided Prediction of Brain Metastases Development in Non-Small-Cell Lung Cancers, Clinical lung cancer, 2023, vol. 24(8), pp. e311-e322.
Waqar, S., et al., "Systemic Treatment of Brain Metastases," Hematology/oncology clinics of North America, 2017, vol. 31(1), pp. 157-176.
Weaver, C., et al., "Treatment of Stage I-IIIA Non-Small Cell Lung Cancer," CancerConnect, 2021, pp. 1-13.
Wood, S., et al., "The Role of the Tumor-microenvironment in Lung Cancer- metastasis and Its Relationship to Potential Therapeutic Targets," Cancer treatment reviews, 2014, vol. 40(4), pp. 558-566.
Yokoi, K., et al., "Detection of brain metastasis in potentially operable non-small cell lung cancer: a comparison of CT and MRI," Chest, 1999, vol. 115(3), pp. 714-719.
Yu, K., et al., "Predicting Non-small Cell Lung Cancer Prognosis by Fully Automated Microscopic Pathology Image Features," Nature communications, 2016, vol. 7, pp. 1-10.
Zhang, Y., et al., "Photoacoustic Vector Tomography for Deep Haemodynamic Imaging," Nature biomedical engineering, 2023, pp. 1-29.
Zhou H., et al., "AI-guided Histopathology Predicts Brain Metastasis in Lung Cancer Patients," Journal of Pathology, 2024, vol. 263, pp. 89-98.
Zhu et al., "Light Emitting Diodes based Photoacoustic Imaging and Potential Clinical Applications", Scientific Reports, 2018, vol. 8(1):9885, pp. 1-12.
Abadi, Martin, et al., "Tensorflow: Large-scale machine learning on heterogeneous distributed systems" arXiv preprint, 2016. arXiv:1603.04467.
Abdelmohsen, et al., "Micro- and nano-motors for biomedical applications," J. Mater. Chem. B 2, (2014) pp. 2395-2408.
Al, et al., "Spectral-domain optical coherence tomography: Removal of autocorrelation using an optical switch," Applied Physics Letters, (Mar. 15, 2006), 88(11): pp. 111115-1-111115-3. doi:10.1063/1.2186520.
Allen, et al. "Pulsed Near-Infrared Laser Diode Excitation System for Biomedical Photoacoustic Imaging," Optics Letters, Optical Society of America, USA., vol. 31 , No. 23, Dec. 1, 2006, pp. 3462-3464.
Alomair, et al., "In vivo high angular resolution diffusion-weighted imaging of mouse brain at 16.4 Tesla," PloS One 10, Jun. 25, 2015, e0130133, pp. 1-17.
Amendment and Request for Continued Examination dated Nov. 25, 2019 in U.S. Appl. No. 14/436,581.
Aresta et al., "Bach: Grand challenge on breast cancer histology images" Medical image analysis. Aug. 1, 2019;56:122-39.
Arridge, et al., "Accelerated high-resolution photoacoustic tomography via compressed sensing," ArXiv Prepr. ArXiv160500133, 2016, pp. 8908-8940.
Aubry J.F., et al., "Experimental demonstration of noninvasive transskull adaptive focusing based on prior computed tomography scans," J. Acoust. Soc. Am. 113(1), 84-93 (2003).
Bach, Iciar 2018 Grand Challenge on Breast Cancer Histology images, "Home", [Webpage] as retrieved from the internet on Jun. 2, 2022. URL: https://iciar2018-challenge.grand-challenge.org/.
Baheiraei, et al., "Investigation of magnesium incorporation within gelatin/calcium phosphate nanocomposite scaffold for bone tissue engineering," Int. J. Appl. Ceram. Technol. 12, (2015) pp. 245-253.
Baker, M. J. et al., "Using Fourier transform IR spectroscopy to analyze biological materials," Nat. Protoc. 9, 1771-1791 (2014).
Bansil, et al., "The biology of mucus: Composition, synthesis and organization" Adv. Drug Deliv. Rev. 124, (2018) pp. 3-15.
Beaven, G. H. & Holiday, E. R., "Ultraviolet absorption spectra of proteins and amino acids," Adv. Protein Chem 7, 319-386 (1952).
Bee-Dimmer, L., et al., "The Epidemiology of Chronic Venous Insufficiency and Varicose Veins," Annals of epidemiology, 2005, vol. 15(3), pp. 175-184.
Bell, A.G., "On the Production and Reproduction of Sound by Light," American Journal of Sciences, Oct. 1880, pp. 305-324, Third Series, vol. XX, USA.
Bellinger, et al., "Oral, ultra-long-lasting drug delivery: Application toward malaria elimination goals" Sci Transl. Med. 8(365), Nov. 16, 2016, 365ra157, pp. 1-25. doi:10.1126/scitranslmed.aag2374.
BenTaieb A., et al., "Deep learning models for digital pathology", arXiv preprint arXiv:1910.12329, (Oct. 27, 2019).
Bioucas-Dias, J.M. and Figueiredo, M.A.T. "A new TwIST: two-step iterative shrinkage/thresholding algorithms for image restoration," IEEE Trans. Image Process. 16, 2992-3004 (Dec. 2007).

(56) References Cited

OTHER PUBLICATIONS

Boas, D. A. and Dunn, A. K., "Laser speckle contrast imaging in biomedical optics," Journal of Biomedical Optics, (Jan./Feb. 2010), vol. 15, No. 1, p. 011109, 12 pages.

Brenner, et al., "Computed Tomography—An Increasing Source of Radiation Exposure" N. Engl. J. Med 357;22, Nov. 29, 2007, pp. 2277-2284.

Brunker, J., et al., "Velocity Measurements in Whole Blood Using Acoustic Resolution Photoacoustic Doppler," Biomedical Optics Express, 2016, vol. 7(7), 18 Pages.

Calasso et al., "Photoacoustic Point Source," Physical Review Letters, vol. 86, No. 16, Apr. 16, 2001, pp. 3550-3553.

Cannata et al., "Development of a 35-MHz Piezo-Composite Ultrasound Array for Medical Imaging," IEE Transactions on Ultrasonics, Ferroelectrics, and Frequency Control, 53(1): pp. 224-236 (2006).

Cauchy, A., et al., "Oeuvres completes: Series 2," Cambridge University Press, 2009.

Celli, J. P., et al., "Helicobacter pylori moves through mucus by reducing mucin viscoelasticity," Proc. Natl. Acad. Sci. U. S. A. 106, (2009) pp. 14321-14326.

Chan, et al., "New opportunities in micro- and macro-attenuated total reflection infrared spectroscopic imaging: spatial resolution and sampling versatility," Appl. Spectrosc. 57, 381-389 (2003).

Cheng, J.-X. et al., "Vibrational spectroscopic imaging ofliving systems: an emerging platform for biology and medicine," Science, vol. 350 aaa8870, No. 6264, Nov. 27, 2015, pp. 1054-1063.

Cheong, et al., "A review of the optical properties of biological tissues," IEEE J. Quantum Electronics, 26(12): pp. 2166-2185 (1980).

Chourasia, et al., "Design and Development of Multiparticulate System for Targeted Drug Delivery to Colon," Drug Delivery, 11:3, (2004) pp. 201-207.

Cinotti, E., et al., "Quantification of Capillary Blood Cell Flow Using Reflectance Confocal Microscopy," Skin Research and Technology, 2014, vol. 20, pp. 373-378.

Cisse, Moustapha M., et al., "Houdini: Fooling deep structured visual and speech recognition models with adversarial examples" Advances in neural information processing systems, 2017. 6977-6987.

Claveau. R, et al., "Digital refocusing and extended depth of field reconstruction in Fourier ptychographic microscopy", Biomed Optic Express, Jan. 2022. vol. 11(1). pp. 215-226.

Cox, B., Beard, P., "Photoacoustic tomography with a single detector in a reverberant cavity" J. Acoust. Soc. Am. 125, 1426 (Mar. 2009).

Cox, et al., "Artifact trapping during time reversal photoacoustic imaging for acoustically heterogeneous media," IEEE Trans. Med. Imaging, vol. 29, No. 2, (2010) pp. 387-396.

Cui, Y., et al. "Transferring-conjugated magnetic silica PLGA nanoparticles loaded with doxorubicin and paclitaxel for brain glioma treatment," Biomaterials 34, (2013) pp. 8511-8520.

D'Andrea, et al., "Time-resolved optical imaging through turbid media using a fast data acquisition system based on a gated CCD camera" Journal of Physics D: Applied Physics, vol. 36, No. 14, Jul. 1, 2003, pp. 1675-1681.

Danielli, et al., "Label-free photoacoustic nanoscopy," Journal of Biomedical Optics, vol. 19, No. 8, Aug. 2014, pp. 086006-1-086006-10.

Dazzi, A. et al., "AFM-IR: technology and applications in nanoscale infrared spectroscopy and chemical imaging," Chem. Rev. 117, 5146-5173 (2017).

Dazzi, A., et al., "Local infrared microspectroscopy with subwavelength spatial resolution with an atomic force microscope tip used as a photothermal sensor," Optics Letters, vol. 30, No. 18, Sep. 15, 2005, pp. 2388-2390.

De Avila, et al., "Micromotor-enabled active drug delivery for in vivo treatment of stomach infection" Nat. Commun. 8: 272, (2017) pp. 1-9.

De Boer, et al., "Improved signal-to-noise ratio in spectral-domain compared with time-domain optical coherence tomography" Optics Letters, vol. 28, No. 21, Nov. 1, 2003, pp. 2067-2069.

De Zerda, et al., "Family of enhanced photoacoustic imaging agents for high-sensitivity and multiplexing studies in living mice," ACS Nano 6(6), Jun. 26, 2012, pp. 4694-4701.

Demene, C. et al., Spatiotemporal clutter filtering of ultrafast ultrasound data highly increases Doppler and fUltrasound sensitivity, IEEE transactions on medical imaging, (Apr. 30, 2015), 34(11):2271-85.

Deán-Ben, et al., "Functional optoacoustic neuro-tomography for scalable whole-brain monitoring of calcium indicators," Light Sci. Appl., vol. 5, No. 12, p. e16201, 2016, pp. 1-7.

Deán-Ben, et al., "Portable spherical array probe for volumetric real-time optoacoustic imaging at centimeter-scale depths," Opt. Express, vol. 21, No. 23, 2013, pp. 28062-28071.

Deserno, M., "How to generate equidistributed points on the surface of a sphere," Polym. Ed, p. 99, 2004, p. 1.

Diebold, et al., "Photoacoustic Monopole Radiation in One, Two and Three Dimensions," Physical Review Letters, Figs. 1 and 2, vol. 67, No. 24, Dec. 9, 1991 , pp. 3384-3387.

Diebold, et al., "Photoacoustic Signature of Particulate Matter: Optical Production of 9 Acoustic Monopole Radiation," Science New Series, Oct. 5, 1990, pp. 101-104, vol. 250, No. 4977, pp. 101-104.

Diem, M., et al., "A decade of vibrational micro-spectroscopy of human cells and tissue (1994-2004)+," Analyst, Oct. 2004, vol. 129, No. 10, pp. 880-885. doi:10.1039/b408952a.

Diem, M. et al., "Molecular pathology via IR and Raman spectral imaging." Journal of Biophotonics, vol. 6, No. 11-12 (2013) pp. 855-886. doi:10.1002/jbio.201300131.

Dimitriou, et al., "Deep Learning for Whole Slide Image Analysis: An Overview" Frontiers in Medicine, 2019. 6: 264.

Dong, J., et al., "Walled Vessel-mimicking Phantom for Ultrasound Imaging Using 3d Printing With a Water-soluble Filament: Design Principle, Fluid-structure Interaction (Fsi) Simulation, and Experimental Validation," Physics in medicine and biology, 2020, vol. 65(8).

Draeger, C., Fink, M., "One-channel time reversal of elastic waves in a chaotic 2D-silicon cavity," Phys. Rev. Lett. 79, 407-410 (Jul. 21, 1997).

Duan, T. et al., "Hybrid Multi-wavelength Photoacoustic Imaging", 40th Annual International Conference of the IEEE Engineering in Medicine and Biology Society (EMBC), Jul. 18, 2018, pp. 4804-4807.

Dunn, et al., "Transport-based image reconstruction in turbid media with small source-detector separations," Optics Letters, vol. 25, No. 24, Dec. 15, 2000, pp. 1777-1779.

Eghtedari, et al., "High Sensitivity of In Vivo Detection of Gold Nanorods Using a Laser Optoacoustic Imaging System," Nano Letters, vol. 7, No. 7, 2007, pp. 1914-1918.

EP Office Action dated May 11, 2022, in Application No. EP19849860.2.

Ermilov et al., "Laser optoacoustic imaging system for detection of breast cancer," Journal of Biomedical Optics, vol. 14 No. 2, pp. 24007-024007-14 (2009).

Erpelding et al., "Sentinel Lymph Nodes in the Rat: Noninvasive Photoacoustic and US Imaging with a Clinical US System," Radiology, 256(1): 102-110 (2010).

Errico, C., et al., "Ultrafast Ultrasound Localization Microscopy for Deep Super-resolution Vascular Imaging," Nature, 2015, vol. 527(7579), pp. 499-502.

Evans, et al., "Coherent Anti-Stokes Raman Scattering Microscopy: Chemical Imaging for Biology and Medicine," Annual Review of Analytical Chemistry I, (2008), pp. 883-909.

Extended European Search Report dated Apr. 22, 2022, in Application No. 19849860.2.

Extended European search report dated May 23, 2022, in Application No. EP19857631.6.

Extended European Search Report from European Application Serial No. 08842292.8, dated Dec. 17, 2013 (8 pages).

Falk, Thorsten, et al., "U-Net: deep learning for cell counting, detection, and morphometry" Nature methods, 2019. 16(1): 67-70.

(56) References Cited

OTHER PUBLICATIONS

Fan, et al., "Development of a Laser Photothermoacoustic Frequency-Swept System for Subsurface Imaging: Theory and Experiment," J. Acoust. Soc. Am., vol. 116 (6), Dec. 2004, pp. 3523-3533.

Fan, et al., "Sub-Cellular Resolution Delivery of a Cytokine via Precisely Manipulated Nanowires" Nat. Nanotechnol. 5(7), Jul. 2010, 545-551. doi:10.1038/nnano.2010.104.

Fang, et al., "Photoacoustic Doppler effect from flowing small light-absorbing particles," Physical Review Letters 99(18) 184501-(1-4) (Nov. 2, 2007).

Farneback, G., et al., "Two-frame motion estimation based on polynomial expansion, in Scandinavian conference on Image analysis," 2003, pp. 363-370.

Feldman, L.D., et al., "Pathological assessment of response to induction chemotherapy in breast cancer" Cancer Research, 1986. 46(5): 2578-2581.

Fercher, et al., "Measurement of Intraocular Distances by Backscattering Spectral Interferometry," Optics Communications, 1995, vol. 117, pp. 43-48.

Fernandez, D. C., Bhargava, R., Hewitt, S. M. & Levin, I. W., "Infrared spectroscopic imaging for histopathologic recognition," Nat. Biotechnol. 23, 469-474 (2005).

Fernandez-Colino, A., et al., "Advances in Engineering Venous Valves: The Pursuit of a Definite Solution for Chronic Venous Disease," Tissue engineering. Part B, Reviews, 2021, vol. 27(3), pp. 253-265.

Final Office Action dated Mar. 3, 2016 issued in U.S. Appl. No. 13/125,522.

Final Office Action dated May 24, 2019 issued in U.S. Appl. No. 14/436,581.

Final Office Action dated Nov. 15, 2017 issued in U.S. Appl. No. 14/639,676.

Final Office Action dated Sep. 24, 2018, from U.S. Appl. No. 15/148,685.

Final Office Action dated Sep. 30, 2015, from U.S. Appl. No. 14/026,577.

Final Office Action from related Japanese Patent Application No. JP 2010-531281, dated Mar. 11, 2014, (5 pages).

Final Office Action from related U.S. Appl. No. 11/625,099, dated Apr. 20, 10.

Final Office Action from related U.S. Appl. No. 12/568,069, dated Sep. 18, 2012.

Final Office Action from related U.S. Appl. No. 13/125,522, dated May 23, 2013.

Final Office Action from related U.S. Appl. No. 13/125,522, dated Oct. 29, 2014.

Final Office Action from related U.S. Appl. No. 13/450,793, dated Nov. 22, 2013.

Final Office Action from related U.S. Appl. No. 13/574,994, dated Aug. 26, 2014.

Fisher, B., et al., "Effect of preoperative chemotherapy on the outcome of women with operable breast cancer" Journal of Clinical Oncology, 1998. 16(8): 2672-2685.

Forster, B., et al., "Complex wavelets for extended depth-of-field: A new method for the fusion of multichannel microscopy images", Microscopy research and technique, (Sep. 2004), 65(1-2):33-42.

Foster, et al., "Advances in ultrasound biomicroscopy" Ultrasound in Medicine & Biology, vol. 26, No. 1, Jan. 2000, pp. 1-27.

Fujita, K., et al., "Confocal multipoint multiphoton excitation microscope with microlens and pinhole arrays," Opt. Comm. 174, 7-12 (Jan. 15, 2000).

Furstenberg, et al., "Chemical Imaging using Infrared Photothermal Microspectroscopy," In Proceedings of SPIE Defense, Security, and Sensing (eds Druy, M.A. & Crocombe, R. A.) 837411 (SPIE, 2012).

Gaihre, et al., "Gelatin-coated magnetic iron oxide nanoparticles as carrier system: Drug loading and in vitro drug release study," Int. J. Pharm. 365, (2009) pp. 180-189.

Gao, et al., "A review of snapshot multidimensional optical imaging: measuring photon tags in parallel" Phys Rep. 616, Feb. 29, 2016, pp. 1-37. doi:10.1016/j.physrep.2015.12.004.

Gao, et al., "Artificial micromotors in the mouse's stomach: A step toward in vivo use of synthetic motors," ACS Nano 9, (2015) pp. 117-123.

Gao, et al., "Single-shot compressed ultrafast photography at one hundred billion frames per second," Nature 516(7529) 74-77 (Dec. 4, 2014).

Gibson, et al., "Recent advances in diffuse optical imaging" Physics in Medicine and Biology 50, 2005, pp. RI-R43, Inslilule of Physics Publishing, UK.

Gong, L. et al., "Breaking the diffraction limit by saturation in stimulated-Raman-scattering microscopy: a theoretical study," Phys. Rev. A 90, 13818 (2014).

Grenander, U., et al., "The Nyquist frequency is that frequency whose period is two sampling intervals," Probab. stst., 1959, vol. 434.

Griffiths, P., "Fourier transform infrared spectrometry," Science 21, 297-302 (1983).

Guggenheim, et al., "Ultrasensitive planoconcave optical microresonators for ultrasound sensing", Nat. Photon. 11, 714-721 (2017).

Guittet C, et al., "In vivo high-frequency ultrasonic characterization of human dermis" IEEE Transactions on Bio-medical Engineering. Jun. 1999;46(6):740-746. doi:10.1109/10.764950.

Guo, et al., "Calibration-free absolute quantification of optical absorption coefficients using acoustic spectra in three-dimensional photoacoustic microscopy of biological tissue" Opt Lett. 2010 ; 35(12): 2067-2069. doi:10.1364/OL.35.002067.

Guo, et al., "$CsxWO_3$ nanorods coated with polyelectrolyte multilayers as a multifunctional nanomaterial for bimodal imaging-guided photothermal/photodynamic cancer treatment," Adv. Mater. 29, 1604157 (2017).

Guo, Z., et al., "On the Speckle-free Nature of Photoacoustic Tomography," Medical Physics, 2009, vol. 36(9), pp. 4084-4088.

Haas, J. et al., "Advances in Mid-Infrared Spectroscopy for Chemical Analysis," Annu. Rev. Anal. Chem. 9 (2016) pp. 45-68.

Hai, et al., "High-throughput, label-free, single-cell photoacoustic microscopy of intratumoral metabolic heterogeneity," Nature Biomedical Engineering 3(5) 381-391 (May 2019).

Hai, et al., "Near-infrared optical-resolution photoacoustic microscopy", Opt. Lett. 39, 5192-5195 (Sep. 1, 2014).

Han, et al., "Optoacoustic image reconstruction and system analysis for finite-aperture detectors under the wavelet-packet framework," J. Biomed. Opt., vol. 21, No. 1, Jan. 2016, pp. 016002-1-016002-9.

Han, Y. et al., "Three-dimensional optoacoustic reconstruction using fast sparse representation," Opt. Lett., vol. 42, No. 5, (2017) pp. 979-982.

Hebden et al., "Enhanced time-resolved imaging with a diffusion model of photon transport" Optics Letters, vol. 19, No. 5, 1994, pp. 311-313.

Hee, et al., "Femtosecond transillumination tomography in thick tissues" Optics Letters, vol. 18, No. 13, 1993, pp. 1107-1109.

Hillman, et al., "Laminar optical tomography: demonstration of millimeter-scale depth-resolved imaging in turbid media," Optics Letters, vol. 29, No. 14, Jul. 15, 2004, pp. 1650-1652.

Hindelang, et al., "Enabling Precision Monitoring of Psoriasis Treatment by Optoacoustic Mesoscopy," Science Translational Medicine, 2022, vol. 14(644).

Hoelen, et al., "Three Dimensional Photoacoustic Imaging of Blood Vessels in Tissue" Optics Letters, 1998, pp. 648-650, vol. 23, No. 8, Optical Society of America, USA.

Hong, et al., "Simple Method to Produce Janus Colloidal Particles in Large Quantity" Langmuir 22, (2006) pp. 9495-9499.

Hortobagyi, G.N., et al., "Management of stage III primary breast cancer with primary chemotherapy, surgery, and radiation therapy" Cancer, 1988. 62(12): 2507-2516.

Hu, C., et al., "Soft Micro- and Nanorobotics," Annu. Rev. Control. Robot. Auton. Syst. 1, (2018) pp. 53-75.

Hu P et al., "Location-Dependent Spatiotemporal Antialiasing in Photoacoustic Computed Tomography," IEEE Transactions on Medical Imaging, Apr. 2023, vol. 42(4), pp. 1210-1224.

(56) References Cited

OTHER PUBLICATIONS

Hu, S., et al., "Label-free Photoacoustic Ophthalmic Angiography" Optics Letters, 35(1), Jan. 1, 2010, pp. 1-3.
Hu, S. et al., "Three-dimensional optical-resolution photoacoustic microscopy," Journal of Visualized Experiments 51 (2011).
Hu, W., et al., "Small-scale soft-bodied robot with multimodal locomotion," Nature 554, 81-85, (2018).
Huang, et al., "Aberration correction for transcranial photoacoustic tomography of primates employing adjunct image data," Journal of Biomedical Optics, vol. 17, No. 6, Jun. 2012, pp. 066016-1 to 066016-8.
Huang, et al., "Full-wave iterative image reconstruction in photoacoustic tomography with acoustically inhomogeneous media," IEEE Trans. Med. Imaging, vol. 32, No. 6, Jun. 2013, pp. 1097-1110.
Huang, et al., "Optical Coherence Tomography," Science, New Series, vol. 254, No. 5035, Nov. 22, 1991, pp. 1178-1181.
Huber, et al., "Three-Dimensional and C-Mode 6 OCT Imaging with a Compact, Frequency Swept Laser Source at 1300 nn" Optics Express, vol. 13, No. 26, Dec. 26, 2005, pp. 10523-10526.
Imai, T. et al., "High-throughput ultraviolet photoacoustic microscopy with multifocal excitation," Journal of Biomedical Optics 23(3), 036007 (Mar. 15, 2018).
Ing, R. K., Quieffin, N., Catheline, S., Fink, M., "In solid localization of finger impacts using acoustic time-reversal process," Appl. Phys. Lett. 87, 204104 (Nov. 14, 2005).
International Search Report and Written Opinion dated Jun. 13, 2022, in International Application No. PCT/US2022/018040.
International Preliminary Report on Patentability dated Feb. 25, 2021, issued in Application No. PCT/US2019/046574.
International Preliminary Report on Patentability dated Jan. 6, 2022 in PCT Application No. PCT/US2020/070174.
International Preliminary Report on Patentability dated Mar. 18, 2021, issued in Application No. PCT/US2019/049594.
International Preliminary Report on Patentability dated May 19, 2022, in PCT Application No. PCT/US2020/059214.
International Preliminary Report on Patentability dated Nov. 12, 2019 issued in PCT/US2018/032007.
International Preliminary Report on Patentability dated Sep. 7, 2023, in PCT Application No. PCT/US2022/018040.
International Preliminary Report on Patentability dated Sep. 2, 2021, issued in Application No. PCT/US2020/019368.
International Search Report and Written Opinion dated Apr. 22, 2009, from Application No. PCT/US2008/081167 (7 pages).
International Search Report and Written Opinion dated Aug. 31, 2020, issued in Application No. PCT/US2020/019368.
International Search Report and Written Opinion dated Aug. 9, 2018 issued in Application No. PCT/US2018/032007.
International Search Report and Written Opinion dated Dec. 2, 2019, issued in Application No. PCT/US2019/046574.
International Search Report and Written Opinion dated Dec. 23, 2019, issued in Application No. PCT/US2019/049594.
International Search Report and Written Opinion dated Mar. 2, 2021 issued in PCT/US2020/059214.
International Search Report and Written Opinion dated Oct. 14, 2020, issued in Application No. PCT/US2020/070174.
International Search Report and Written Opinion from Application Serial No. PCT/US2011/031823, dated Dec. 26, 2011 (8 pages).
International Search Report and Written Opinion from Application Serial No. PCTIUS2012/068403, dated Mar. 19, 2013 (10 pages).
International Search Report and Written Opinion from Application Serial No. PCT/US2010/020488, dated Aug. 31, 2010 (10 pages).
International Search Report of International Application No. PCT/US2014/066437, Feb. 26, 2015, 3 pages.
Jaipan, P., et al., "Gelatin-based Hydrogels for Biomedical Applications," MRS Communications, 2017, vol. 7, pp. 416-426.https://doi.org/10.1557/mrc.2017.92.
Ji, M. et al., "Detection of human brain tumor infiltration with quantitative stimulated Raman scattering microscopy," Sci. Transl. Med 7, 309ra163 (2015).
Ji, T. et al. "Preparation, Characterization, and Application of Au-Shell/Polystyrene Beads and Au-hell/Magnetic Beads" Adv. Mater. 13(16), Aug. 2001, pp. 1253-1256.
Junker, K., et al., "Grading of tumor regression in non-small cell lung cancer: morphology and prognosis" Chest, 2001. 120(5): 1584-1591.
Junker, K., et al., "Tumour regression in non-small-cell lung cancer following neoadjuvant therapy" Histological assessment J Cancer Res Clin Oncol, 1997. 123(9): 469-477.
Karamata, et al., "Multiple Scattering in Optical Coherence Tomography I Investigation and Modeling" Journal of Optical Society of America, vol. 22, No. 7 (2005) pp. 1369-1379.
Karamata, et al., "Multiple scattering in optical coherence tomography. II. Experimental and theoretical investigation of cross talk in wide-field optical coherence tomography" J. Opt. Soc. Am. A/vol. 22, No. 7/Jul. 2005, pp. 1380-1388.
Karshalev, E. et al., "Micromotor Pills as a Dynamic Oral Delivery Platform" American Chemical Society Nano, 2018, vol. 12, No. 8, pp. 8397-8405 DOI: 10.1021/acsnano.8b03760.
Keys, A., et al., "The Oxygen Saturation of the Venous Blood in Normal Human Subjects," American Journal of Physiology-Legacy Content, 1938, vol. 124(1), pp. 13-21.
Kim, C. et al., "In vivo molecular photoacoustic tomography of melanomas targeted by bio-conjugated gold nanocages" ACS Nano, 2010; 4(8), pp. 4559-4564. doi:10.1021/nn100736c.
Kinnunen, M., et al., "Effect of the Size and Shape of a Red Blood Cell On Elastic Light Scattering Properties At the Single-cell Level," Biomedical Optics Express, 2011, vol. 2(7), pp. 1-12.
Kirch, J., et al., "Optical tweezers reveal relationship between microstructure and nanoparticle penetration of pulmonary mucus," Proc. Natl. Acad. Sci. 109, (2012) pp. 18355-18360.
Knoll, B. & Keilmann, F., "Near-field probing of vibrational absorption for chemical microscopy," Nature 399, 134-137 (1999).
Kohlberger, et al., "Whole-slide image focus quality: Automatic assessment and impact on AI cancer detection" Journal of Pathology Informatics, 2019. 10: 39.
Kole, M. R., et al., "Discrete frequency infrared microspectroscopy and imaging with a tunable quantum cascade laser," Anal. Chem. 84, 10366-10372 (2012).
Kolkman, et al., "In Vivo Photoacoustic Imaging of Blood Vessels Using an Extreme-Narrow Aperture Sensor" IEEE Journal of Selected Topics in Quantum Electronics, vol. 9, No. 2, Mar./Apr. 2003, pp. 343-346.
Kothapalli, S., et al., "Simultaneous Transrectal Ultrasound and Photoacoustic Human Prostate Imaging," Science Translational Medicine, 2019, vol. 11 (507), pp. 1-12.
Koziolek, et al., "Navigating the human gastrointestinal tract for oral drug delivery: Uncharted waters and new frontiers," Adv. Drug Delivery Rev. 101, (2016) pp. 75-88.
Kruger, et al., "Breast Cancer in Vivo: Contrast Enhancement with Thermoacoustic CT at 434 MHz-Feasibility Study," Radiology, 216(1): 279-283 (2000).
Kruger et al., "Photoacoustic Ultrasound (PAUS)-Reconstruction Tomography" Med. Phys., Oct. 1995, vol. 22 (10) Am. Assoc. Phys. Med., USA, pp. 1605-1609.
Kruger et al., "Thermoacoustic computed tomography using a conventional linear transducer array," Medical Physics, 30(5): 856-860 (2003).
Kruger, et al., "Thermoacoustic computed tomography-technical considerations" Medical Physics, 26(9): 1832-1837 (1999).
Kruger, et al., "Thermoacoustic CT: imaging principles," Proc. SPIE 3916, (2000) pp. 150-160.
Kruger, et al., "Thermoacoustic Molecular Imaging of Small Animals," Molecular Imaging, 2(2): 113-123 (2003).
Ku and Wang, "Scanning microwave-induced thermoacoustic tomography: Signal, resolution, and contrast," Medical Physics, 28(1): 4-10 (2001).
Ku and Wang, "Scanning thermoacoustic tomography in biological tissue." Medical physics 27.5 (2000): 1195-1202.
Ku and Wang, "Deeply penetrating photoacoustic tomography in biological tissues enhanced with an optical contrast agent," Optics Letters, 30(5): 507-509 (2005).

(56) References Cited

OTHER PUBLICATIONS

Ku, et al., "Imaging of tumor angiogenesis in rat brains in vivo by photoacoustic tomography," Applied Optics, 44(5): 770-775 (2005).
Ku, G. et al., "Multiple-bandwidth photoacoustic tomography," Physics in Medicine & Biology, 49(7): 1329-1338 (2004).
Ku G, et al., "Thermoacoustic and Photoacoustic Tomography of Thick Biological Tissues Toward Breast Imaging," Technology in Cancer Research & Treatment, 4(5): 559-566 (2005).
Kuerer, H.M., et al., "Clinical course of breast cancer patients with complete pathologic primary tumor and axillary lymph node response to doxorubicin-based neoadjuvant chemotherapy" Journal of Clinical Oncology, 1999. 17(2): 460-469.
Kunitz, M., "Crystalline desoxyribonuclease; isolation and general properties; spectrophotometric method for the measurement of desoxyribonuclease activity," The Journal General Physiology, vol. 33, Mar. 20, 1950, pp. 349-362. URL: http://doi.org./10.1085/jgp.33.4.349.
Kuppusami, S. et al., "Parylene Coatings in Medical Devices and Implants: A Review" Universal Journal of Biomedical Engineering, 2015, vol. 3, No. 2, pp. 9-14 DOI: 10.13189/ujbe.2015.030201.
Lai, P. et al., "Dependence of optical scattering from Intralipid in gelatin-gel based tissue-mimicking phantoms on mixing temperature and time" Journal of Biomedical Optics, vol. 19, No. 3, Mar. 2014, pp. 035002-1-035002-6.
Lai, P. et al., "Photoacoustically guided wavefront shaping for enhanced optical focusing in scattering media," Nature Photonics 9 126-132 (Jan. 19, 2015).
Lai, S. et al., "Mucus-penetrating nanoparticles for drug and gene delivery to mucosal tissues," Adv. Drug Deliv. Rev. 61(2), Feb. 27, 2009, pp. 158-171. doi:10.1016/j.addr.2008.11.002.
Larina, et al., Real-time optoacoustic monitoring of temperature in tissues: Journal of Physics D: Applied Physics, vol. 38, (2005) pp. 2633-2639.
Lasch, et al., "FT-IR spectroscopic investigations of single cells on the subcellular level," Vibr. Spectrosc. 28, 147-157 (2002).
Laser Institute of America, "American National Standard for the safe use of lasers," American National Standard Institute (ANSI) Z136.Jan. 2007 Revision of ANSI Z136.1-2000).
Leal, et al., "Physicochemical properties of mucus and their impact on transmucosal drug delivery," Int. J. Pharm. 532, (2017) pp. 555-572.
Lee R Dice, "Measures of the amount of ecologic association between species" Ecology, 1945. 26(3): 297-302.
Lee, Y., et al., "Automatic Dynamic Range Adjustment for Ultrasound B-mode Imaging," Ultrasonics, 2015, vol. 56, pp. 435-443.
Leitgeb, et al., "Performance of fourier domain vs. time domain optical coherence tomography," Optical Express, vol. 11, No. 8, Apr. 21, 2003, pp. 889-894.
Leitgeb, R., et al., "Doppler Optical Coherence Tomography," Progress in Retinal and Eye Research, 2014, vol. 41, pp. 26-43.
Lewis, E. N. et al., "Fourier transform spectroscopic imaging using an infrared focal-Plane array detector," Anal. Chem. 67, 3377-3381 (1995).
Li, et al., "An Enteric Micromotor Can Selectively Position and Spontaneously Propel in the Gastrointestinal Tract," ACS Nano. 10(10), Oct. 25, 2016, pp. 9536-9542. doi:10.1021/acsnano.6b04795.
Li, et al., "Autonomous Collision-Free Navigation of Microvehicles in Complex and Dynamically Changing Environments" ACS Nano, 11, (2017) pp. 9268-9275.
Li, et al., "Single-impulse panoramic photoacoustic computed tomography of small-animal whole-body dynamics at high spatiotemporal resolution," Nat Biomed Eng. 1(5) May 2017, pp. 1-11. doi:10.1038/s41551-017-0071.
Li, et al., "Snapshot photoacoustic topography through an ergodic relay for high-throughput imaging of optical absorption," Nature Photonics 14(3) (2020) pp. 164-170. URL:https://doi.org/10.1038/s41566-019-0576-2.
Li, et al., "Optical Coherence Computed Tomography," Applied Physics Letters, vol. 91, American Institute of Physics, 2007, pp. 141107-1-141107-3.
Li, G. et al., "Reflection-mode Multifocal Optical-resolution Photoacoustic Microscopy," Journal of Biomedical Optics, Mar. 2013, vol. 18, No. 3, 030501 (4 pages).
Li, J. et al., "Micromotors Spontaneously Neutralize Gastric Acid for pH-Responsive Payload Release" Angewandte Chemie International Edition, vol. 56, No. 8, 2017, pp. 2156-2161. DOI: 10.1002/anie.201611774.
Li, J. et al., "Micro/Nanorobots for Biomedicine: Delivery, Surgery, Sensing, and Detoxification" Sci Robot, 2(4), Mar. 15, 2017, pp. 1-20. doi: 10.1126/scirobotics.aam6431.
Li, L.. , et al., "Simultaneous Molecular and Hypoxia Imaging of Brain Tumors in Vivo Using Spectroscopic Photoacoustic Tomography," Proceedings of the IEEE, 96(3): 481-489 (2008).
Li, L., et al., "Small near-infrared photochromic protein for photoacoustic multi-contrast imaging and detection of protein interactions in vivo," Nature Communications 9(1) 2734 (Jul. 16, 2018).
Li, Y. et al., "Multifocal photoacoustic microscopy through an ergodic relay (Conference Presentation)", Proc. SPIE 10878, Photons Plus Ultrasound: Imaging and Sensing 2019, 108781C, presented Feb. 4, 2019, published Mar. 4, 2019, https://doi.org/10.1117/12.2513502.
Li, Y. et al., "Multifocal Photoacoustic Microscopy Using a Single-element Ultrasonic Transducer Through an Ergodic Relay", Light: Science & Applications, Jul. 31, 2020, vol. 9, No. 135, pp. 1-7.
Li, Z., et al., "Super—resolution far-field infrared imaging by photothermal heterodyne imaging," The Journal of Physical Chemistry B, vol. 121 (2017) pp. 8838-8846.
Li, Z., et al., "Super-resolution imaging with mid-IR photothermal microscopy on the single particle level," In Proceedings of SPIE Physical Chemistry of Interfaces and Nano-materials XIV, vol. 9549, Aug. 20, 2015, pp. 954912-1-954912-8.
Liang, et al., "Single-shot real-time femtosecond imaging of temporal focusing," Light-Science & Applications 7(1) 42 (Aug. 8, 2018).
Liang, et al., "Single-shot real-time video recording of a photonic Mach cone induced by a scattered light pulse," Science Advances 3(1) e1601814 (Jan. 20, 2017).
Liang, et al., "Single-shot ultrafast optical imaging," Optica 5(9) 1113-1127 (Sep. 2018).
Lin, et al., "Single-breath-hold photoacoustic computed tomography of the breast," Nature Communications 9(1) 2352 (Jun. 15, 2018).
Lin, L., et al., "The Emerging Role of Photoacoustic Imaging in Clinical Oncology," Nature reviews. Clinical oncology, 2022, vol. 19(6), pp. 365-384.
Liu, et al., "Label-free cell nuclear imaging by Gruneisen relaxation photoacoustic microscopy" Opt Lett. Feb. 15, 2018; 43(4), (2018) pp. 947-950.
Liu, et al., "Optical focusing deep inside dynamic scattering media with near-infrared time-reversed ultrasonically encoded (TRUE) light," Nature Communications 6 5409 (Jan. 5, 2015).
Liu-Jarin, Xiaolin, et al., "Histologic Assessment of Non-Small Cell Lung Carcinoma after Neoadjuvant Therapy" Modern pathology, 2003. 16(11): 1102-1108.
Lovell, et al., "Porphysome nanovesicles generated by porphyrin bilayers for use as multimodal biophotonic contrast agents," Nature Materials 10(4) 324-32 (Mar. 20, 2011).
Lu, F., et al., "Tip-enhanced infrared nanospectroscopy via molecular expansion force detection," Nat. Photon. 8, 307-312 (2014).
Lu, F.-K. et al., "Label-free DNA imaging in vivo with stimulated Raman scattering microscopy," Proc. Natl Acad Sci. USA 112, 11624-11629 (2015).
Lurie, F., et al., "Mechanism of Venous Valve Closure and Role of the Valve in Circulation: a New Concept," Journal of vascular surgery, 2003, vol. 38(5), pp. 955-961.
Ma, et al., "Time-reversed adapted-perturbation (TRAP) optical focusing onto dynamic objects inside scattering media," Nature Photonics 8(12) 931-936 (Nov. 2, 2014).
Majurski, Michael, et al., "Cell image segmentation using generative adversarial networks, transfer learning, and augmentations"

(56) References Cited

OTHER PUBLICATIONS

Proceedings of the IEEE Conference on Computer Vision and Pattern Recognition Workshops, 2019.
Manohar, et al., "Initial results of in vivo non-invasive cancer imaging in the human breast using near-infrared photoacoustics," Optics Express, 15(19): 12277-12285 (2007).
Maslov, et al., "In vivo dark-field reflection-mode photoacoustic microscopy," Optics Letters 30(6), Mar. 15, 2005, pp. 625-627.
Maslov, et al., "Optical-resolution photoacoustic microscropy for in vivo imaging of single capillaries," Optical Letters, 33(9): 929-931 (2008).
Maslov, et al., "Photoacoustic Imaging of biological tissue with Intensity-Modulated Continuous-Wave Laser" Journal of Biomedical Optics, 2008, pp. 024006 1-5, vol. 13(2), SPIE, USA.
Matsumoto, et al., "Label-free photoacoustic imaging of human palmar vessels: a structural morphological analysis," Sci. Rep., vol. 8, No. 1, (2018) p. 786.
Matthews, et al., "Parameterized Joint Reconstruction of the Initial Pressure and Sound Speed Distributions for Photoacoustic Computed Tomography," Siam J. Imaging Sci., vol. 11, No. 2, (2018) pp. 1560-1588.
Medina-Sanchez, et al., "Medical microbots need better imaging and control," Nature 545, (2017) pp. 406-408.
Michaelian, Kirk H. "Photoacoustic IR spectroscopy: instrumentation, applications and data analysis" John Wiley & Sons; Dec. 1, 2010. Preface Only.
Miller, et al., "Synchrotron-based biological microspectroscopy: From the mid- infrared through the far-infrared regimes," Journal of Biological Physics 29, 219-230 (2003).
Mishra et al., "Development and comparison of the DTM, the DOM and the FVM formulations for the short-pulse laser transport through a participating medium" International Journal of Heat and Mass Transfer, vol. 49 (2006) pp. 1820-1832.
Mitsuhashi, et al., "A forward-adjoint operator pair based on the elastic wave equation for use in transcranial photoacoustic computed tomography," Siam J. Imaging Sci., vol. 10, No. 4, 2017, pp. 2022-2048.
Mitsuhashi, et al., "Investigation of the far-field approximation for modeling a transducer's spatial impulse response in photoacoustic computed tomography," Photoacoustics, vol. 2, No. 1, 2014, pp. 21-32.
Montaldo, et al., "Building three-dimensional images using time-reversal chaotic cavity", IEEE Trans. Ultrason. Ferroelectr. Freq. Control 52, pp. 1489-1497 (2005).
Montaldo, et al., "Coherent Plane-Wave Compounding for Very High Frame Rate Ultrasonography and Transient Elastography," IEEE Trans. Ultrason. Ferroelectr. Freq. Control, vol. 56, No. 3, Mar. 2009, pp. 489-506.
Morgner et al., "Spectroscopic optical coherence tomography," Optics Letters, vol. 25, No. 2, Jan. 15, 2000, pp. 111-113.
Murray, C., et al., "The Physiological Principle of Minimum Work: I. The Vascular System and the Cost of Blood Volume," Proceedings of the National Academy of Sciences of the United States of America, 1926, vol. 12(3), pp. 207-214.
Murray et al., "High-Sensitivity Laser-Based Acoustic Microscopy Using a Modulated Excitation Source," Applied Physics Letters, vol. 85, No. 14, American Institute of Physics, USA., Oct. 4, 2004, pp. 2974-2976.
Na, S., et al., "Cross-ray Ultrasound Tomography and Photoacoustic Tomography of Cerebral Hemodynamics in Rodents," Advanced science, 2022, vol. 9(25).
Na, S., et al., "Massively Parallel Functional Photoacoustic Computed Tomography of the Human Brain," Nature Biomedical Engineering 2021, vol. 6(5), pp. 584-592.
Nakajima, et al., "Three-dimensional analysis and classification of arteries in the skin and subcutaneous adipofascial tissue by computer graphics imaging," Plastic and Reconstructive Surgery, 102(3): 748-760 (1998).
Nasiriavanaki, et al., "High-resolution photoacoustic tomography of resting-state functional connectivity in the mouse brain," Proceedings of the National Academy of Sciences 111(1) 21-26 (Jan. 7, 2014).
Nasse, M. J. et al., "High-resolution Fourier-transform infrared chemical imaging with multiple synchrotron beams," Nat. Methods 8, 413-416 (2011).
Nelson et al., "Imaging Glioblastoma Multiforme," The Cancer Journal vol. 9, No. 2, Mar./Apr. 2003, pp. 134-145.
Niederhauser et al., "Combined Ultrasound and Optoacoustic System for Real-Time High-Contrast Vascular imaging in Vivo," IEEE Transactions on MedicalImaging, 24(4): 436-440 (2005).
Notice of Allowance dated Dec. 12, 2018 issued in U.S. Appl. No. 14/639,676.
Notice of Allowance dated Dec. 5, 2014 issued in U.S. Appl. No. 13/369,558.
Notice of Allowance dated Feb. 2, 2021 issued in U.S. Appl. No. 16/372,597.
Notice of Allowance dated Jan. 26, 2021 issued in U.S. Appl. No. 14/436,581.
Notice of Allowance dated Jan. 5, 2016, from U.S. Appl. No. 14/026,577.
Notice of Allowance dated Jan. 5, 2022 issued in U.S. Appl. No. 16/540,936.
Notice of Allowance dated Jul. 29, 2014 issued in U.S. Appl. No. 13/369,558.
Notice of Allowance dated Jun. 23, 2021 issued in U.S. Appl. No. 15/037,468.
Notice of Allowance dated Mar. 23, 2020 issued in U.S. Appl. No. 15/037,468.
Notice of Allowance dated May 16, 2019, from U.S. Appl. No. 15/148,685.
Notice of Allowance dated Nov. 17, 2015 from U.S. Appl. No. 13/574,994.
Notice of Allowance dated Oct. 28, 2020 issued in U.S. Appl. No. 15/037,468.
Notice of Allowance dated Sep. 19, 2016 issued in U.S. Appl. No. 13/125,522.
Notice of Allowance from related U.S. Appl. No. 12/254,643, dated Nov. 22, 2010.
Notice of Allowance from related U.S. Appl. No. 12/568,069, dated Feb. 22, 2013.
Notice of Allowance from related U.S. Appl. No. 12/739,589, dated Feb. 5, 2013.
Nowak, D. et al., "Nanoscale chemical imaging by photoinduced force microscopy," Sci. Adv. 2, Mar. 25, 2016, e1501571, pp. 1-9.
Ntziachristos, V., "Going deeper than microscopy: the optical imaging frontier in biology" Nature Methods vol. 7, No. 8, Aug. 2010, pp. 603-614.
Office Action dated Apr. 21, 2017 issued in U.S. Appl. No. 14/639,676.
Office Action dated Apr. 3, 2020 issued in U.S. Appl. No. 14/436,581.
Office Action dated Aug. 19, 2019 issued in U.S. Appl. No. 16/372,597.
Office Action dated Aug. 26, 2015 issued in U.S. Appl. No. 13/125,522.
Office Action dated Dec. 13, 2019 issued in U.S. Appl. No. 15/037,468.
Office Action dated Feb. 28, 2020 issued in U.S. Appl. No. 16/372,597.
Office Action dated Jan. 20, 2015, from U.S. Appl. No. 14/026,577.
Office Action dated Jun. 20, 2014 issued in U.S. Appl. No. 13/369,558.
Office Action dated May 31, 2018 issued in U.S. Appl. No. 14/639,676.
Office Action dated Nov. 13, 2017, from U.S. Appl. No. 15/148,685.
Office Action dated Oct. 3, 2018 issued in U.S. Appl. No. 14/436,581.
Office Action dated Oct. 8, 2020 issued in U.S. Appl. No. 16/372,597.
Office Action from related U.S. Appl. No. 12/254,643, dated Aug. 6, 2010.
Office Action from related U.S. Appl. No. 11/625,099, dated Nov. 1, 2010.
Office Action from related U.S. Appl. No. 12/568,069, dated Dec. 21, 2012.
Office Action from related U.S. Appl. No. 12/568,069, dated Mar. 29, 2012.

(56) References Cited

OTHER PUBLICATIONS

Office Action from related U.S. Appl. No. 12/739,589, dated Jul. 19, 2012.
Office Action from related U.S. Appl. No. 13/125,522, dated Jul. 17, 2014.
Office Action from related U.S. Appl. No. 13/125,522, dated Jan. 22, 2013.
Office Action from related U.S. Appl. No. 13/143,832, dated Apr. 18, 2014.
Office Action from related U.S. Appl. No. 13/450,793, dated Aug. 1, 2014.
Office Action from related U.S. Appl. No. 13/450,793, dated Mar. 24, 2014.
Office Action from related U.S. Appl. No. 13/450,793, dated Jun. 5, 2013.
Office Action from related U.S. Appl. No. 13/574,994, dated Mar. 17, 2014.
Office Action from related U.S. Appl. No. 13/637,897, dated Aug. 1, 2014.
Office Action from related U.S. Appl. No. 14/164,117, dated Dec. 11, 2015.
Ogunlade, et al., "In vivo three-dimensional photoacoustic imaging of the renal vasculature in preclinical rodent models," Am. J. Physiol.-Ren. Physiol., vol. 314, No. 6, (2018) pp. F1145- F1153.
Oraevsky et al., " Laser Optoacoustic Tomography of Layered Tissues: Signal Processing" Proceedings of SPIE, 2979: 59-70 (1997).
Oraevsky et al.,, "Laser opto-acoustic imaging of the breast: Detection of cancer angiogenesis" Proceedings of SPIE, 3597: 352-363 (1999).
Oraevsky et al., "Optoacoustic Tomography," Biomedical Photonics Handbook, 2003, chapter 34: pp. 931-964, CRC Press LLC, USA.
Oraevsky et al., "Ultimate Sensitivity of Time-Resolved Opto-Acoustic Detection," Biomedical Optoacoustics, 2000, pp. 228-239, vol. 3916, SPIE, USA.
Ou. X., et al., "Embedded pupil function recovery for Fourier ptychographic microscopy," Optics Express, vol. 22, No. 5, Mar. 10, 2014, pp. 4960-4972. doi:10.1364/OE.22.004960 Erratum Attached, dated Dec. 28, 2015, vol. 23, No. 26, p. 33027. doi:10.1364/OE.23.033027.
Ou, X., et al., "High numerical aperture Fourier ptychography: principle, implementation and characterization," Optics Express, vol. 23, No. 3, Feb. 9, 2015, pp. 3472-3491. doi: 10.1364/OE.23.003472.
Partial European Search Report issued for European Application No. 17159220.7, dated Aug. 23, 2017 (9 pages).
Pataer, Apar, et al., "Histopathologic response criteria predict survival of patients with resected lung cancer after neoadjuvant chemotherapy" Journal of Thoracic Oncology, 2012. 7(5): 825-832.
Patel, et al., "Pulsed optoacoustic spectroscopy of condensed matter," Rev. Mod. Phys., vol. 53 (1981) pp. 517-550.
Paxton, et al., "Catalytic nanomotors: Autonomous movement of striped nanorods," J. Am. Chem. Soc. 126, 13424-13431 (2004).
Pei, Ziang, et al., "Direct Cellularity Estimation on Breast Cancer Histopathology Images Using Transfer Learning" Computational and Mathematical Methods in Medicine, 2019. 2019: 3041250.
Petrick, et al., "SPIE-AAPM-NCI BreastPathQ Challenge: an image analysis challenge for quantitative tumor cellularity assessment in breast cancer histology images following neoadjuvant treatment" May 8, 2021; J. of Medical Imaging, 8(3), 034501 (2021). URL:https://doi.org/10.1117/1.JMI.8.3.034501.
Petrila, T., et al., "Basics of Fluid Mechanics and Introduction to Computational Fluid Dynamics," Springer Science & Business Media, 2004, vol. 3.
Petrov, et al., "Optoacoustic, Noninvasive, Real-Time, Continuous Monitoring of Cerebral Blood Oxygenation: An In Vivo Study in Sheep" Anesthesiology, vol. 102, No. 1, Jan. 2005, pp. 69-75.
Potter, et al., "Capillary diameter and geometry in cardiac and skeletal muscle studied by means of corrosion casts" Microvascular Research, 25(1): 68-84 (1983).
Pramanik, M., "Improving tangential resolution with a modified delayand-sum reconstruction algorithm in photoacoustic and thermoacoustic tomography," Josa A, vol. 31, No. 3, (2014) pp. 621-627.
Prati, et al., "New advances in the application of FTIR microscopy and spectroscopy for the characterization of artistic materials," Accounts of Chemical Research, vol. 43, (2010) pp. 792-801.
Prevedel, et al., "Simultaneous whole-animal 3D imaging of neuronal activity using light-field microscopy," Nat. Methods 11, 727-730 (Jul. 2014).
Quickenden, et al., "The ultraviolet absorption spectrum ofliquid water," J Chem. Phys. 72, 4416-4428 (1980).
Qureshi, M., et al., "Quantitative Blood Flow Estimation in Vivo by Optical Speckle Image Velocimetry," 2021, Optica, vol. 8, p. 1326-1326.
R. A. Kruger, et al., "Dedicated 3D photoacoustic breast imaging," Med. Phys., vol. 40, No. 11, 2013, pp. 113301-1-113301-8.
Rajan, V., et al., "Review of Methodological Developments In Laser Doppler Flowmetry," Lasers in Medical Science, 2008, vol. 24(2), pp. 269-283.
Rakhlin, Alexander, et al, "Breast tumor cellularity assessment using deep neural networks" Proceedings of the IEEE International Conference on Computer Vision Workshops, 2019.
Razansky, et al., "Multispectral opto-acoustic tomography of deep-seated fluorescent proteins in vivo," Nature Photonics 3, (2009) pp. 412-417.
Robert et al., "Fabrication of Focused Poly (Vinylidene Fluoride-Trifluoroethylene) P(VDF-TrFE) Copolymer 40-50 MHz Ultrasound Transducers on Curved Surfaces," Journal of Applied Physics, vol. 96, No. 1. Jul. 1, 2004, pp. 252-256.
Rockley, M.G., "Fourier-transformed infrared photoacoustic spectroscopy of polystyrene film," Chem. Phys. Lett. 68, 455-456 (1979).
Ronneberger, O. et al., "U-Net: Convolutional Networks for Biomedical Image Segmentation", Medical Image Computing and Computer-Assisted Intervention (MICCAI 2015), Lecture Notes in Computer Science, Springer International Publishing Switzerland, 2015. vol. 9351, pp. 234-241. https://doi.org/10.48550/arXiv.1505.04597.
Rosenblum, et al., "Progress and challenges towards targeted delivery of cancer therapeutics" Nat. Commun. 9, (2018) 1410, pp. 1-12.
Saager et al., "Direct characterization and removal of interfering absorption trends in two-layer turbid media" J. Opt. Soc. Am. A, vol. 22, No. 9, Sep. 2005, pp. 1874-1882.
Sakadzic, et al., "Correlation transfer and diffusion of ultrasound-modulated multiply scattered light," Physical Review Letters 96(16) 163902-(1-4) (Apr. 28, 2006).
Sanchez, et al., "Chemically powered micro- and nanomotors," Angew. Chem. Int. Ed. 54, (2015) pp. 1414-1444.
Savateeva, et al., "Noninvasive detection and staging or oral cancer in vivo with confocal opto-acoustic tomography" Biomedical Optoacoustics, vol. 3916, International Society for Optics and Photonics 2000, pp. 55-66.
Schambach, et al., "Application of micro-CT in small animal imaging" Methods, vol. 50, No. 1, Jan. 2010, pp. 2-13.
Schmidt, et al., "A 32-Channel Time Resolved Instrument for Medical Optical Tomography" Review of Scientific Instruments, vol. 71, No. 1, Jan. 2000, pp. 256-265.
Schoeder, et al., "Optoacoustic image reconstruction: the full inverse problem with variable bases," Proc. R. Soc. A, vol. 474, No. 2219, (2018) pp. 1-20.
Scholte, et al., "On spatial sampling and aliasing in acoustic imaging" 12th Intern. congress on sound and vibration, Lisbon, Portugal (2005) pp. 1-8.
Schroeter, et al., "Spontaneous slow hemodynamic oscillations are impaired in cerebral microangiopathy," Journal of Cerebral Blood Flow & Metabolism (2005) 25, pp. 1675-1684.
Servant, et al., "Controlled In Vivo Swimming of a Swarm of Bacteria-Like Microrobotic Flagella" Advanced Materials 27, (2015) pp. 2981-2988.
Sethuraman et al., "Development of a combined intravascular ultrasound and photoacoustic imaging system" Proceedings of SPIE, 6086: 60860F.1-60860F.10 (2006).

(56) References Cited

OTHER PUBLICATIONS

Sethuraman et al., "Intravascular photoacoustic imaging of atherosclerotic plaques: Ex vivo study using a rabbit model of atherosclerosis" Proceedings of SPIE, 6437: 643729.1-643729.9 (2007).
Sezer, et al., "Review of magnesium-based biomaterials and their applications," J. Magnesium Alloys 6, (2018) pp. 23-43.
Shah, J. et al., "Photoacoustic imaging and temperature measurement for photothermal cancer therapy," Journal of Biomedical Optics, vol. 13, No. 3, (May/Jun. 2008) pp. 034024-1-034024-9.
Shen, C., et al., "Computational aberration correction of VIS-NIR multispectral imaging microscopy based on Fourier ptychography" Optics Express, 2019. 27(18): 24923-24937.
Sheth, et al., "Columnar Specificity of Microvascular Oxygenation and vol. Responses: Implications for Functional Brain Mapping," The Journal of Neuroscience, vol. 24, No. 3, Jan. 21, 2004, pp. 634-641.
Shi, J. et al., "High-resolution, high-contrast mid-infrared imaging of fresh biological samples with ultraviolet-localized photoacoustic microscopy," Nature Photonics, May 13, 2019, vol. 13, No. 9, pp. 609-615.
Shmueli, et al., "Low Frequency Fluctuations in the Cardiac Rate as a Source of Variance in the Resting-State fMRI BOLD Signal," Neuroimage, vol. 38, No. 2, Nov. 1, 2007, pp. 306-320.
Silva, et al., "Toward Label-Free Super-Resolution Microscopy," ACS Photon. 3, 79-86 (2016).
Sim, et al., "In vivo Microscopic Photoacoustic Spectroscopy for Non-Invasive Glucose Monitoring Invulnerable to Skin Secretion Products," Sci. Rep. 8, 1059 (2018).
Siphanto et al., "Imaging of Small Vessels Using Photoacoustics: an in Vivo Study," Lasers in Surgery and Medicince, vol. 35, Wiley-Liss, Inc., Netherlands, Dec. 20, 2004, pp. 354-362.
Sitti, M., "Miniature soft robots-road to the clinic," Nat. Rev. Mater, 3, (2018) pp. 74-75.
Smith, et al., "Beyond C, H, O, and Ni analysis of the elemental composition of U.S. FDA approved drug architectures," J. Med. Chem. 57, pp. 9764-9773 (2014).
Sommer, A. J., et al., "Attenuated total internal reflection infrared mapping microspectroscopy using an imaging microscope," Appl. Spectrosc. 55, 252-256 (2001).
Song, et al., "Section-illumination photoacoustic microscopy for dynamic 3D imaging of microcirculation in vivo" Optics Letters, 35(9): 1482-1484 (2010).
Song, et al., "Fast 3-D dark-field reflection-mode photoacoustic microscopy in vivo with a 30-MHz ultrasound linear array" Journal of Biomedical Optics, 13(5): 054028.1-054028.5 (2008).
Song, et al., "Multi-focal optical-resolution photoacoustic microscopy in vivo." NIH Public Access Author Manuscript, May 13, 2011. pp. 1-7.
Soppimath, et al., "Microspheres as floating drug-delivery systems to increase gastric retention of drugs" Drug Metab. Rev. 33, (2001) pp. 149-160.
SPIE-AAPM-NCI BreastPathQ: Cancer Cellularity Challenge 2019, "Overview", [Webpage] as retrieved from the internet on Jun. 2, 2022. URL: https://breastpathq.grand-challenge.org/.
Steinbrink, et al., "Illuminating the BOLD signal: combined fMRI-fNIRS studies" Magnetic Resonance Imaging, vol. 24, No. 4, May 2006, pp. 495-505.
Stern, MD., " In vivo evaluation of microcirculation by coherent light scattering," Nature, 254(5495): 56-58 (1975).
Sun, et al., "Sampling criteria for Fourier ptychographic microscopy in object space and frequency space," Optics Express vol. 24, No. 14, Jul. 11, 2016, pp. 15765-15781.
Symmans, W. Fraser, et al., "Measurement of residual breast cancer burden to predict survival after neoadjuvant chemotherapy" Journal of Clinical Oncology, 2007. 25(28): 4414-4422.
Szabo, T., et al., "Diagnostic Ultrasound Imaging: inside out," 2014.
Tam, A. C., "Applications of photoacoustic sensing techniques," Reviews of Modern Physics, vol. 58, No. 2, Apr. 1986, pp. 381-431.
Tanter, M., et al., "Ultrafast Imaging in Biomedical Ultrasound," IEEE, 2014, vol. 61 (1), pp. 102-119.
Tay, et al., "Magnetic Particle Imaging Guided Heating In Vivo using Gradient Fields For Arbitrary Localization of Magnetic Hyperthermia Therapy" ACS Nano. 12(4), Apr. 24, 2018, pp. 3699-3713. doi:10.1021/acsnano.8b00893.
Tearney, et al., "Scanning single-mode fiber optic catheter-endoscope for optical coherence tomography" Optics Letters, 21(7): 543-545 (1996).
The International Search Report and The Written Opinion of the International Searching Authority, Sep. 22, 2011 , from related application No. PCT/US2011/022253, 6 pgs.
The International Search Report and The Written Opinion of the International Searching Authority, or the Declaration, for PCT/US2009/061435, dated Mar. 29, 2010, 6 pages.
The International Search Report and Written Opinion dated Mar. 27, 2014 issued in Application No. PCT/US2013/065594.
Tran, et al., "In vivo endoscopic optical coherence tomography by use of a rotational microelectromechanical system probe" Optics Letters, 29(11): 1236-1238 (2004).
Treeby B. E., et al., "Photoacoustic Tomography in Absorbing Acoustic Media Using Time Reversal," Inverse Problems, Sep. 24, 2010, vol. 26(11), 2010.
Treeby, et al., "Advanced photoacoustic image reconstruction using the k-Wave toolbox," in Photons Plus Ultrasound: Imaging and Sensing 2016, 2016, vol. 9708, p. 97082P.
Treeby, et al., "k-Wave: MATLAB toolbox for the simulation and reconstruction of photoacoustic wave fields," J. Biomed. Opt., vol. 15, No. 2, Mar./Apr. 2010, pp. 021314.
Tu, et al., "Self-propelled supramolecular nanomotors with temperature-responsive speed regulation," Nat. Chem. 9, 480 (2016).
Tzoumas, et al., "Eigenspectra optoacoustic tomography achieves quantitative blood oxygenation imaging deep in tissues," Nat. Commun., vol. 7, 2016, pp. 1-10.
U.S. Appl. No. U.S. Appl. No. 63/153,736, inventors Yang et al., filed on Feb. 25, 2021.
U.S Corrected Notice of Allowance dated Apr. 27, 2022 in U.S. Appl. No. 16/540,936.
U.S. Corrected Notice of Allowance dated Jun. 2, 2022 In U.S. Appl. No. 16/806,796.
U.S. Corrected Notice of Allowance dated Nov. 14, 2022 in U.S. Appl. No. 16/540,936.
U.S. Corrected Notice of Allowance dated Oct. 26, 2022 in U.S. Appl. No. 16/560,680.
U.S. Corrected Notice of Allowance dated Sep. 19, 2023, in U.S. Appl. No. 17/090,752.
U.S. Ex Parte Quayle Action dated Dec. 13, 2021 in U.S. Appl. No. 16/611,939.
U.S. Final office Action dated Jan. 27, 2023 in U.S. Appl. No. 16/798,204.
U.S. Final office Action dated Jun. 20, 2023 in U.S. Appl. No. 17/302,313.
U.S. Final office Action dated Jun. 26, 2023 in U.S. Appl. No. 17/090,752.
U.S. Final Office Action dated Sep. 25, 2023, in U.S. Appl. No. 17/302,041.
U.S. Non Final Office Action dated Aug. 26, 2022 in U.S. Appl. No. 17/302,313.
U.S. Non-Final Office Action dated Aug. 14, 2023, in U.S. Appl. No. 16/798,204.
U.S. Non-Final office Action dated Dec. 21, 2022 in U.S. Appl. No. 17/090,752.
U.S. Non-Final office Action dated Jan. 23, 2023 in U.S. Appl. No. 17/302,313.
U.S. Non-Final Office Action dated Mar. 20, 2023 in U.S. Appl. No. 17/302,041.
U.S. Non-Final Office Action dated May 2, 2022 in U.S. Appl. No. 16/798,204.
U.S. Non-Final Office Action dated Oct. 20, 2023, in U.S. Appl. No. 16/946,496.
U.S Notice of Allowance dated Apr. 19, 2022 in U.S. Appl. No. 16/540,936.
U.S. Notice of Allowance dated Aug. 5, 2022 in U.S. Appl. No. 16/540,936.

(56) References Cited

OTHER PUBLICATIONS

U.S. Notice of Allowance dated Dec. 22, 2022 in U.S. Appl. No. 16/611,939.
U.S. Notice of Allowance dated Feb. 23, 2022 in U.S. Appl. No. 16/806,796.
U.S. Notice of Allowance dated Jan. 26, 2023 in U.S. Appl. No. 16/560,680.
U.S. Notice of Allowance dated Oct. 19, 2022 in U.S. Appl. No. 16/560,680.
U.S. Notice of Allowance dated Sep. 7, 2022 in U.S. Appl. No. 16/611,939.
U.S. Notice of Allowance dated Sep. 7, 2023, in U.S. Appl. No. 17/090,752.
U.S. Notice of Allowance dated Sep. 13, 2023 in U.S. Appl. No. 17/302,313.
U.S. Office Action dated Apr. 7, 2022, in U.S. Appl. No. 16/560,680.
U.S. Appl. No. 18/336,834, inventors Zhang et al., filed Jun. 16, 2023.
U.S. Appl. No. 18/450,597, inventors Hu P, et al., filed Aug. 16, 2023.
U.S. Requirement for Restriction dated Oct. 29, 2021 in U.S. Appl. No. 16/560,680.
U.S Restriction requirement dated Aug. 9, 2023 in U.S. Appl. No. 16/946,496.
U.S. Restriction Requirement dated Dec. 15, 2022 in U.S. Appl. No. 17/302,041.
Van Essen, et al., "An Integrated Software Suite for Surface-based Analyses of Cerebral Cortex" Journal of the American Medical Informatics Association, vol. 8, No. 5, Sep./Oct. 2001, pp. 443-459.
Velasco, E., "Ultrafast Camera Takes 1 Trillion Frames Per Second of Transparent Objects and Phenomena" [Webpage] Caltech, California Institute of Technology, Jan. 17, 2020, pp. 1-2. URL:https://www.eurekalert.org/pub_releases/2020-01/ciot-uct012120.php.
Viator et al., "Design testing of an endoscopic photoacoustic probe for determination of treatment depth after photodynamic therapy" Proceedings of SPIE in Biomedical Optoacoustics II, 4256: 16-27 (2001).
Vilela, et al., "Medical imaging for the tracking of micromotors," ACS Nano 12, (2018) pp. 1220-1227.
Wang, B. et al., "Recent progress on micro- and nano-robots: towards in vivo tracking and localization" Quantitative Imaging in Medicine and Surgery, 2018, vol. 8, No. 5, pp. 461-479. DOI: 10.21037/qims.2018.06.07.
Wang, et al., "Ballistic 2-D Imaging Through Scattering Walls Using an Ultrafast Opical Kerr Gale," Science, vol. 253, Aug. 16, 1991, pp. 769-771.
Wang et al., "Biomedical optics: principles and imaging," Section 12.5; Photoacoustic Tomography, John Wiley & Sons (2012) pp. 288-290.
Wang, et al., "Biomedical Optics, Principles and Imaging," Wiley-Interscience, A John Wiley & Sons, Inc., (2007) p. 7.
Wang, et al., "Fabrication of micro/nanoscale motors" Chem. Rev. 115, (2015) pp. 8704-8735.
Wang, et al., "Intravascular Photoacoustic Imaging" IEEE J Quantum Electronics, 16(3): 588-599 (2010).
Wang, et al., "MCML—Monte Carlo modeling of light transport in multi-layered tissues" Computer Methods and Programs in Biomedicine, vol. 47, No. 2, Jul. 1995, pp. 131-146.
Wang, et al., "Nano/microscale motors: biomedical opportunities and challenges," ACS Nano 6, (2012) pp. 5745-5751.
Wang et al., "Noninvasive photoacoustic angiography of animal brains in vivo with near-infrared light and an optical contrast agent" Optics Letters, 29(7): 730-732 (2004).
Wang et al., "Three-dimensional laser-induced photoacoustic tomography of mouse brain with the skin and skull intact," Optics Letters, 28(19): 1739-1741 (2003).
Wang, K. et al., "Investigation of iterative image reconstruction in three-dimensional optoacoustic tomography," Phys. Med. Biol., vol. 57, No. 17, 2012, p. 5399-5423.
Wang, L., et al., "Biomedical optics: principles and imaging," 2012.
Wang, L et al., "Grueneisen relaxation photoacoustic microscopy," Physical Review Letters 113 174301 (Oct. 24, 2014).
Wang, L., et al., "Single-cell label-free photoacoustic flowoxigraphy in vivo," Proceedings of the National Academy of Sciences 110(15) 5759-5764 (Apr. 9, 2013).
Wang, L., et al., "Photoacoustic Tomography: Ultrasonically Breaking Through the Optical Diffusion Limit," Optics in the Life Sciences, 2011.
Wang, L., et al., "Tutorial on Photoacoustic Microscopy and Computed Tomography," IEEE Journal of Selected Topics in Quantum Electronics, 2008, vol. 14(1), pp. 171-179.
Wang, L., et al., "Ultrasonically encoded photoacoustic flowgraphy in biological tissue," Physical Review Letters 111(20), 204301 (Nov. 15, 2013).
Wang, L. V & Yao, J., "A practical guide to photoacoustic tomography in the life sciences," Nat. Methods 13, 627-638 (Jul. 28, 2016).
Wang, L. V.; "Mechanisms of ultrasonic modulation of multiply scattered coherent light: an analytic model," Physical Review Letters 87(4) 043903-(1-4) (Jul. 23, 2001).
Wang, L. V., "Multiscale photoacoustic microscopy and computed tomography," Nat. Photon. 3, 503-509 (Aug. 29, 2009).
Wang, L. V.; "Prospects of photoacoustic tomography," Medical Physics 35(12), Nov. 19, 2008, pp. 5758-5767.
Wang, L.V., Hu, S. "Photoacoustic Tomography: in vivo imaging from organelles to organs," Science 335, 1458-1462 (Mar. 23, 2012).
Wang, X. D., et al., "Noninvasive laser-induced photoacoustic tomography for structural and functional in vivo imaging of the brain," Nature Biotechnology 21(7) 803-806 (Jul. 2003).
Weigert, Martin, et al., "Content-aware image restoration: pushing the limits of fluorescence microscopy" Nature methods, 2018. 15(12): 1090-1097.
Wetzel, et al., "Imaging molecular chemistry with infrared microscopy," Science, New Series, vol. 285, No. 5431, Aug. 20, 1999, pp. 1224-1225.
White D.N., et al., "Effect of Skull in Degrading the Display of Echoencephalographic Band C Scans," The Journal of the Acoustical Society of America, Nov. 1968, vol. 44(5), pp. 1339-1345.
Wiedeman, M., et al., "Dimensions of Blood Vessels From Distributing Artery to Collecting Vein," Circulation research, 1963, vol. 12(4), pp. 375-378.
Won, R., et al., "Mapping Blood Flow," Nature Photonics, 2011, p. 393-393.
Wong, et al., "Label-free automated three-dimensional imaging of whole organs by microtomy-assisted photoacoustic microscopy," Nature Communications 8(1) 1386 (2017), pp. 1-8.
Wong, T. et al., "Fast label-free multilayered histology-like imaging of human breast cancer by photoacoustic microscopy," Sci. Adv. 3, 1602168 (May 17, 2017).
Wu, D., et al., "In vivo Mapping of Macroscopic Neuronal Projections in the Mouse Hippocampus using High-resolution Diffusion MRI," Neuroimage 125, Jan. 15, 2016, pp. 84-93.
Wu, Yichen, et al., "Three-dimensional virtual refocusing of fluorescence microscopy images using deep learning" Nature methods, 2019. 16(12): 1323-1331.
Wu, Z., et al., "A microrobotic system guided by photoacoustic computed tomography for targeted navigation in intestines in vivo," Science Robotics 4(32) eaax0613 (Jul. 24, 2019).
Xia, J., et al., "Photoacoustic tomography: principles and advances," Electromagn. Waves 147, 1 (2014; available in PMC Jan. 30, 2015).
Xia, J., et al., "Wide-field two-dimensional multifocal optical-resolution photoacoustic-computed microscopy," Opt. Lett. 38(24), Dec. 15, 2013, pp. 5236-5239.
Xu, et al., "Exact frequency-domain reconstruction for thermoacoustic tomography-II: Cylindrical geometry," IEEE Trans. Med. Imaging, vol. 21, No. 7, (2002) pp. 829-833.
Xu, et al., "Photoacoustic Imaging in Biomedicine," Review of Scientific Instruments, American Institute of Physics, vol. 77 (2006) pp. 041101 1-22.
Xu, et al., "Rhesus monkey brain imaging through intact skull with thermoacoustic tomography," IEEE Trans. Ultrason. Ferroelectr. Freq. Control, vol. 53, No. 3, Mar. 2006, pp. 542-548.

(56) References Cited

OTHER PUBLICATIONS

Xu, et al., "Time reversal and its application to tomography with diffracting sources," Physical Review Letters 92(3) 033902-(1-4) (Jan. 23, 2004).

Xu et al.. "Time Reversal Ultrasound Modulated Optical Tomography Using a BSO Phase Conjugate Mirror," poster presented at SIPE Conference 7177 on Jan. 26, 2009, 1 page.

Xu, et al., "Time-domain reconstruction for thermoacoustic tomography in a spherical geometry," IEEE Transactions on Medical Imaging 21(7) 814-822 (Jul. 2002).

Xu M, et al., "Universal back-projection algorithm for photoacoustic computed tomography," Physical Review E 71(1) 016706-(1-7) (Jan. 19, 2005).

Xu, S., et al., "Thermal expansion of confined water," Langmuir 25, 5076-5083 (2009).

Xu, X. et al., "Time-reversed ultrasonically encoded optical focusing into scattering media," Nature Photonics 5(3) 154-157 (Jan. 16, 2011).

Yadlowsky, et al., "Multiple scattering in optical coherence microscopy" Applied Optics, vol. 34, No. 25 (1995) pp. 5699-5707. doi.org/10.1364/AO.34.005699.

Yamane, Yuki, et al., "A novel histopathological evaluation method predicting the outcome of non-small cell lung cancer treated by neoadjuvant therapy: the prognostic importance of the area of residual tumor" Journal of Thoracic Oncology, 2010. 5(1): 49-55.

Yan, et al., "Multifunctional biohybrid magnetite microrobots for imaging-guided therapy" Yan et al., Sci. Robot. 2, eaaq1155, Nov. 22, 2017, pp. 1-14.

Yang, et al., "Novel biomedical imaging that combines intravascular ultrasound (IVUS) and optical coherence tomography (OCT)" IEEE International Ultrasonics Symposium, Beijing, China, Nov. 2-5, 2008, pp. 1769-1772.

Yang, et al., "The grand challenges of science robotics," Science Robotics 3, Jan. 31, 2018, eaar7650, pp. 1-14.

Yang, et al., "Time-reversed ultrasonically encoded optical focusing using two ultrasonic transducers for improved ultrasonic axial resolution" Journal of Biomedical Optics 18(11), 110502 (Nov. 2013) pp. 110502-1-110502-4.

Yang, J. et al. Focusing light inside live tissue using reversibly switchable bacterial phy-tochrome as a genetically encoded photochromic guide star. Science Advances 5. eprint: https://advances.sciencemag.org/content/5/12/eaay1211.full.pdf. https://advances.sciencemag.org/content/5/12/eaay1211 (2019).

Yang, J., et al., "Motionless volumetric photoacoustic microscopy with spatially invariant resolution," Nature Communications 8(1) 780 (Oct. 3, 2017).

Yang, J. M. et al., "Simultaneous functional photoacoustic and ultrasonic endoscopy of internal organs in vivo," Nature Medicine 18(8) 1297-1303 (Aug. 2012).

Yang, "Optical coherence and Doppler tomography for monitoring tissue changes induced by laser thermal therapy-An in vivo feasibility study" Review of Scientific Instruments, vol. 74, No. 1, Jan. 2003, pp. 437-440.

Yao, D. et al., "Optimal ultraviolet wavelength for in vivo photoacoustic imaging of cell nuclei," Journal of Biomedical Optics, May 4, 2012, vol. 17, No. 5, p. 056004.

Yao, et al., "Absolute photoacoustic thermometry in deep tissue," Opt. Lett. 38, 5228-5231 (2013).

Yao, et al., "In vivo label-free photoacoustic microscopy of cell nuclei by excitation of DNA and RNA," Opt. Lett. 35, 4139-4141 (2010).

Yao, et al., "Monte Carlo simulation of an optical coherence tomography signal in homogeneous turbid media" Phys. Med. Biol. 44(9), Jul. 8, 1999, pp. 2307-2320.

Yao, et al., "Photoimprint photoacoustic microscopy for three-dimensional label-free sub-diffraction imaging," Physical Review Letters 112(1) 014302 (Jan. 10, 2014).

Yao, J. et al., "Double-illumination Photoacoustic Microscopy", Optics Letters, Feb. 15, 2012, vol. 37, No. 4, pp. 659-661.

Yao, J., et al., "Photoacoustic brain imaging: from microscopic to macroscopic scales," Neurophotonics, 2014, vol. 1(1), 13 Pages.

Yao, J., "Label-free Oxygen-metabolic Photoacoustic Microscopy in Vivo," Journal of biomedical optics, 2011, vol. 16(7).

Yao, L. et al., "High-speed label-free functional photoacoustic microscopy of mouse brain in action," Nat. Methods 12(5), 407-410 (May 12, 2015).

Yao, L. et al., "Multiscale photoacoustic tomography using reversibly switchable bacterial phytochrome as near-infrared photochromic probe," Nature Methods 13(1) 67-73 (Jan. 2016).

Yao, L. et al., "Photoacoustic microscopy: superdepth, superresolution, and superb contrast", IEEE Pulse 6, 34-7 (May 13, 2015).

Yaqoob, et al., "Methods and application areas of endoscopic optical coherence tomography" Journal of Biomedical Optics, 11(6): 063001.1-063001.19 (2006).

Yavuz, M. S., et al., "Gold nanocages covered by smart polymers for controlled release with near-infrared light," Nature Materials 8(12) 935-939 (Nov. 1, 2009).

Yin, et al., "Agarose particle-templated porous bacterial cellulose and its application in cartilage growth in vitro" Acta Biomater. 12, Jan. 2015, pp. 129-138. doi:10.1016/j.actbio.2014.10.019.

Yoa, J., et al., "In vivo Photoacoustic Tomography of Total Blood Flow and Potential Imaging of Cancer Angiogenesis and Hypermetabolism," Technology in Cancer Research and Treatment, 2012, vol. 11(4), pp. 301-307.

Yoa, J., et al., "Transverse Flow Imaging Based on Photoacoustic Doppler Bandwidth Broadening," Journal of Biomedical Optics, 2010, vol. 15(2), 5 Pages.

Yodh et al., "Functional Imaging with Diffusing Light" Biomedical Photonics Handbook, 2003, Ch. 21, p. 45, CRC Press, Boca Raton.

Yodh, et al. "Spectroscopy and Imaging with Diffusing Light" Physics Today 48(3), Mar. 1995, pp. 34-40.

Zangabad, R., et al., "Photoacoustic Flow Velocity Imaging Based on Complex Field Decorrelation," Photoacoustic, 2021,8 pages.

Zeff, et al., "Retinotopic mapping of adult human visual cortex with high-density diffuse optical tomography" PNAS, vol. 104, No. 29, Jul. 17, 2007, pp. 12169-12174.

Zemp, et al., "Realtime photoacoustic microscopy in vivo with a 30MHZ ultrasonic array transducer" Optics Express, 16(11): 7915-7928 (2008).

Zeniieh, D., et al., Parylene-C as High Performance Encapsulation Material for Implantable Sensors, Procedia Engineering, 2014, vol. 87, pp. 1398-1401. https://doi.org/10.1016/j.proeng.2014.11.704.

Zhang, C., et al., "Coherent Raman scattering microscopy in biology and medicine," Annu. Rev. Biomed. Eng. 17, 415-445 (2015).

Zhang, D. et al., "Depth-resolved mid-infrared photothermal imaging of living cells and organisms with submicrometer spatial resolution," Sci. Adv. 2, el600521 (2016).

Zhang, et al., "Intrinsic Functional Relations Between Human Cerebral Cortex and Thalamus" Journal of Neurophysiology, vol. 100, No. 4, Oct. 2008, pp. 1740-1748.

Zhang, H. F. et al., "Functional photoacoustic microscopy for high-resolution and noninvasive in vivo imaging," Nature Biotechnology 24(7) 848-851 (Jul. 2006).

Zhang, H. F. et al., "In vivo imaging of subcutaneous structures using functional photoacoustic microscopy," Nature Protocols 2(4) 797-804 (Apr. 5, 2007).

Zhang, Y., et al., "Transcranial Photoacoustic Computed Tomography of Human Brain Function," Arxiv, 2022, pp. 1-12.

Zhang, Y., et al., Ultrafast Ultrasound Imaging With Cascaded Dual-polarity Waves, IEEE, 2018, vol. 37(4), pp. 906-917.

Zharov, et al., " In vivo photoacoustic flow cytometry for monitor of circulating single cancer cells and contrast agents," Optics Letters, 31(24): 3623-3625 (2006).

Zheng, G., et al., "Microscopy refocusing and dark-field imaging by using a simple LED array," Optics Letters, vol. 36, No. 20, Oct. 15, 2011, pp. 3987-3989. doi: 10.1364/OL.36.003987.

Zheng. G, et al., "Wide-field, high-resolution Fourier ptychographic microscopy," Nature Photonics, vol. 7(9), Published Online Jul. 28, 2013, pp. 739-745. doi:10.1038/NPHOTON.2013.187.

Zhou, et al., "Tutorial on photoacoustic tomography," J. Biomed. Opt., vol. 21, No. 6, Jun. 2016, pp. 061007-1-061007-14.

(56) References Cited

OTHER PUBLICATIONS

Zou, et al., "BOLD responses to visual stimulation in survivors of childhood cancer" NeuroImage, vol. 24, No. 1, Jan. 1, 2005, pp. 61-69.

English Machine Translation of JP 2010-40161 A. (Year: 2019).

EP Office Action dated May 26, 2025, in Application No. EP19857631.6.

Na, Shuai, and Lihong V. Wang. "Photoacoustic computed tomography for functional human brain imaging." Biomedical Optics Express 12.7 (2021): 4056-4083.

Office Action (Non-Final Rejection) dated May 5, 2025 for U.S. Appl. No. 18/336,834 (pp. 1-34).

Office Action (Non-Final Rejection) dated May 21, 2025 for U.S. Appl. No. 18/633,290 (pp. 1-11).

Office Action (Notice of Allowance and Fees Due (PTOL-85)) dated May 20, 2025 for U.S. Appl. No. 17/302,041 (pp. 1-5).

Parseval equality, Encyclopedia of Mathematics, retrieved on 2024-10-03, 4 pages, Retrieved from Internet: URL: http://encyclopediaofmath.org/index.php?title=Parseval_equality&oldid=54876.

Rosenthal A., et al., "Acoustic Inversion in Optoacoustic Tomography: A Review," Current Medical Imaging Reviews, 2013, vol. 9 (4), pp. 318-336.

Shannon, "Communication in the Presence of Noise," in Proceedings of the IRE, vol. 37, No. 1, pp. 10-21, Jan. 1949.

U.S. Appl. No. 18/638,327, inventor Yang C, filed Apr. 17, 2024.

U.S. Appl. No. 16/540,936, inventors Wang et al., filed Aug. 14, 2019.

U.S. Appl. No. 16/560,680, inventors Wang et al., filed Sep. 4, 2019.

U.S. Appl. No. 16/611,939, inventors Wang et al., filed Nov. 8, 2019.

U.S. Appl. No. 16/798,204, inventors Wang et al., filed Feb. 21, 2020.

U.S. Appl. No. 16/806,796, inventors Wang et al., filed Mar. 2, 2020.

U.S. Appl. No. 16/946,496, inventors Gao et al., filed Jun. 24, 2020.

U.S. Appl. No. 17/090,752, inventors Wang et al., filed Nov. 5, 2020.

U.S. Appl. No. 17/302,041, inventors Wang et al., filed Apr. 22, 2021.

U.S. Appl. No. 17/302,313, inventors Wang et al., filed Apr. 29, 2021.

U.S. Appl. No. 62/718,777, inventors Wang et al., filed Aug. 14, 2018.

U.S. Corrected Notice of Allowance dated Dec. 12, 2024 in U.S. Appl. No. 17/652,667.

U.S. Final Office Action dated Feb. 20, 2025 in U.S. Appl. No. 18/336,834.

U.S. Final Office Action dated Mar. 28, 2025 in U.S. Appl. No. 16/798,204.

U.S. Non-Final Office Action dated Dec. 17, 2024 in U.S. Appl. No. 16/946,496.

U.S. Non-Final Office Action dated Mar. 14, 2025 in U.S. Appl. No. 18/450,597.

U.S. Notice of Allowance dated Feb. 14, 2025 in U.S. Appl. No. 17/302,041.

U.S. Appl. No. 17/652,667, Inventors Yang et al., filed Feb. 25, 2022.

U.S. Appl. No. 18/336,863, inventors Garrett D C, et al., filed Jun. 16, 2023.

U.S. Appl. No. 18/410,842, inventor Wang L, et al., filed Jan. 11, 2024.

U.S. Appl. No. 18/633,290, inventor Zhang Y, filed Apr. 11, 2024.

U.S. Appl. No. 18/970,827, inventors Yang C et al., filed Dec. 5, 2024.

\* cited by examiner

THREE-DIMENSIONAL CONTOURED SCANNING PHOTOACOUSTIC IMAGING AND VIRTUAL STAINING

CROSS-REFERENCES TO RELATED APPLICATIONS

This application claims priority to and the benefit of U.S. Provisional Patent Application No. 63/234,080, titled "Label-Free Three-Dimensional Contoured scanning Ultraviolet Photoacoustic Microscopy For Inoperative Diagnosis" and filed on Aug. 17, 2021, which is hereby incorporated by reference in its entirety and for all purposes.

FEDERALLY SPONSORED RESEARCH OR DEVELOPMENT

This invention was made with government support under Grant No. EB028277 awarded by National Institute of Health (NIH). The government has certain rights in the invention.

FIELD

Certain aspects pertain generally to photoacoustic imaging, and more particularly to methods and systems that implement three-dimensional contoured scanning photoacoustic imaging and/or virtual staining that can be employed in applications such as, for example, pathology.

BACKGROUND

Approximately 18.1 million new cancer cases were diagnosed worldwide in 2018, and the number of new cancer cases per year is expected to rise to 29.5 million, with 9.6 million cancer-related deaths by 2040 as discussed in "World Health Organization Global Cancer Observatory," Retrieved from Internet <http://gco.iarc.fr/today/home> [Retrieved May 19, 2021]. Despite advances in cancer treatment, surgery remains the cornerstone, and more than 80% of cancer patients have a surgical procedure at some point as discussed in Wyld, L., Audisio, R. A. & Poston, G. J., "The evolution of cancer surgery and future perspectives, Nat Rev Clin Oncol 12, 115-124 (2015) and Sullivan, R. et al., "Global cancer surgery: delivering safe, affordable, and timely cancer surgery," The Lancet Oncology 16, 1193-1224 (2015).

In oncology surgery, intraoperative pathology provides surgical guidance and identification of tumor margin as discussed in, for example, Mahe, E. et al., "Intraoperative pathology consultation: error, cause and impact," *Can J Surg* 56, E13-E18 (2013). The border of the removed tumor tissue is often examined by intraoperative frozen section to ensure negative margins, meaning normal tissue surrounding the resected tumor as discussed in DiNardo, L. J., Lin, J., Karageorge, L. S. & Powers, C. N., "Accuracy, utility, and cost of frozen section margins in head and neck cancer surgery," *Laryngoscope* 110, 1773-1776 (2000). Most localized tumors with negative margin resection show much better outcomes and a lower chance of tumor recurrence. The intraoperative evaluation of tumor margin allows confirmation of complete tumor resection before oncology surgeons close the surgical wound and helps patients avoid an additional tumor resection surgery.

SUMMARY

Certain aspects pertain to three-dimensional (3D) contoured scanning photoacoustic imaging and/or virtual staining methods, apparatus, and systems.

In one aspect of the present disclosure, a three-dimensional contoured scanning photoacoustic apparatus is disclosed. In some embodiments, the three-dimensional contoured scanning photoacoustic apparatus includes: an optical system configured to direct at least a first portion of a pulsed laser beam to a specimen being imaged; an ultrasonic transducer device configured to detect one or more photoacoustic signals induced by the at least the first portion of the pulsed laser beam; and a three-dimensional contour scanner configured to scan the specimen and/or the ultrasonic transducer device to compensate in real-time for three-dimensional contour in a surface of the specimen using time of flight data of the one or more photoacoustic signals.

In another aspect of the present disclosure, a photoacoustic method is disclosed. In some embodiments, the photoacoustic method is a three-dimensional contoured scanning photoacoustic method, which includes real-time three-dimensional contoured photoacoustic scanning of a surface of a specimen using time of flight data.

In another aspect of the present disclosure, a method of virtually staining one or more histology images is disclosed. In some embodiments, the method includes: training a first machine learning model; inputting, to the trained first machine learning model, a second histology image obtained using a first histological technique; and generating, using the trained first machine learning model, a virtually stained histology image based on the second histology image, the virtually stained histology image having a characteristic of the second histological technique.

In some variants, the training of the first machine learning model is performed by: inputting a first histology image obtained using the first histological technique to the first machine learning model to generate a first predicted image having a characteristic of a second histological technique; inputting the first predicted image to a second machine learning model configured to generate a second predicted image having a characteristic of the first histological technique; and based on an error associated with the first histology image and the second predicted image, updating one or both of the first machine learning model or the second machine learning model.

In another aspect of the present disclosure, a method for virtually staining a photoacoustic histology image is disclosed. In some embodiments, the method includes generating a virtually stained histology image using a first generative adversarial network trained to predict, from the photoacoustic histology image, a stained histology image having a characteristic of hematoxylin and eosin staining, the virtually stained histology image having the characteristic of hematoxylin and eosin staining.

These and other features are described in more detail below with reference to the associated drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
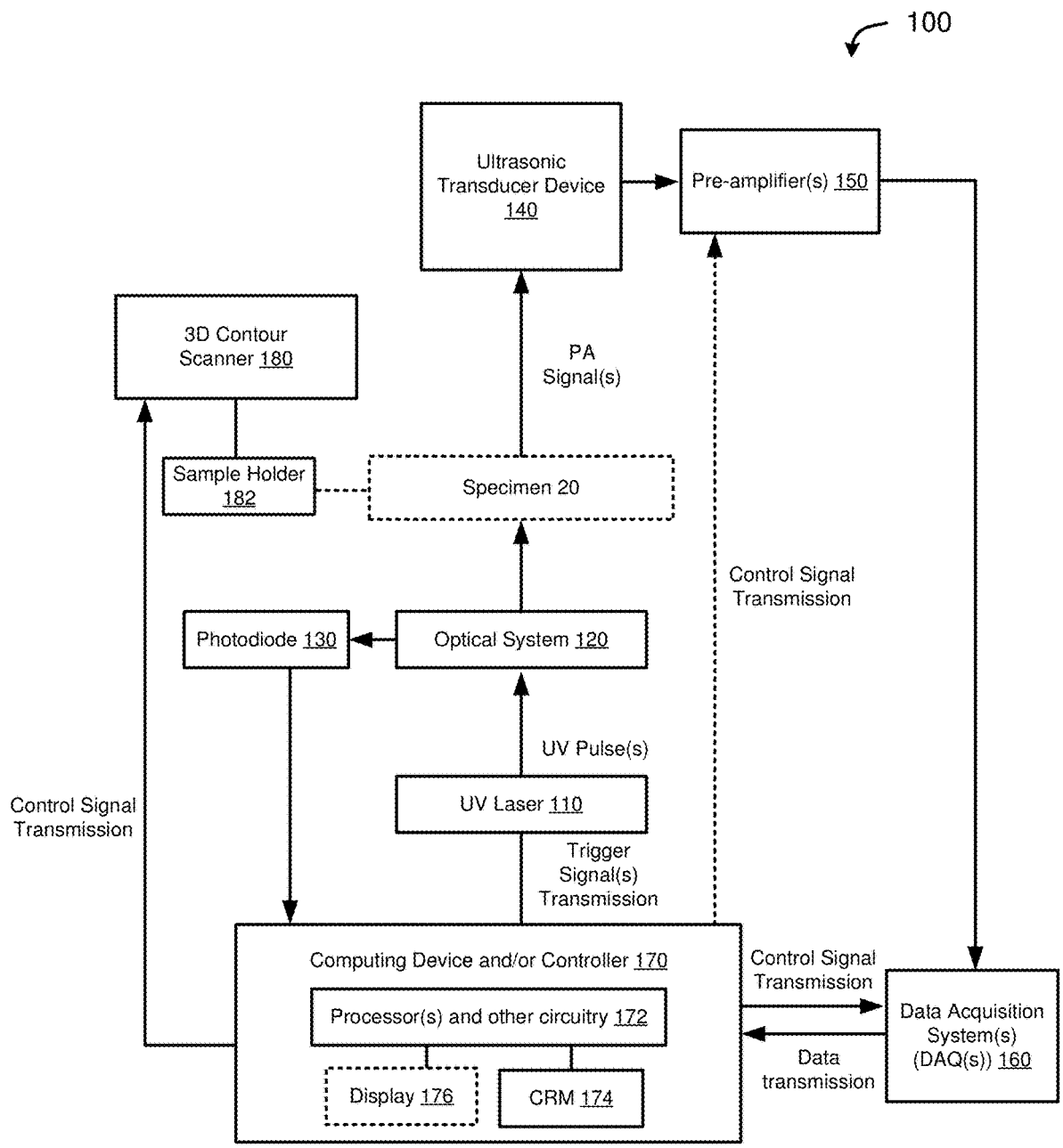
FIG. 1 is a block diagram of components of an example of a 3D contoured scanning ultraviolet photoacoustic imaging (UV-PAM) system, according to various embodiments.

The figures and components therein may not be drawn to scale. Various components of the figures described herein may not be drawn to scale.

DETAILED DESCRIPTION

Different aspects are described below with reference to the accompanying drawings. The features illustrated in the drawings may not be to scale. In the following description, numerous specific details are set forth in order to provide a thorough understanding of the presented implementations. The disclosed implementations may be practiced without one or more of these specific details. In other instances, well-known operations have not been described in detail to avoid unnecessarily obscuring the disclosed implementations. While the disclosed implementations will be described in conjunction with the specific implementations, it will be understood that it is not intended to limit the disclosed implementations.

I. Introduction

To provide intraoperative pathological examination and guide tumor resection, oncology surgeons currently use the frozen section technique, which typically takes a small portion of tissue and freezes the tissue in a cryostat machine. The frozen tissue is then cut into thin sections (5-8 µm) using a microtome or cryostat and is stained for direct examination under a microscope. The need for sectioning the specimen into thin slices prevents this technique from being used on hard tissues and may also cause inevitable tissue loss. For instance, the intraoperative diagnosis of calcified bone (e.g., cortical bone and calcified tumors) cannot be evaluated by the frozen section technique due to ossification. It is almost impossible to directly cut undecalcified bone tissue into slices thin enough for traditional pathological examination. The original bone tissue must instead undergo a decalcification process that can take up to several days, which may introduce artifacts if under-decalcified or over-decalcified. Moreover, the procedures for acquiring pathological diagnosis of the calcified bone requires highly trained specialists and are labor-intensive and time-consuming.

The lack of intraoperative pathological diagnosis techniques, particularly for bone tissue, has been a long-standing challenge. For orthopedic oncologists resecting primary bone tumors, the need for time-consuming decalcification procedures can mean that no adequate pathological analysis during the operation. Thus, surgeons tend toward wider margins based on pre-surgical imaging of bone tumors rather than intraoperative tissue analysis. Although wider margins are desirable for local tumor control, the functional loss can be much greater if those margins include vital structures such as tendons, nerves, blood vessels, or joints. Many surgeons use 2 centimeters as the ideal bony margin and measure this off the pre-operative imaging, while a meta-analysis performed in 2019 showed that a 2 millimeter margin is sufficient to avoid local recurrence as discussed in Gomez-Brouchet, A. et al., "Assessment of resection margins in bone sarcoma treated by neoadjuvant chemotherapy: Literature review and guidelines of the bone group (GROUPOS) of the French sarcoma group and bone tumor study group (GSF-GETO/RESOS)," *Orthopaedics & Traumatology: Surgery & Research* 105, 773-780 (2019).

Since calcified primary bone tumors, such as osteosarcoma, present most commonly in a periarticular location, 1.8 centimeters of margin difference could lead to joint salvage, increased patient bone stock for any future surgery needed, and less morbidity. A modality that allows for fast, accurate intraoperative bony margin analysis would be an invaluable tool in limb-salvage surgery. In recent years, rapid developments of imaging techniques have revolutionized many biological and biomedical areas as well as pathology. Multiple fluorescence microscopy methods have been demonstrated for diagnostic imaging, including confocal microscopy, wide-field structured-illumination microscopy (SIM), light-sheet microscopy, and microscopy with UV surface excitation (MUSE). However, these fluorescence microscopy techniques require dye staining of the specimen to provide image contrast, which involves complicated and different additional procedures for various samples prior to imaging and needs highly experienced personnel. Some label-free optical imaging techniques have been developed for intraoperative pathological diagnoses, such as stimulated Raman scattering microscopy and coherence tomography/microscopy (OCT/OCM). However, these techniques require a flat surface within the field of view (FOV) to ensure that the imaging plane is located around the optical focal plane for high-resolution imaging. Flatness is difficult to achieve in calcified bone tumors resected during operation, as cutting hard and calcified bone inevitably leads to rough surfaces.

Generally speaking, the intraoperative pathologic examination of bone is challenging for orthopedic oncologists due to the difficulty of performing bone frozen sections. The calcification of bone tissue prevents smooth slicing of the specimen, while the time-consuming decalcification process can take up to 7 days. Orthopedic oncologists can use pre-operative computed tomography (CT) scans or magnetic resonance imaging (MRI) to identify the bony edge of resection. However, CT scans and MRI do not allow accurate diagnosis or intraoperative confirmation of tumor margins, leading to wider bone margins in bony sarcomas (typically 2 cm from the tumor). Depending on the anatomic location, a wide margin in multiple directions can potentially lead to significant functional morbidity.

Certain techniques disclosed herein relate generally to 3D contoured scanning ultraviolet photoacoustic imaging (UV-PAM) systems and methods. UV-PAM techniques can be used to image rough contoured surfaces of unprocessed thick samples like bone, which can be challenging for traditional histological techniques. UV-PAM systems include a 3D contoured scanner that enables scanning the specimen with real-time contour compensation based on time-of-flight information of photoacoustic signals. The 3D contoured scanner may be employed to generate consistent and optical diffraction-limited resolution within a full field of view (FOV) of the specimen being imaged, which does not require prior knowledge of sample surface profiles. UV-PAM techniques use ultraviolet (UV) light to illuminate the surface of the specimen being imaged. While penetration depth of UV light depends on the type of the specimen, for some bone specimens, the penetration of UV light is generally less than acoustical resolution so that no deep photoacoustic signal is generated and mixed with surface signals, which allows for direct imaging of the surfaces. Various embodiments described herein include devices, systems, methods, processes, and the like. UV-PAM techniques may be used to, for example, provide real-time 3D contoured scanning of unprocessed thick samples.

Certain techniques disclosed herein relate generally to methods of virtual staining one or more grayscale images (also sometimes referred to herein as "virtual staining methods"). The virtual staining methods may be deep-learning-based employing, for example, unsupervised or supervised deep learning techniques. The virtual staining methods may be used to perform virtual staining (e.g., virtual Hematoxylin and Eosin (H&E) staining) of grayscale histological images that can provide a pathologist with complementary contrast and help interpret the images. In some implementations, virtual staining methods that employ unsupervised deep learning techniques may be used. Different from supervised deep learning, as might use generational adversarial networks (GANs), an unsupervised deep learning based virtual staining method may be based on cycle consistent generational adversarial networks (CycleGANs) that do not require coupled pairs of stained and unstained images. This avoids the need for well-aligned UV-PAM and stained images for neural network training, which can be challenging to acquire due to artifacts caused by sample preparation induced morphology changes.

Certain techniques disclosed herein relate generally to 3D contoured scanning ultraviolet photoacoustic imaging (UV-PAM) methods and systems that employ virtual staining. These UV-PAM techniques may be used as, for example, a tool for label-free (e.g., no physical staining) intraoperative diagnosis of challenging tissues such as thick calcified bone specimens. For example, these UV-PAM techniques may be used to perform label-free imaging and intraoperative diagnosis of thick unprocessed bone, which requires minimal tissue preparation. The capability of these UV-PAM techniques to image a non-sectioned bone specimen allows for direct visualization of well-preserved structure and composition of calcifications, which could potentially make these UV-PAM techniques an ideal tool for intraoperative pathological diagnosis. Since these UV-PAM techniques can perform label-free photoacoustic (PA) histology of bone that avoids the need for excessive tissue processing (i.e., decalcification and sectioning) and H&E staining, these techniques can be employed to perform rapid intraoperative diagnoses of unprocessed bone specimens, which may improve orthopedic oncology surgery. Moreover, since no physical sectioning is needed, it does not need highly specific trained technicians for bone specimen preparation and the undestructed bone specimen can be further examined by other techniques after UV-PAM imaging.

II. 3D Contoured Scanning Ultraviolet Photoacoustic Imaging (UV-PAM) Systems

FIG. 1 is a block diagram of components of an example of a 3D contoured scanning ultraviolet photoacoustic imaging (UV-PAM) system 100, according to various embodiments. UV-PAM system 100 includes an ultraviolet (UV) laser 110 (e.g., a pulsed UV laser) that can generate a pulsed or modulated ultraviolet laser beam and an optical system 120 in communication with ultraviolet (UV) laser 110 to receive the pulsed or modulate ultraviolet laser beam. UV-PAM system 100 also optionally (denoted by dashed line) includes a specimen 20. It would be understood that in FIG. 1 and other illustrated examples, the UV-PAM system is shown during a 3D contoured scanning process where a specimen being imaged is located on a specimen receiving device of the UV-PAM system. At other instances such as during a virtual staining process, the UV-PAM system may not include the specimen. While FIG. 1 shows an example of components of UV-PAM 100, any number of these components may be included in UV-PAM 100, or any of the components may be omitted. For example, in some configurations, UV-PAM 100 may not include display 176. In alternative configurations, different or additional components may be included in UV-PAM 100.

Returning to FIG. 1, optical system 120 is also configured to propagate at least a portion of the pulsed or modulated ultraviolet light beam from UV laser 110 to specimen 20. UV-PAM system 100 also includes a photodiode 130 in communication with optical system 120. Optical system 120 is also configured to propagate at least a portion of the pulsed or modulated ultraviolet light beam from UV laser 110 to photodiode 130. Photodiode 130 is configured to take measurements of pulse energy of the pulsed or modulated ultraviolet light beam. The photodiode measurements may be used to compensate for pulse-to-pulse fluctuation.

UV-PAM system 100 also includes an ultrasonic transducer device 140 that may be coupled to or otherwise in acoustic communication with specimen 20 to receive one or more photoacoustic signals. In addition, UV-PAM system 100 includes one or more pre-amplifiers 150 in communication with ultrasonic transducer device 140 to adjust amplification of the one or more photoacoustic signals received from ultrasonic transducer device 140. UV-PAM system 100 also includes one or more data acquisition systems (DAQs) 160 in communication with one or more pre-amplifiers 150 to digitize and/or record the amplified photoacoustic signal(s).

UV-PAM system 100 also includes a 3D contoured scanner 180 for scanning specimen 20 and/or ultrasonic transducer device 140 to compensate in real-time for contour changes in the surface of the specimen 20 during a 3D contoured scanning process. For example, 3D contoured scanner 180 may scan specimen 20, by moving sample holder 182 with specimen 20 thereon, along a trajectory based on a profile surface curve of specimen 20 to specimen 20 at, or near, the focal plane of the ultrasonic transducer device 140. The profile surface curve may be determined in real-time from time-of-flight data of photoacoustic signal(s) detected by ultrasonic transducer device 140. 3D contoured scanner 180 includes, or is operatively coupled to, a sample holder 182 for receiving and holding specimen 20 during the 3D contoured scanning process. The 3D contoured scanner 180 may include, for example, a 3-axis motorized stage for moving the specimen 20 and/or ultrasonic transducer device 140 along three axes. In some cases, 3D contoured scanner 180 may be configured to maintain consistent lateral resolution within the field-of-view being imaged.

In various embodiments, a UV-PAM system includes a 3D contoured scanner (e.g., 3D contoured scanner 180 in FIG. 1 and 3D contoured scanner 280 in FIG. 2) that includes, or is operably coupled to, a sample holder for holding (e.g., mounting) the specimen during a 3D contoured scanning process. The 3D contoured scanner is configured to compensate in real-time for contour changes in the surface of the specimen using time-of-flight data of photoacoustic signal(s). For example, the 3D contoured scanner may scan the specimen along a trajectory corresponding to a surface profile curve of the specimen to keep the specimen at, or near, the focal plane of the ultrasonic transducer device. The surface profile curve of the specimen may be determined in real-time from time-of-flight data of photoacoustic signals detected by the ultrasonic transducer device during a two-dimensional scan of the specimen. The trajectory of the 3D contoured scanner may be determined in real time from compensation steps calculated from a difference between the focal length of the ultrasonic transducer device and the surface profile curve.

The 3D contoured scanner may include one or more devices for movement in three dimensions. Some examples of such devices include linear actuators, linear ball screw assemblies, linear stages, step motors, and motorized scanning stages. For example, in one implementation, the 3D contoured scanner includes a 3-axis motorized stage with three (3) step motors. An example of a step motor is PLS-85, PI Micos motor sold by GmbH. The 3D contoured scanner may implement a point moving average to generate a smooth scanning trajectory. For example, to try to avoid potential noise interference and remove outliers, at least a 100-point moving average may be used. Although some examples are described herein with respect to moving the specimen receiving device, in another implementation, 3D contoured scanner may move the ultrasonic transducer device and/or the specimen receiving device during the 3D contoured scanning process.

Returning to FIG. 1, UV-PAM system 100 also includes a computing device and/or a controller 170 having one or more processors or other circuitry 172, an optional display 176 in electrical communication with the processor(s) 172, and a computer readable medium (CRM) 174 in electronic communication with the processor(s) 172. The computing device may be, for example, a personal computer, an embedded computer, a single board computer (e.g. Raspberry Pi or similar), a portable computation device (e.g., tablet), a controller, or any other computation device or system of devices capable of performing the functions described herein. Computing device and/or controller 170 is in electronic communication with UV laser 110 to receive trigger signals that laser pulses have been sent or to transmit trigger signals to active UV laser 110. Computing device and/or controller 170 is also in electrical communication with DAQ(s) 160 to receive data transmissions and/or to send control signal(s). Optionally (denoted by dashed line), computing device and/or controller 170 is also in electronic communication with the one or more pre-amplifiers 150 to send control signal(s), e.g., to adjust amplification. The processor(s) 172 are in electrical communication with the CRM 174 to store and/or retrieve data such as the photoacoustic signal data. The processor(s) 172 are in electrical communication with optional display 176 to send display data. The electrical communication links between system components of UV-PAM system 100 may be in wired and/or wireless form. The electrical communication links may be able to provide power in addition to communicating signals in some cases.

Figure 2:
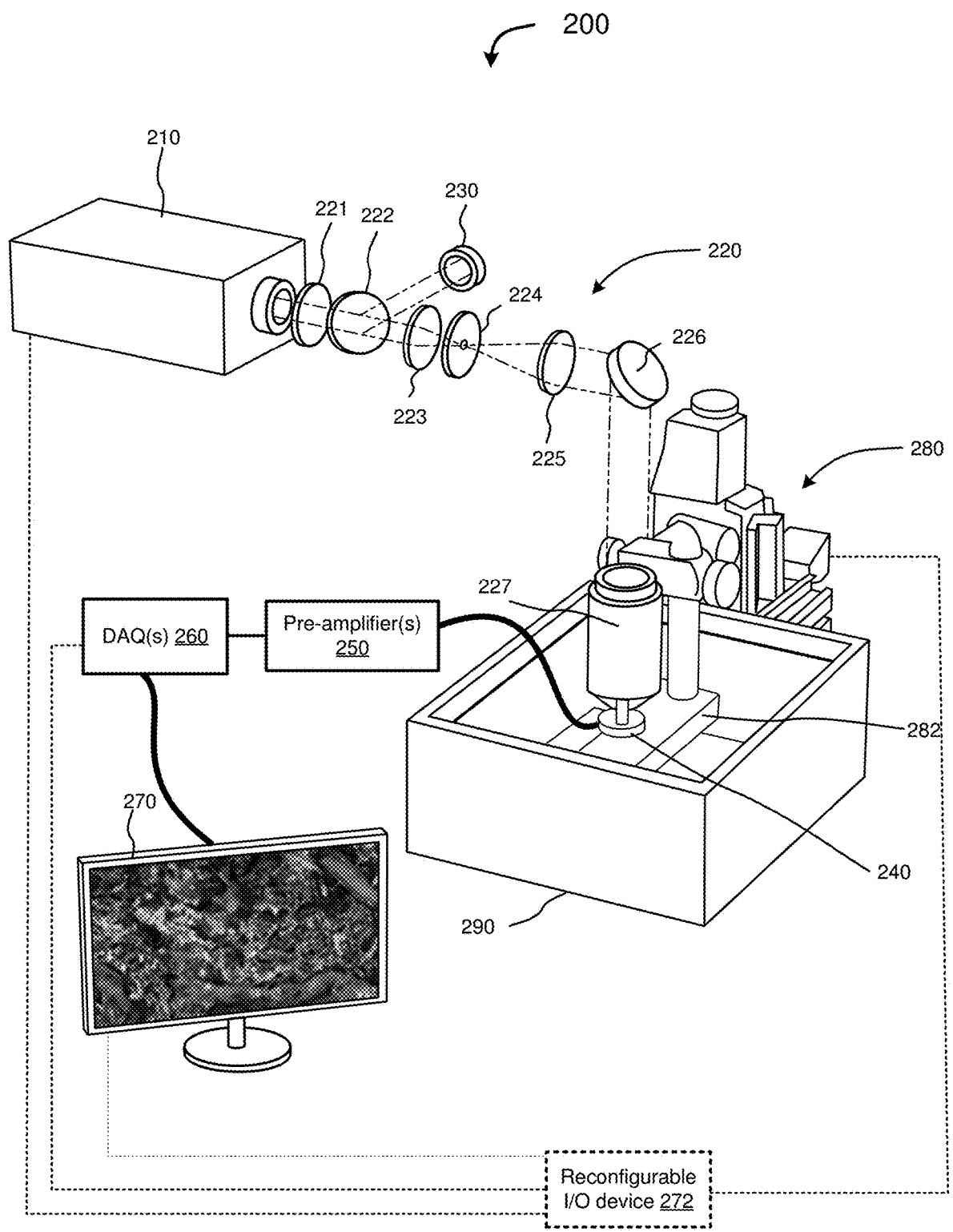
FIG. 2 is a schematic diagram of components of an example of a 3D contoured scanning ultraviolet photoacoustic imaging (UV-PAM) system, according to some embodiments.

According to certain implementations, UV-PAM system 100 is configured to operate in a reflection mode to, for example, image thick unprocessed biological samples. An example of a UV-PAM system configured to operate in reflection mode is shown in FIG. 2. In other implementations, such as a multichannel parallel imaging example with a microlens array, UV-PAM system 100 may be configured to operate in transmission mode.

According to various embodiments, a UV-PAM system includes an ultrasonic transducer device (e.g., ultrasonic transducer device 140 in FIG. 1 or ultrasonic transducer device 240 in FIG. 2) that may be acoustically coupled to the specimen during the 3D contoured scanning process. For example, an acoustic medium such as an acoustic gel, water, or other medium capable of conveying ultrasound pulses, is provided at least partially between the specimen being imaged and the ultrasonic transducer device. The ultrasonic transducer device may be acoustically coupled to the specimen to be able to detect photoacoustic waves induced by laser pulses. The ultrasonic transducer device may then sample the photoacoustic signal or photoacoustic signals. The detected photoacoustic signal(s) may be indicative of the optical absorption of the specimen by the UV laser pulses.

According to certain aspects, the ultrasonic transducer device includes a ring-shaped ultrasonic transducer with a central aperture. FIG. 2 includes an example of an ultrasonic transducer device 240 including a ring-shaped ultrasonic transducer (e.g., 42 MHz center frequency, 76%-6 dB two-way bandwidth) with a central aperture. This central aperture allows for confocal alignment of the optical and acoustic foci in reflection mode. The UV laser beam may pass through the central aperture for confocal alignment.

In some embodiments, the ultrasonic transducer device only includes, or uses, a single transducer element having a numerical aperture and a depth-of-field (DOF). In one implementation, an ultrasonic transducer device includes a single transducer element with a numerical aperture of about 0.16 and a DOF of about 9 μm, which corresponds to 6 ns ultrasound propagation for the speed of sound at 1500 m/s in room-temperature water. In other embodiments, the ultrasonic transducer device includes a plurality of transducer elements operable to collect multiple photoacoustic signals in parallel. For example, the ultrasonic transducer device may be in the form of an ultrasonic transducer array having an array of transducer elements (e.g., two-dimensional array or three-dimensional array). Each transducer element in the array has an aperture (e.g., a flat-rectangular aperture) with a height and a width or pitch. The width or pitch may be about 1.35 mm in one aspect. The width or pitch may be in a range of 1.20 mm to 1.50 mm in another aspect. The height may be about 5 mm in one aspect. The height may be in a range of 2 mm to 10 mm in another aspect.

During the 3D contoured scanning process, the specimen and the ultrasonic transducer device may be in contact with an acoustic medium. For example, the specimen and/or the ultrasonic transducer device may be at least partially immersed in the acoustic medium. For example, the UV-PAM system may include a tank at least partially filled with acoustic medium such as a water tank (e.g., water tank 190 in FIG. 2) in which the specimen and/or the ultrasonic transducer device are at least partially immersed in order make acoustic contact via the acoustic medium.

In various embodiments, a UV-PAM system includes an optical system (e.g., optical system 120 in FIG. 1 and optical system 220 in FIG. 2) for propagating and/or altering the pulsed or modulated ultraviolet beam from an ultraviolet (UV) laser and directing at least a portion of the beam to a specimen being imaged during a 3D scanning operation of the UV-PAM system. The optical system includes one or more optical components (e.g., lens(es), microlens arrays, optical filter(s), mirror(s), beam steering device(s), beam-splitter(s), beam sampler(s), optical fiber(s), pinhole(s), relay(s), and/or beam combiner(s)) that are configured to propagate and/or alter the UV beam.

In one embodiment, an UV-PAM system may employ multichannel parallel imaging to increase imaging speed. For example, multiple UV focal spots and an ultrasonic transducer device with an array of transducer elements may be implemented. For example, the UV-PAM system may include an optical system with a microlens array to create multiple focal spots. Given the generally limited numerical aperture and a short working distance of microlens arrays, this UV-PAM system may operate in the transmission mode.

In various embodiments, the UV-PAM system may include a photodiode (e.g., photodiode 130 in FIG. 1 or photodiode 230 in FIG. 2) for measuring pulse energy of one or more ultraviolet pulses generated by the UV laser. The pulse energy measured by the photodiode (e.g., photodiode 130 in FIG. 1 or photodiode 230 in FIG. 2) may be used to normalize the photoacoustic amplitude and compensate for the laser pulse fluctuation (pulse-to-pulse fluctuation compensation). An example of a photodiode that can be implemented is a Si photodiode such as the PDA36A photodiode sold by Thorlabs.

In various embodiments, the UV-PAM system may include an ultraviolet laser (e.g., UV laser 110 in FIG. 1 and UV laser 210 in FIG. 2) or other ultraviolet light source that can generate pulsed or modulated illumination. In certain implementations, the ultraviolet light source is in the form of a pulsed UV laser such as, for example, an Nd: YLF (neodymium-doped yttrium lithium fluoride) Q-switched 266 nm nanosecond pulsed laser such as, e.g., the QL266-010-O CrystaLaser® laser. In one aspect, the pulse repetition rate may be about 10 kHz. In another aspect, the pulse repletion rate may be about 50 kHz (e.g., with a RPMC laser). In yet another aspect, the pulse repetition rate may be up to 200 kHz, for example, with a customized RPMC. Although certain examples of UV-PAM systems are described herein with a single UV laser or other UV source, in other implementations, multiple UV lasers may be used. With multiple lasers, image acquisition may be accelerated.

Although certain examples of UV-PAM systems and apparatus are described as employing a UV laser for emitting one or more UV pulses, in other implementations, another light source may be included. For example, UV-PAM system 100 in FIG. 1 or the UV-PAM system 200 in FIG. 2 may include a pulsed laser for emitting one or more ultraviolet pulses and/or one or more pulses of another wavelength. For example, the light source may be a tunable laser. Depending on the illumination wavelength, various contrasts may be imaged by these implementations, including but not limited to hemoglobin, DNA/RNA, cytochrome, water, lipid, and protein.

In various embodiments, the UV-PAM system includes a computing device and/or a controller (e.g., computing device and/or a controller 170 in FIG. 1, computing device 270 in FIG. 2, and reconfigurable I/O device 272). The computing device and/or controller includes one or more processors and other circuitry, a computer readable media (CRM), and an optional display. One or more processors may execute instructions stored on the CRM to perform one or more operations of the UV-PAM system. For example, the one or more processors of the UV-PAM system and/or one or more external processors may execute instructions for one or more of 1) determining and communicating control signals to system components, 2) performing 3D contoured scanning, 3) performing reconstruction algorithm(s) to reconstruct grayscale images of the specimen using photoacoustic signal data, and 4) performing virtual staining of grayscale images. For example, the processor(s) 172 in FIG. 1 and/or one or more external processors may execute instructions that communicate control signals to the 3D contoured scanner 180 to move sample holder 182 for 3D contoured scanning of specimen 20 and send signals with instructions to DAQ(s) 160 to simultaneously record photoacoustic signals received by ultrasonic transducer device 140. In one implementation, the controller is a reconfigurable I/O device (e.g., myRIO-1900 sold by National Instruments) with a field-programmable gate array (FPGA) that may be used to control and/or synchronize one or more components of the UV-PAM system. For example, UV-PAM system 200 in FIG. 2 includes an optional reconfigurable I/O device 272 that may synchronize UV laser pulses from the UV laser 210, motor movements of 3D contoured scanner 280, and data acquisition by one or more DAQ(s) 260.

In some embodiments, the UV-PAM system may include one or more communication interfaces (e.g., a universal serial bus (USB) interface). Communication interfaces can be used, for example, to connect various peripherals and input/output (I/O) devices such as a wired keyboard or mouse or to connect a dongle for use in wirelessly connecting various wireless-enabled peripherals. Such additional interfaces also can include serial interfaces such as, for example, an interface to connect to a ribbon cable. It should also be appreciated that the various system components can be electrically coupled to communicate with various components over one or more of a variety of suitable interfaces and cables such as, for example, USB interfaces and cables, ribbon cables, Ethernet cables, among other suitable interfaces and cables.

In one aspect, digitized radio frequency data from one or more DAQs (e.g., DAQs 160 in FIG. 1 and DAQs 260 in FIG. 2) is first stored in an onboard buffer, and then transferred to the computing device (e.g., computing device 180) through a universal serial bus. The DAQs may be configured to record photoacoustic signals within a certain time (e.g., 10 µs) after each laser pulse excitation. For example, digitized radio frequency data from one or more DAQs may be stored on an onboard buffer, and then transferred to the computing device through a universal serial bus 2.0. In this example, the DAQs are configured to record photoacoustic signals within 10 µs after each laser pulse excitation. In another example, digitized radio frequency data from one or more DAQs may be stored on an onboard buffer, and then transferred to the computing device through a universal serial bus 3.0. In this example, the DAQs are configured to record photoacoustic signals within 200 µs after each laser pulse excitation.

In certain embodiments, the UV-PAM system may also include one or more pre-amplifiers (e.g., pre-amplifier(s) 150 in FIG. 1 and pre-amplifier(s) 250 in FIG. 2) and/or one or more one or more data acquisition systems (DAQs) (e.g., DAQ(s) 160 in FIG. 1 and DAQ(s) 260 in FIG. 2). In one implementation, two low noise amplifiers are used such as, for example, ZFL-500LN+ amplifiers sold by Mini-Circuits. The pre-amplifier(s) is in electrical communication with the ultrasonic transducer device to be able to receive photoacoustic signals. The pre-amplifier(s) can be employed to boost the photoacoustic signals received from the ultrasonic transducer device. The DAQ(s) is in electrical communication with the pre-amplifier(s) to be able to receive the amplified photoacoustic signals. The DAQ(s) may process the photoacoustic signals by, for example, digitizing and/or recording the photoacoustic signal. In certain aspects, the DAQ(s) include at least one digitizer. For example, a DAQ may include a data acquisition card (e.g., ATS 9350 waveform digitizer sold by AlazarTech) for digitizing the photoacoustic signal. The photoacoustic signal may be digitized at, for example, a 500 MHz sampling rate.

Returning to FIG. 1, UV-PAM system 100 may perform a UV-PAM imaging method including a 3D contoured scanning process and an image reconstruction process to form one or more UV-PAM grayscale images. In addition or alternatively, UV-PAM system 100 may perform a deep learning virtual staining techniques to convert one or more grayscale images (e.g., the one or more UV-PAM grayscale images) into pseudocolor virtually stained histology images. Examples of deep learning virtual staining techniques are described in Section IV. Prior to performing 3D contoured scanning, the optical and acoustic foci are confocally aligned, while the propagation time of the acoustic signal from the optical focus is recorded to determine the focal spot position.

Figure 9:
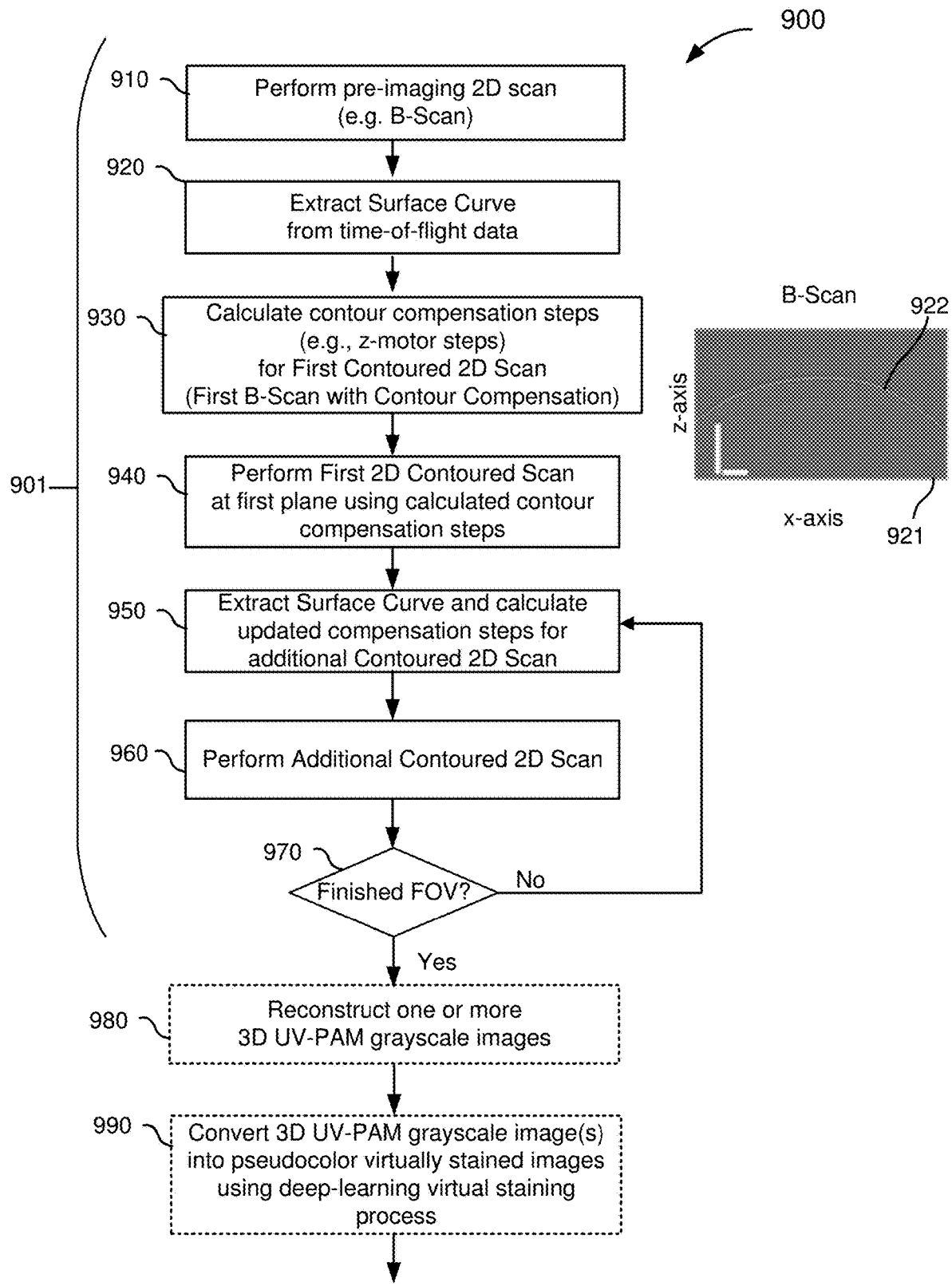
FIG. 9 is a flowchart illustrating an example of a UV-PAM method, according to various embodiments.

In one example of a 3D contoured scanning process, 3D contoured scanner 180 moves sample holder 182 with specimen 20 along a trajectory in two directions simultaneously (e.g., along x-axis and z-axis FIG. 9) for each of a plurality of 2D contoured scans while ultrasonic transducer device 140 detects one or more photoacoustic signals induced by excitation from one or more ultraviolet pulses. There may be a small step (e.g., about 0.625 µm) between adjacent 2D contoured scans. Due to this small step, the trajectory may be set to follow the surface profile from a previous contoured scan or in the case of the first contoured scan, the trajectory may be set to follow the surface profile determined from a first seed scan. The trajectory may be determined from contour compensation steps calculated using time-of-flight information from the one or more photoacoustic signals. To extract the ultrasound propagation time (time of flight), the center of positive and negative peak positions in photoacoustic A-line signals may be calculated, which is converted to the sample position to determine the time of flight at each scanning position. The trajectory of the 3D contoured scanner 180 may be used to scan along the contour of the 3D surface of specimen 20 positioning specimen 20 at, or approximately at, the focal plane of the ultrasonic transducer device 140 for each scanning position determined from the A-line signals. An example of operations of a 3D contoured scanning process 901 is shown in FIG. 9. During 3D contoured scanning, DAQ(s) 160 records and/or digitizes the photoacoustic signals detected by ultrasonic transducer device 140 and amplified by pre-amplifier(s) 150. The photoacoustic signals are recorded at a sampling frequency (e.g., 500 MHz), which is determined by settings of DAQ(s) 160.

UV-PAM system 100 may synchronize UV laser pulses emitted by UV laser 110, motor movements of the 3D contoured scanner 180, and data acquisition by the one or more DAQ(s) 160. For example, UV-PAM system 100 may include a controller in the form of a reconfigurable I/O device (e.g., myRIO-1900 sold by National Instruments) with a field-programmable gate array (FPGA) that may be used to control and synchronize UV laser pulses from UV laser 110, motor movements of the 3D contoured scanner 180, and data acquisition by the one or more DAQ(s) 160.

During image construction, the computing device and/or controller 170 may use amplitude data from the photoacoustic signal(s) from the plurality of 2D contoured scans to generate one or more UV-PAM grayscale images of the specimen. To reconstruct the 3D UV-PAM grayscale images, the photoacoustic amplitude of each A-line signal (signal at each scanning position) of each two-dimensional contoured scan may be calculated after the Hilbert transform. The pulse energy measurements taken by photodiode 130 may be used to normalize the photoacoustic amplitude and compensate for laser pulse fluctuation in the UV laser pulses from UV laser 110. The axial position (e.g. z-position in scan 921 in FIG. 9) of the specimen surface is calculated by detecting the peak of the A-line signal after the Hilbert transform. Each UV-PAM grayscale image is a 2D MAP (maximum amplitude projection) image that is self-normalized. Since the photoacoustic amplitude of the contrast is proportional to its absorption cross-section, it may be used to effectively differentiate cell nuclei, cytoplasm, and the background. The cell nuclei have the largest absorption coefficient at 266 nm and the highest PA signals.

After constructing the one or more UV-PAM grayscale images, optionally a trained neural network may be used in a deep learning virtual staining process to convert the one or more UV-PAM grayscale images into pseudocolor virtually stained histology images. Examples of virtual staining techniques are described in Section IV.

To allow imaging of the rough surface of unprocessed thick samples like bone, contoured scanning without prior knowledge of the sample surface may be implemented using a 3D contoured scanner including, for example, a 3-axis motorized stage, which ensures consistent lateral resolution within a large field of view. For consistent and optical resolution, the distance between the sample and optical focus may be maintained within the DOF during scanning.

In contoured scanning, the time-of-flight information of photoacoustic signals may be used to calculate the distance between the sample and the focal spot, which can be adjusted by the 3D contoured scanner during contoured scanning.

FIG. 2 is a schematic diagram of components of an example of a UV-PAM system 200, according to embodiments. UV-PAM system 200 includes an ultraviolet (UV) laser 110 for emitting a pulsed ultraviolet laser beam, an optical system 220, and a photodiode 230 for measuring pulse energy. In one implementation, UV laser 210 is a Nd:YLF (neodymium-doped yttrium lithium fluoride) Q-switched 266 nm nanosecond pulsed laser (e.g., QL266-010-O pulsed laser sold by CrystaLaser). UV-PAM system 200 also includes an ultrasonic transducer device 240 with a ring-shaped transducer for detecting one or more photoacoustic signals, one or more pre-amplifiers 250 for amplifying the photoacoustic signals from the ultrasonic transducer device 240, one or more DAQ(s) 260 for digitizing and/or recording the amplified photoacoustic signals from or more pre-amplifiers 250, and a computing device 270. In addition, UV-PAM system 200 includes a 3D contoured scanner 280 including a sample holder 282 for receiving and holding a specimen being imaged and a water tank 290. While FIG. 2 shows a UV-PAM system 200 with certain components, any number of these components may be included in UV-PAM system 200, or any of the components may be omitted. In alternative implementations, different or additional components may be included in UV-PAM system 200.

In FIG. 2, optical system 220 includes a band pass filter 221 (e.g., FGUV5 band pass filter sold by Thorlabs) in communication with UV laser 210 for receiving the UV laser beam and for spectrally filtering out green light. Optical system 220 also includes a beam sampler 222 (e.g., a UV fused silica beam sampler such as, for example, BSF10-UV beam sampler sold by Thorlabs) in communication with a band pass filter 221, a first lens 222 (e.g., a first plano-convex lens), a pinhole 224 (e.g., a 15 µm high-energy pinhole such, for example, 900PH-15 pinhole sold by Newport) for creating single mode light, a second lens 225 (e.g., a second plano-convex lens), a mirror 226, and a water immersion UV objective 227. In one implementation, the water immersion UV objective 227 includes an aspheric lens, a concave lens, and at least one convex lens (e.g., NT49-696, NT48-674, and/or NT46-313 lenses sold by Edmund Optics) with a numerical aperture (NA) of 0.16. With a numerical aperture of 0.16, the depth of field of UV-PAM 200 may be about 9 µm, which corresponds to 6 ns ultrasound propagation for the speed of sound at 1500 m/s in room-temperature water.

The beam sampler (BS) 222 is placed before the first lens 222 to redirect a first portion (e.g., about 3-5%) of the laser beam to photodiode 230 (e.g., a Si photodiode such as, for example, PDA36A photodiode sold by Thorlabs) for measuring pulse energy. The photodiode measurements may be used to compensate for pulse-to-pulse energy fluctuation. The beam sampler (BS) 222 is also configured to direct a second portion of the laser beam to the first lens 222. The laser beam may be spatially filtered and expanded by the first lens 222, the second lens 225, and the pinhole 224. The mirror 226 is configured to receive the collimated and expanded beam from the second lens 225 and reflect the collimated and expanded beam to the water-immersed objective 227.

The water immersion objective 227 is configured to focus the collimated and expanded beam through the ring-shaped transducer of the ultrasonic transducer device 240 to illuminate the specimen being imaged for photoacoustic excitation. The ring-shaped ultrasonic transducer device 240 (e.g., a ring-shaped ultrasonic transducer device having a 42 MHz center frequency and 76%-6 dB two-way bandwidth) has a central aperture that can detect the photoacoustic signal. This central aperture allows for confocal alignment of the optical and acoustic foci in reflection mode. The focused laser beam from water immersed objective 227 passes through the central aperture for confocal alignment. The ring-shaped ultrasonic transducer device 240 is configured to detect the photoacoustic signal. UV-PAM system 200 is configured to detect photoacoustic signal(s) in the reflection mode.

One or more pre-amplifiers 250 (e.g., two low noise amplifiers such as, for example, ZFL-500LN+ amplifiers sold by Mini-Circuits) are in communication with the ring-shaped ultrasonic transducer device 240 for receiving the photoacoustic signal(s) and for amplifying the signal(s). DAQ(s) 260 are in communication with one or more pre-amplifiers 250 to receive the amplified photoacoustic signal(s). DAQ(s) 260 include a data acquisition card (e.g., ATS 9350 waveform digitizer sold by AlazarTech) for digitizing the amplified photoacoustic signal(s) at, for example, a 500 MHz sampling rate. The computing device 270 is in communication with DAQ(s) 260 to receive the digitized photoacoustic data. UV-PAM 200 also includes an optional (denoted by dashed line) reconfigurable I/O device 272 (e.g., myRIO-1900 device sold by National Instruments) with a field-programmable gate array (FPGA) that may be employed to control and/or synchronize laser pulses from UV laser 210, motor movements of 3D contoured scanner 280, and data acquisition by DAQ(s) 260. Reconfigurable I/O device 272 is in communication with computing device 270, DAQ(s) 260, UV laser 210, and 3D contoured scanner 280.

The sample holder 282 may receive a specimen being imaged and/or hold the specimen while immersed in acoustic fluid (e.g., water) in tank 290. The ring-shaped ultrasonic transducer device 240 is also immersed in the acoustic fluid during data acquisition. The sample holder 282 may be an integral component of the 3D contoured scanner 280 or may be a separate component coupled to 3D contoured scanner 280. In one implementation, the 3D contoured scanner 280 includes 3 step motors such as, for example, PLS-85, PI Micos motors sold by GmbH. During the contoured scanning process, the immersed specimen mounted onto the sample holder 282 is scanned.

The computing device 270 may have one or more processors or other circuitry, a display in electrical communication with the processor(s), and a computer readable medium (CRM) in electronic communication with the processor(s). The processor(s) may be in electrical communication with the CRM to store and/or retrieve data such as the photoacoustic signal data. The computing device 270 may be, for example, a personal computer, an embedded computer, a single board computer (e.g., Raspberry Pi or similar), a portable computation device (e.g., tablet), a controller, or any other computation device or system of devices capable of performing the functions described herein. Reconfigurable I/O device 272 is in electronic communication with UV laser 210, DAQ(s) 260, and 3D contour scanner 280 to transmit control signals. Computing device 270 is in electrical communication with DAQ(s) 260 to receive data transmissions. The electrical communication links between components of UV-PAM system 200 may be in wired and/or wireless form. The electrical communication links may be able to provide power in addition to communicate signals in some cases.

In an exemplary operation of UV-PAM system 200, prior to imaging, the optical and acoustic foci may be confocally aligned, while the propagation time of the acoustic signal from the optical focus may be recorded to determine the focal spot position. To extract the ultrasound propagation time, the center of positive and negative peak positions in PA A-line signals may be calculated, which is then converted to the sample position. Without prior knowledge of the sample surface profile, one seed two-dimensional scan (e.g., B-scan) with the z-motor of the 3D contoured scanner 180 is disabled or not used may be implemented to calculate the starting contour trajectory. To avoid potential noise interference and remove outliers, a 100-point moving average may be used to generate a smooth z scanning trajectory. During the contoured scanning, both the x-axis motor and the z-axis motor of the 3D contoured scanner 280 move simultaneously. After the first contoured B-scan, the z-motor trajectory and the distance between the sample surface and the ultrasonic transducer device 240 are calculated and used to compute the accurate surface profile. Due to the small step between adjacent 2D scans (e.g., step of about 0.625 μm), the second z-motor trajectory can be set to follow the surface profile from the previous contoured scan. Then, the surface profile is updated according to the second contoured scan. This process is repeated until the scanning of the entire field-of-view is complete. Real-time data processing and system control are implemented using MATLAB and LabVIEW hybrid programming.

UV-PAM system 200 may perform a UV-PAM imaging method including a 3D contoured scanning process and an image reconstruction process to form one or more UV-PAM grayscale images. In addition or alternatively, UV-PAM system 200 may perform a deep learning virtual staining techniques to convert one or more grayscale images (e.g., the one or more UV-PAM grayscale images) into pseudo-color virtually stained histology images. Examples of deep learning virtual staining techniques are described in Section IV. Prior to performing 3D contoured scanning, the optical and acoustic foci are confocally aligned, while the propagation time of the acoustic signal from the optical focus is recorded to determine the focal spot position.

In one example of a 3D contoured scanning process, 3D contoured scanner 280 moves sample holder 282 with the specimen along a trajectory in two directions simultaneously (e.g., along x-axis and z-axis FIG. 9) for each of a plurality of 2D contoured scans while ultrasonic transducer device 240 detects one or more photoacoustic signals induced by excitation from one or more ultraviolet pulses. There may be a small step (e.g., about 0.625 μm) between adjacent 2D contoured scans. The trajectory may be set to follow the surface profile from a previous contoured scan or in the case of the first contoured scan, the trajectory may be set to follow the surface profile determined from a first seed scan. The trajectory may be determined from contour compensation steps calculated using time-of-flight information from the one or more photoacoustic signals. To extract the ultrasound propagation time (time of flight), the center of positive and negative peak positions in photoacoustic A-line signals may be calculated, which is converted to the sample position to determine the time of flight at each scanning position. The trajectory of the 3D contoured scanner 280 may be used to scan along the contour of the 3D surface of the specimen positioning the specimen at, or approximately at, the focal plane of the ultrasonic transducer device 240 for each scanning position determined from the A-line signals. An example of operations of a 3D contoured scanning process 901 is shown in FIG. 9. During 3D contoured scanning, DAQ(s) 260 records and/or digitizes the photoacoustic signals detected by ultrasonic transducer device 240 and amplified by pre-amplifier(s) 250. The photoacoustic signals are recorded at a sampling frequency (e.g., 500 MHz), which is determined by settings of DAQ(s) 260. Reconfigurable I/O device 272 may control and synchronize UV laser pulses from UV laser 210, motor movements of the 3D contoured scanner 280, and data acquisition by the one or more DAQ(s) 260.

During image construction, computing device 270 may use amplitude data from the photoacoustic signal(s) from the plurality of 2D contoured scans to generate one or more UV-PAM grayscale images of the specimen. To reconstruct the UV-PAM grayscale images, the photoacoustic amplitude of each A-line signal (signal at each scanning position) of each two-dimensional contoured scan may be calculated after the Hilbert transform. The pulse energy measurements taken by photodiode 230 may be used to normalize the photoacoustic amplitude and compensate for laser pulse fluctuation in the UV laser pulses from UV laser 210. The axial position (e.g. z-position in scan 921 in FIG. 9) of the specimen surface is calculated by detecting the peak of the A-line signal after the Hilbert transform. Each UV-PAM grayscale image is a 2D MAP (maximum amplitude projection) image that is self-normalized. Since the photoacoustic amplitude of the contrast is proportional to its absorption cross-section, it may be used to effectively differentiate cell nuclei, cytoplasm, and the background. The cell nuclei have the largest absorption coefficient at 266 nm and the highest PA signals.

After constructing the one or more UV-PAM grayscale images, optionally a trained neural network may be used in a deep learning virtual staining process to convert the one or more UV-PAM grayscale images into pseudocolor virtually stained histology images. Examples of virtual staining techniques are described in Section IV.

Figure 11A:
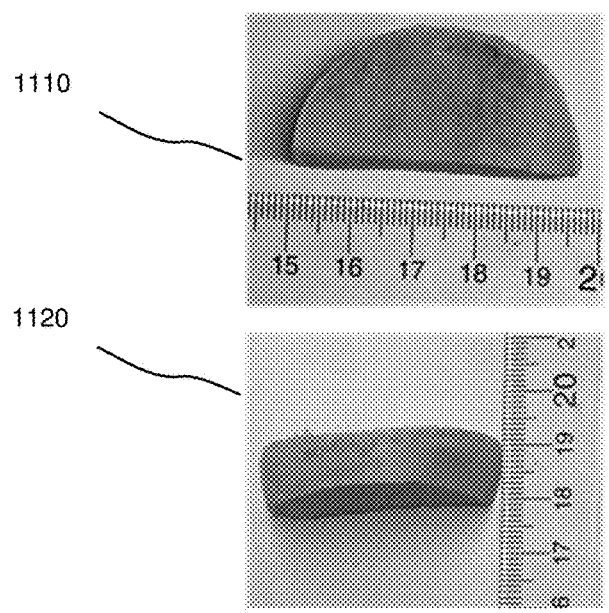
FIG. 11A is a photograph of a side view and a second photograph of a top view of a normal bone specimen.
Figure 11B:
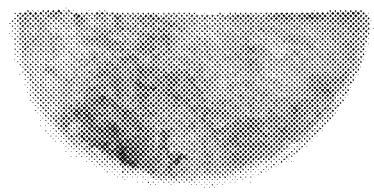
FIG. 11B is a photograph of a side view of a bone specimen extracted from the right proximal femur with grade 3 chondrosarcoma.
Figure 11C:
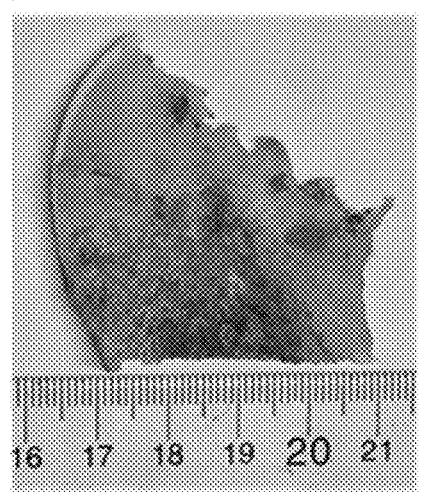
FIG. 11C is a photograph of a side view of a bone specimen with metastatic differentiated adenocarcinoma, consistent with the known thyroid primary.

With optical focusing and the time-of-flight information from the one or more photoacoustic signals, UV-PAM images may provide contrast in 3D. In one implementation of the UV-PAM system 200, ultrasonic transducer device 240 includes a 42 MHz ultrasonic transducer and DAQ(s) 260 includes a data acquisition card sampling at 500 MHz. In this implementation, UV-PAM system 200 may be able to localize the z positions of the sample surface with an accuracy finer than the acoustical resolution (~40 μm) by approximately a factor of 10 as limited by the signal-to-noise ratio. The UV-PAM system 200 may employ a 266 nm nanosecond pulsed laser to image the DNA/RNA. While the penetration depth depends on the sample type, in bone specimens, the UV light penetration may be less than the acoustical resolution. Thus, no deep photoacoustic signal is generated and mixed with surface signals, allowing for direct imaging of the surfaces of, for example, thick biological tissues. While soft tissue can be sampled or squeezed with a flat surface, unprocessed hard tissues such as the calcified bone specimens shown in FIGS. 11A, 11B, and 11C usually have a rough surface due to tissue extraction. FIG. 16A includes a first photo 1110 of a side view and a second photo 1120 of a top view of a normal bone specimen. FIG. 11B is a photo of a side view of a bone specimen extracted from the right proximal femur with grade 3 chondrosarcoma. FIG. 11C is a photo of a side view of a bone specimen with metastatic poorly differentiated adenocarcinoma, consistent with the known thyroid primary.

The 3D contour-scanning UV-PAM 100 system in FIGS. 1 and 3D contour-scanning UV-PAM 200 system of FIG. 1 may allow for direct imaging of thick specimens with rough surfaces, which provide the possibility of intraoperative pathologic diagnosis of undecalcified thick bone. Since the height differences in adjacent 2D contour scan (B-scan) positions (e.g., about 0.625 μm away from each other) can be reasonably assumed to be much smaller than the depth of focus (DOF) of the UV-PAM (~9 μm), the z contour-scanning trajectory can be predicted and updated in real-time after the first seed B-scan for the full field-of-view (FOV), without the prior knowledge of the surface contour, for example, as describe with reference to FIG. 9. Thus, 3D contoured scanning UV-PAM systems described herein may provide the possibility of ensuring the distance between the image position and the focal plane is within the DOF, resulting in a consistent diffraction-limited lateral resolution for rough surface imaging.

Figure 12A:
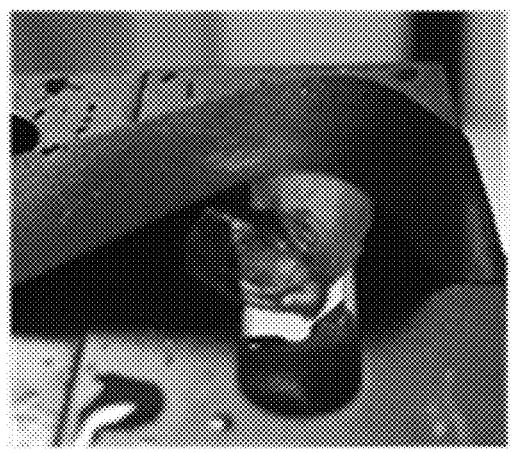
FIG. 12A is a photograph of a curved surface made of black tape.
Figure 12B:
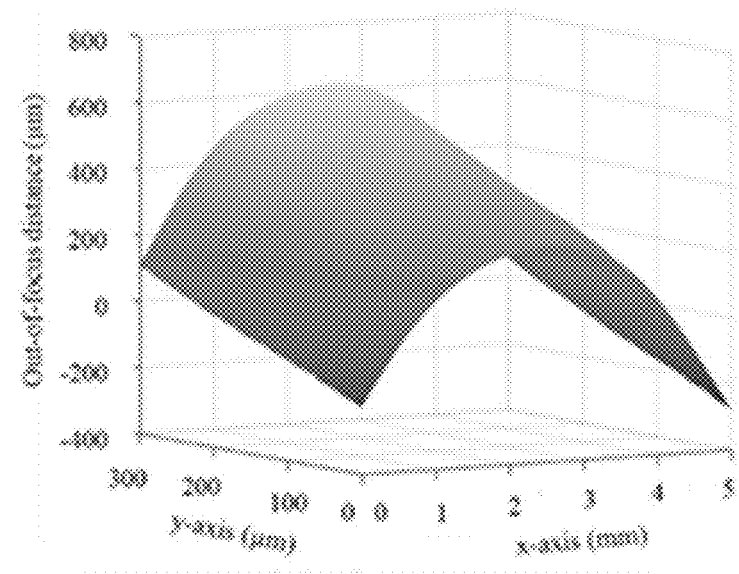
FIG. 12B is a 3D plot of an example of 3D curved surface profile of the black tape in FIG. 12A as acquired by a UV-PAM system, according to some embodiments.
Figure 12C:
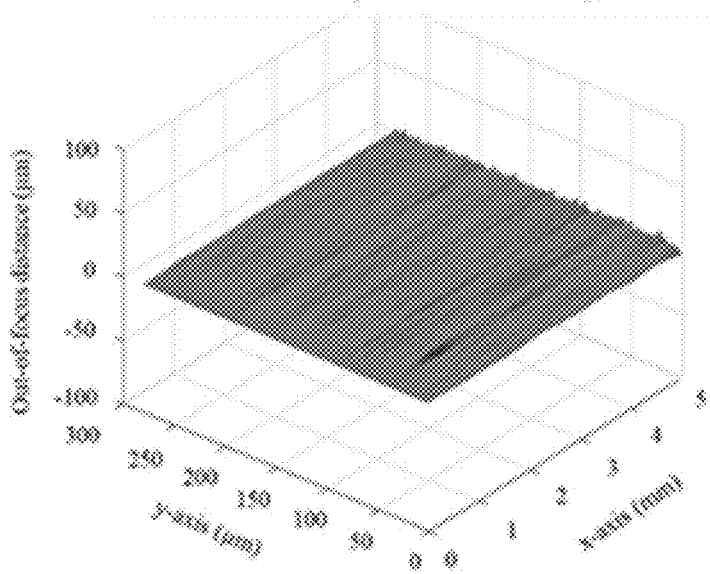
FIG. 12C is a 3D plot of an example of the relative distances between the focal plane and the 3D curved surface profile of the black tape in FIG. 12A as acquired by a UV-PAM system, according to some embodiments.
Figure 17A:
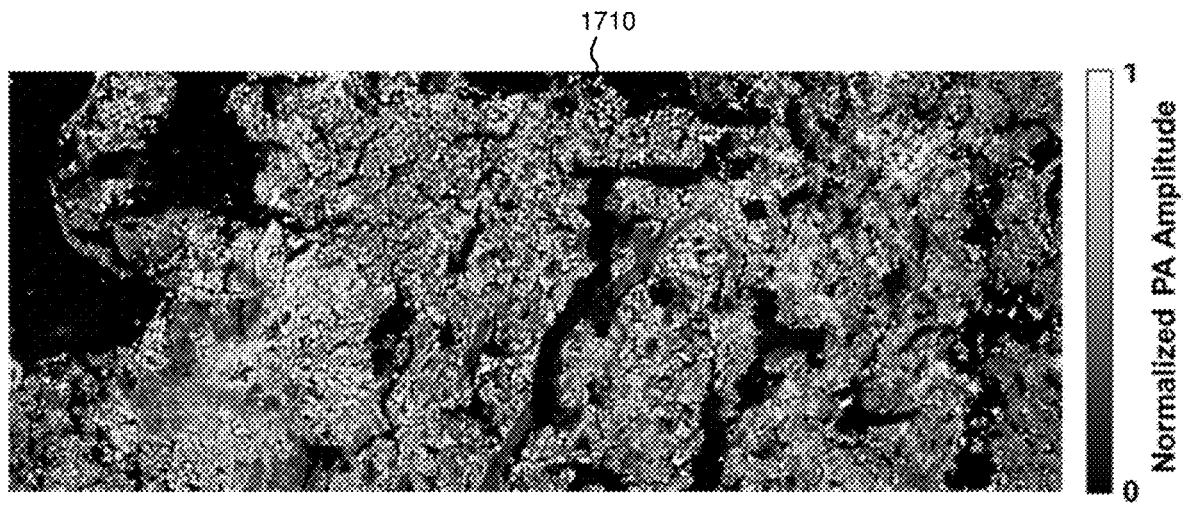
FIG. 17A is an example 3D contour-scanning UV-PAM image of a decalcified bone specimen from a patient with moderately differentiated metastatic pulmonary adenocarcinoma in original grayscale contrast, according to some embodiments.
Figure 17B:
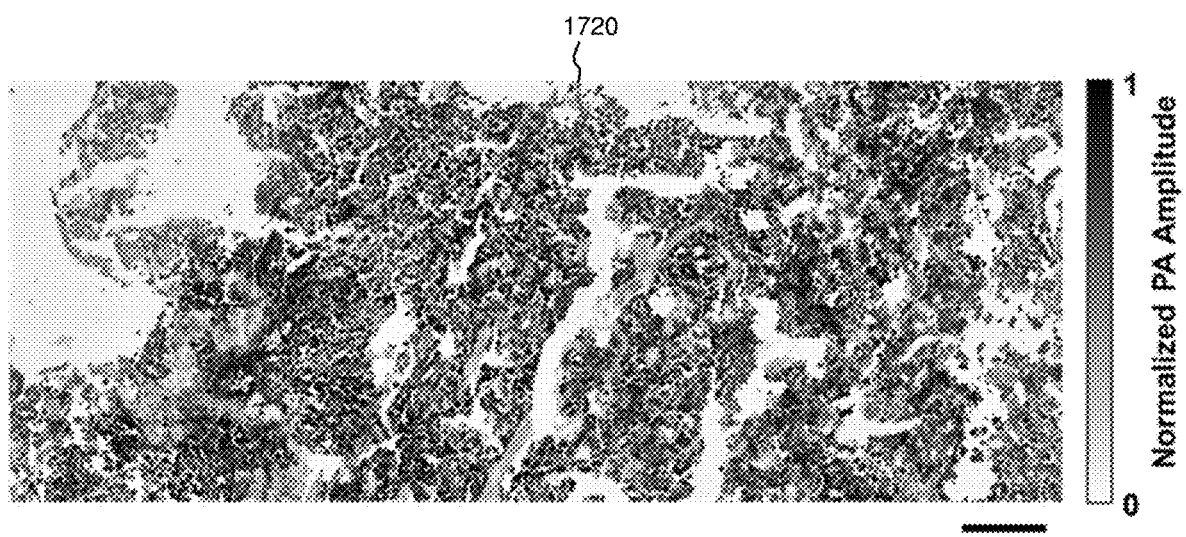
FIG. 17B is another example 3D contour-scanning UV-PAM image of the decalcified bone specimen of FIG. 17A in reversed grayscale contrast, according to some embodiments.

A plot of the 3D surface profile of a 3D curved surface of black tape and a plot of the relative distance between the 3D curved surface and the focal plane as determined by UV-PAM system 200 are shown in FIGS. 17B and 17C, which show well-compensated distances in the full FOV. FIG. 12A is a photograph of a curved surface made of black tape. FIG. 12B is a plot of a 3D curved surface profile of the black tape in FIG. 12A as determined by UV-PAM system 200 of FIG. 2. FIG. 12C is a plot of the relative distance between the focal plane and the 3D curved surface profile of the black tape in FIG. 12A as determined by UV-PAM system 200 of FIG. 2.

Figure 3:
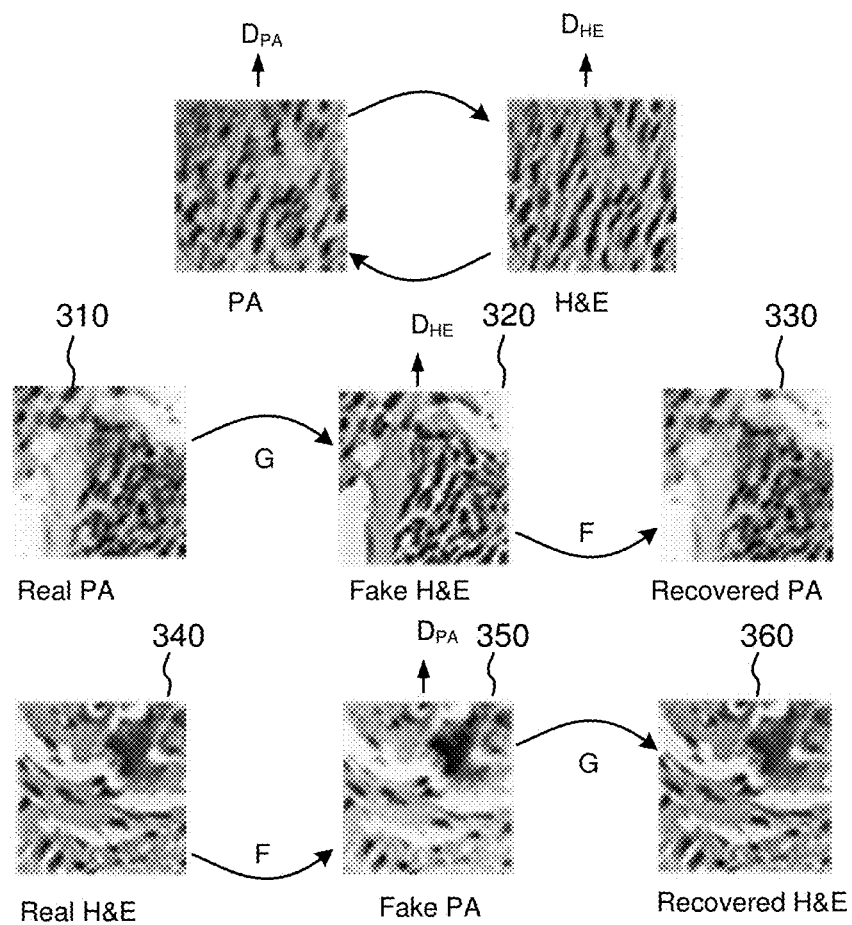
FIG. 3 is an example of images of one domain (e.g., stained histology images) generated by machine learning models (e.g., first and second generators G and F) trained in conjunction with corresponding machine learning models (e.g., discriminators $D_{HE}$ and $D_{PA}$), based on images of another domain (e.g., UV-PAM images).

After acquiring one or more grayscale UV-PAM images of the sample surface, deep learning techniques (which may be based on generative adversarial networks, for example, as shown in FIG. 3) may be used to implement the virtual staining. In some embodiments, a deep learning network architecture for virtual staining may include one or more generators and corresponding adversarial discriminators.

III. Generative Adversarial Networks (GANs)

As shown in FIG. 3, two generators G and F and corresponding adversarial discriminators $D_{HE}$ and $D_{PA}$ make up a deep learning architecture that can be used with, e.g., virtual staining of histology images. As discussed below with respect to FIGS. 4 and 5, each generator and discriminator can be trained so that the outputs of G and F are indistinguishable from real H&E and PAM images, respectively. That is, G and $D_{HE}$ may make up a first generative adversarial network (GAN), and F and $D_{PA}$ may make up a second GAN. More specifically, and as will be detailed below, the output (the predicted image) of G based on a histology image 310 (e.g., obtained using a first histological technique such as PA histology) may be evaluated by $D_{HE}$, which may be a classifier with a sigmoid output which determines whether the predicted image 320 is a real H&E image or a fake H&E image. The generators are further regularized using the cycle-consistency loss; transforming an image from one domain (e.g., PA to H&E) and back should recover the original input (e.g., H&E to PA). FIG. 3 illustrates an example of using a trained generator G to produce an H&E image 320 from a real UV-PAM image 310, and then using generator F to recover a UV-PAM image 330 (which should look substantially similar to and resemble the real UV-PAM image 310). Similarly, generator F can be used to trained to produce a predicted UV-PAM image 350 from a real H&E image 340, and then generator G can be used to recover an H&E image 360 that looks substantially similar to the real H&E image. $D_{PA}$ may be a classifier with a sigmoid output which determines whether the predicted UV-PAM image 350 is a real UV-PAM image or a fake UV-PAM image. This process ensures that the transformations are bijective and produce corresponding morphology. With neural network well trained, it takes less than 5 seconds to virtually stain an image of 1600×1600 pixels.

These two generator-discriminator pairs may each be involved in a GAN, and when implemented together, make up a "cycle-consistent" GAN. Cycle consistency may refer to a characteristic of the GAN in which when an image output by the first generator G based on an original image is used as input to the second generator F, and the output of the second generator F should match the original image. Each GAN is an unsupervised image translation model that can be trained using unpaired collections of images from two different domains, without ground-truth labels. This cycle consistency is particularly useful for generating images in one domain or type or obtained using one histological technique (e.g., UV-PAM images obtained using, e.g., PAM) to images in another domain or type or obtained using another histological technique (e.g., stained images obtained using, e.g., H&E staining techniques) without actually using the other histological technique, which may advantageously save significant time and resources.

Figure 4:
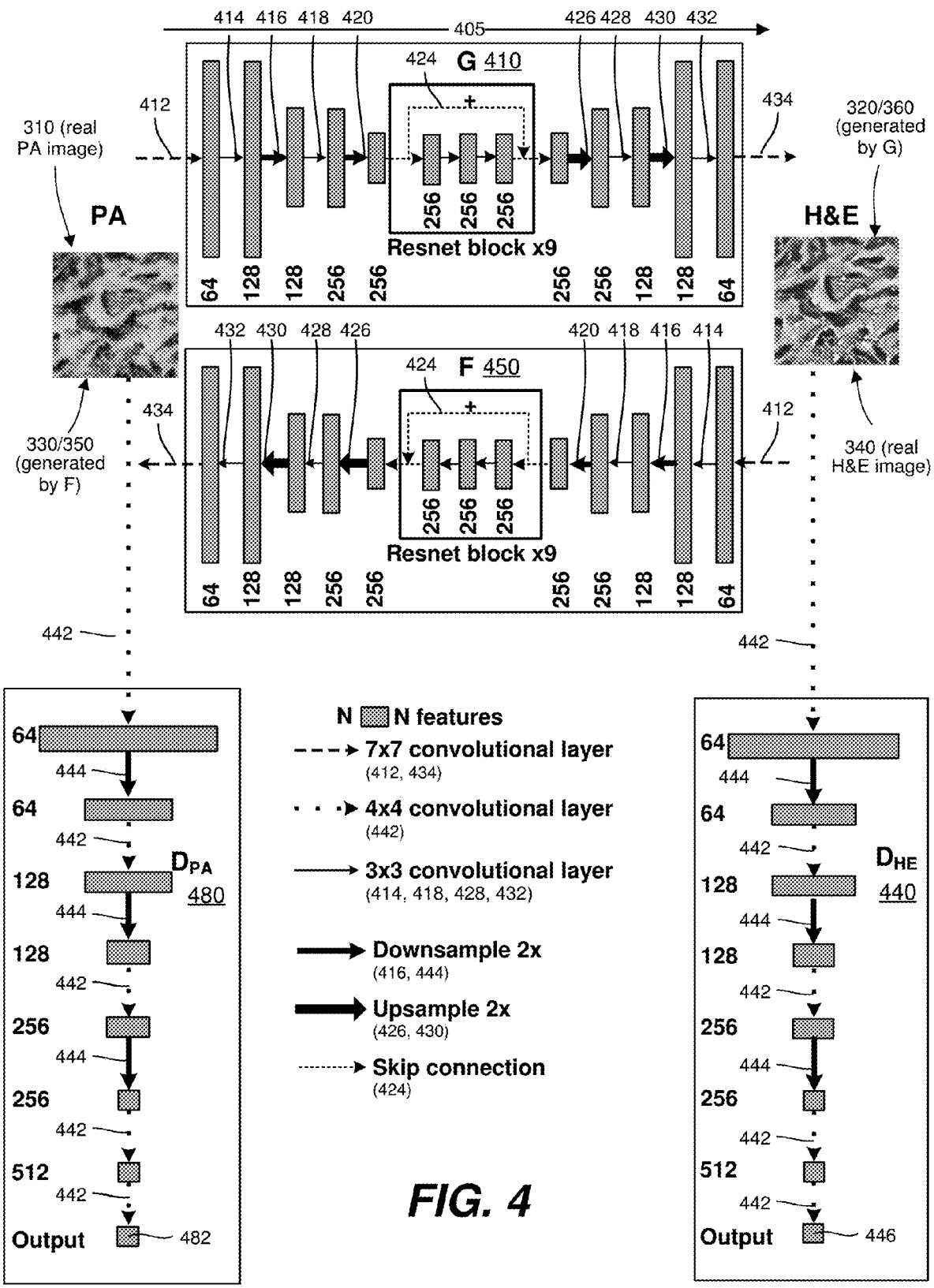
FIG. 4 is a detailed diagram of an example architecture of generators and corresponding discriminators of a cycle-consistent generative adversarial network (CycleGAN), according to some embodiments.

FIG. 4 illustrates a more detailed diagram of an example architecture of generators (G and F) and corresponding discriminators ($D_{HE}$ and $D_{PA}$) of a cycle-consistent generative adversarial network, according to some embodiments.

To effectuate the cycle consistency, generators (e.g., G and F) and discriminators (e.g., $D_{HE}$ and $D_{PA}$) may be iteratively trained under adversarial loss conditions. A cycle-consistency loss may be determined during training of the generator and discriminator models, and the loss may be used to update one or more parameters (e.g., weight, learning rate, regularization rate) associated with the models using forward and backward propagation.

First generator and discriminator: For example, a first machine learning model (e.g., generator G 410) may receive, as input, a first image from a first domain (e.g., a real PA histology image 310, or a "fake" PA histology image 330 or 350 with an appearance or characteristic of a real PA histology image). In some cases, the input image may have a defined image patch size, such as 70×70, 512×512, or 1024×1024 pixels. The patch size may be selected based on a compromise between promoting high spatial frequency fidelity and avoiding tiling artifacts. Generator G 410 may generate or predict an output image in a second domain (e.g., predicted H&E histology image 320).

The predicted output image may be generated via one or more layers 405 of the neural network of the machine learning model. As an aside, a "layer" may refer herein to a group of nodes of a neural network which are used for a particular task. Some or all nodes of a layer may contain data, such as values, weights, null data, etc., and may form, individually or in combination, vertices and matrices. In some embodiments, layers 405 may include one or more convolutional layers, one or more layers that downsample image data, one or more layers that upsample image data, and/or one or more skip connections.

More specifically, the generator G 410 may include convolution layers 412, 414 configured to perform convolutions to generate a convolutional representation. A convolution may refer to application of a filter to an input (e.g., image data, pixel values) that results in a representation of the input. For example, a convolutional neural network (CNN) may be implemented. In some cases, the convolutional representation may be a feature map having 64 features, 128 features, etc. The convolutional representation may be a set of pixel values determined based on the product of the pixel values of the input image and a filter (also referred to as a "kernel"). The kernel may be a matrix, e.g., a 7×7 matrix having constant values. Or, in some implementations or in addition, a 3×3 convolution kernel may be applied. In FIG. 4, the convolutional layer 412 may be a 7×7 convolutional layer, and the convolutional layer 414 may be a 3×3 convolutional layer. However, it is recognized that other kernel sizes may be selected. In other implementations, additional or fewer kernels may be used. The kernel may take "strides" or steps of one pixel as it moves along the image. As used herein, a "stride" may refer to a parameter utilized to indicate a number of pixels over which the kernel matrix traverses over a training image. Larger values of the stride correspond to skipping over larger numbers of pixels, and vice versa. A larger stride may generate a more compressed image of a given layer of a network relative to a smaller stride. In some examples, the stride may be an integer value, such as 1, 2, 3, 5, etc.

In some embodiments, generator G 410 may include additional layers that result in downsampling 416 of the convolutional representation (e.g., a convoluted image output from the convolutional layer 412). For instance, the additional layers of generator G 410 may include a normalization layer, which may be configured to normalize the output of the previous layer (the convolutional representation). In some implementations, instance normalization may be used with the normalization layer. In other cases, the normalization layer may be configured to perform batch normalization, weight normalization, layer normalization, group normalization, or weight standardization.

The additional layers may include an activation layer. In some implementations, the activation layer may be configured to perform Rectified Linear Unit (ReLU) activation on the normalized feature map. ReLU activation may refer to introduction of non-linearity, useful for backpropagation of errors when training a neural network. That is, all the negative values in the convolutional representation (e.g., a feature map) are replaced with zeroes, resulting in deactivation of a node if the output of the linear transformation is less than 0. Such functionality may be represented as ReLU (x)=max(0, x). In some implementations, other types of ReLU functionality may be used. For example, Leaky ReLU may also be used, which has a small positive slope in the negative area. Such functionality may be represented as, for example, LReLU(x)=αx for x<0; x for ≥0. α may be a fractional value, e.g., 0.1, 0.01. Other examples include Parametric ReLU (PReLU) and Exponential Linear Unit (ELU).

The additional layers may include a pooling layer, which may be configured to reduce the dimensionality of each rectified feature map from the activation layer, while retaining the most important information. In some implementations, max pooling may be used, which may refer to defining a spatial neighborhood from a rectified feature map (e.g., a 2×2 window), and taking the largest element from the rectified feature map within that window. Similar to the convolution of convolution layer, a stride of 1, 2, or more may be taken to obtain the maximum value from the window. In some implementations, a 2×2 window for max pooling may be applied. However, it is recognized that other window sizes may be selected for max pooling. In addition, in some implementations, other types of spatial pooling may be used, e.g., average pooling, mean pooling, sum pooling (sum of inputs). The pooling layer may thereby generate another convolutional representation, e.g., a downsampled output array of pixel values containing, e.g., maximum values from the window applied across the input rectified feature map.

One or more of these additional layers may collectively result in downsampling 416 of the image; e.g., the resolution of the input image 310 may be lowered. From here, generator G 410 may implement further layers, e.g., another convolutional layer 418 and another set of layers for downsampling 420. Collectively, the foregoing layers (412-420) may be considered encoding layers for the input image 310. The result of the encoding layers may be input for decoding layers, where decoding layers are configured to generate a deconvolutional representation.

At the bottleneck 422, in some implementations, a skip connection 424 between the final encoding layer and the first decoder layer may be used to pass information to the next set of layers, the decoding layers. In some implementations, the information passed via the skip connection 424 may include original values that have been pooled (e.g., values that were max pooled in a pooling layer). The information may further include other pixel information, transform information (e.g., an indication that max pooling function was used by the pooling layer), and/or feature map information. In some implementations, the filter window for deconvolution may have defined dimensions, e.g., 3×3. In some implementations, further convolutional layers may be implemented instead of the skip layer 424.

In some embodiments, generator G 410 may include an upsampling layer 426. In some implementations, the upsampling layer 426 may be configured to upsample the input (e.g., an image represented by pixel values). In some implementations, upsampling may be accomplished via an interpolation filter that is configured to perform, e.g., bilinear interpolation.

Generator G 410 may further include a deconvolutional layer 428. In some implementations, the filter window for deconvolutional may have defined dimensions, e.g., 3×3. In FIG. 4, deconvolutional layer 428 may be a 3×3 deconvolutional layer, although other filter or kernel sizes may be used. Deconvolutional layer 428 may be configured to use information passed from the final set of layers of the encoder portion via the skip connection 424. In some implementations, the decoder portion may include a normalization layer and an activation layer (e.g., ReLU activation layer), which may perform substantially similar functions as those described above.

Generator G 410 may implement further layers, e.g., upsampling layer 430, deconvolutional layer 432 (3×3, corresponding to convolutional layer 414), and deconvolutional layer 434 (7×7, corresponding to convolutional layer 412). The resulting predicted image 320 (e.g., fake H&E image) may now have the same resolution as the input image (e.g., real PA histology image 310). In some instances, the resulting predicted image may be a recovered H&E image 360 based on a fake UV-PAM image 350 generated by generator F 450.

As alluded to above, the predicted image 320 will be in a second domain (e.g., having a visual characteristic of an H&E image), whereas the input image 310 is in a first domain (e.g., having a visual characteristic of a UV-PAM image). For example, as an imaging modality based on the photoacoustic effect, a UV-PAM image may have a color scheme that is different from an H&E image (e.g., black and white versus pink or purple coloration). H&E images may provide important information about the pattern, shape, and structure of cells in a tissue sample. An object of predicting an H&E image based on the UV-PAM image is to greatly reduce staining time associated with traditional H&E imaging.

In some embodiments, the predicted image 320 may be passed to a machine learning model such as discriminator $D_{HE}$ 440, which may determine whether the predicted image 320 is a real H&E image or not (created by a generator). In some implementations, discriminator $D_{HE}$ 440 may include convolutional layers 442 and downsampling layers 444 until an output is obtained. In some cases, the convolutional layers 442 may be 4×4 convolutional layers, similar to the type described above. It is recognized that other kernel sizes may be used for the convolutional layers. In some implementations, normalization (e.g., instance normalization), activation (e.g., using ReLU activation layers and leaky ReLU activation layers) may be used after each convolutional layer. Discriminator $D_{HE}$ 440 may also include downsampling layers 444, which may include component layers such as a normalization layer, an activation layer, and/or a pooling layer, as described above.

Discriminator $D_{HE}$ 440 may generate an output 446. In some implementations, the output 446 is a value representative of a metric indicative of a likelihood of the predicted image 320 being based on an H&E staining technique or not (e.g., based on UV-PAM). For example, the discriminator $D_{HE}$ 440 may classify the predicted image 320 as a real H&E image or a fake H&E image (e.g., a UV-PAM image), which may be represented with said metric. As an example, a metric value of 1 generated by $D_{HE}$ 440 may represent a real H&E image, and a value of 0 may represent a UV-PAM image, and values between 1 and 0 may represent a likelihood of a predicted image being a real H&E image (closer to 1 representing a higher likelihood of being a real H&E image) or a fake H&E image (closer to 0 representing a higher likelihood of being not a real H&E image). Similarly, a metric value of 1 generated by discriminator $D_{PA}$ 480 may represent a real UV-PAM image, a metric value of 0 may represent a fake UV-PAM image, and values between 1 and 0 may represent a likelihood of a predicted image being a real UV-PAM image or a fake UV-PAM image. A midpoint value such as 0.5 may represent a determination by a discriminator that the image could be real or fake.

Initially, the discriminator $D_{HE}$ 440 may produce values of over or under 0.5, meaning that the discriminator $D_{HE}$ 440 is able to differentiate between real and fake H&E images. However, through iterative training and correction of parameters (e.g., weights) of discriminator $D_{HE}$ 440 (e.g., by minimization of an error (e.g., a loss function) between real H&E images and generated H&E images, the minimization based on an optimization algorithm or process such as gradient descent), the metric may improve as the discriminator $D_{HE}$ 440 is unable to determine the likelihood of the image being based on H&E image (a real H&E image) or based on another technique (e.g., UV-PAM), producing an output of closer to 0.5, which signifies that that the predicted image 320 may be a real or fake H&M image. The result of training generator G 410 may be the generator G 410 to be able to produce images that are unable to be determined (e.g., by a corresponding discriminator, e.g., $D_{HE}$ 440) to be a real or fake H&E image. Hence, in the context of the present disclosure, it is desirable that an optimized generator of a GAN is capable of producing an image that an optimized discriminator is unable to "discriminate" or otherwise determine whether the image is real or fake. Gradient descent inherently involves adjusting one or more parameters of the cost function for each of the generator and discriminator models, which informs respective parameters (e.g., weights) of the model associated with the cost function. Minimizing the loss function means that the error is the smallest between the two images evaluated.

Second generator and discriminator: Similar to the first generator above (generator G 410), an input image may be provided to a second machine learning model (e.g., generator F 450). The input image may be from a second domain, e.g., a real H&E image 340 obtained using H&E staining, or a "fake" H&E image 320 or 360 with an appearance or characteristic of a real H&E stained image generated by, for example, generator G 410. In some cases, the input image may have a defined image patch size, such as 70×70, 512×512, or 1024×1024 pixels.

In some embodiments, the same encoding and decoding layers as those used in generator G 410 and discriminator $D_{PA}$ 480 may be used to generate a UV-PAM image and evaluate the generated UV-PAM image. Generator F 450 may include convolutional layers 412, 414, 418, 428, 432, 434, 442, downsampling layers 416, 444, a skip connection 424, and upsampling layers 426, 430, each configured to perform substantially similar tasks as generator G 410 and discriminator $D_{HE}$ 440 as described above. The resulting predicted image 350 (e.g., fake UV-PAM image) may now have the same resolution as the input image (e.g., real H&E image 340). In some instances, the resulting predicted image may be a recovered UV-PAM image 330 based on a fake H&E image 320 generated by generator G 410.

Hence, generator F 450 may generate or predict an output image in the first domain (e.g., predicted PA histology image 330), and discriminator $D_{PA}$ 480 may generate an output 482, representing a metric indicative of a likelihood of the predicted image 330 being an H&E staining technique or a UV-PAM image. Similar to discriminator $D_{HE}$ 440, through iterative training and correction of parameters (e.g., weights) of discriminator $D_{PA}$ 480 (e.g., by minimization of an error (e.g., a loss function) between real UV-PAM images and generated UV-PAM images, the minimization based on an optimization algorithm or process such as gradient descent), the metric may improve and be able to determine that there is a higher likelihood that the predicted image 330 is a real UV-PAM image or a fake UV-PAM image (e.g., an H&E image), with the goal of generator F 450 being able to produce images that are unable to be discerned (e.g., by a corresponding discriminator, e.g., $D_{PA}$ 480) whether the an image is a real or fake UV-PAM image. Hence, in the context of the present disclosure, it is desirable that an optimized generator of a GAN is capable of producing an image that an optimized discriminator is unable to "discriminate" or otherwise determine whether the image is real or fake. Gradient descent inherently involves adjusting one or more parameters of the cost function for each of the generator and discriminator models, which informs respective parameters (e.g., weights) of the model associated with the cost function. Minimizing the loss function means that the error is the smallest between the two images evaluated.

As mentioned above, each generator and discriminator may be configured to be updated based on an error. In some embodiments, the error may be a difference between the original input image to a first machine learning model and the output image of the other machine learning model. In some cases, the original input image may be the input to G (e.g., real UV-PAM image 310), and the output image may be the output of F (e.g., fake UV-PAM image 330). In some embodiments, the error may be pixel by pixel. Each pixel of the input image and the corresponding pixel of the output image (which has the same resolution) may have a difference in pixel value. The greater the difference in pixel value, the greater the error. In some embodiments, the mean-squared error may be used to determine a collective error of all the pixels. Other aspect of the images other than pixel values may also be evaluated for error—amount of red (R) when evaluating H&E images, amount of black when evaluating UV-PAM images, intensity value, saturation, etc. The input and output images may also be compared in terms of other units rather than pixels, e.g., macroblocks.

In some embodiments, an optimization such as gradient descent may be performed so as to allow update of parameters of the generators and discriminators. Through multiple iterations, the discriminators may achieve greater accuracy when determining whether the predicted image is from a first domain (e.g., PA) or a second domain (e.g., H&E), and thereby enable the generators to achieve greater accuracy when producing images of the second domain based on the first domain. The foregoing describes a forward-cycle consistency loss minimization. In the reverse, predicting an image in the first domain based on an image in the second domain, a backward-cycle consistency loss minimization may be accomplished.

To sum, to determine forward-cycle consistency loss, input an image of first domain to a first generator/GAN (G), output a predicted image of second domain from the first generator/GAN, input the predicted image of second domain to a second generator/GAN (F), output a predicted image of first domain from the second generator/GAN (F), and compare the input image of first domain with the predicted image of first domain to find an optimal set of parameters.

To determine a backward-cycle consistency loss, input an image of second domain to a first generator/GAN (F), output a predicted image of first domain from the first generator/GAN (F), input the predicted of first domain to a second generator/GAN (G), output a predicted image of second domain from the second generator/GAN (G), and compare the input image of second domain with the predicted image of second domain to find an optimal set of parameters.

IV. Methods for Virtually Staining Histology Images

Figure 5:
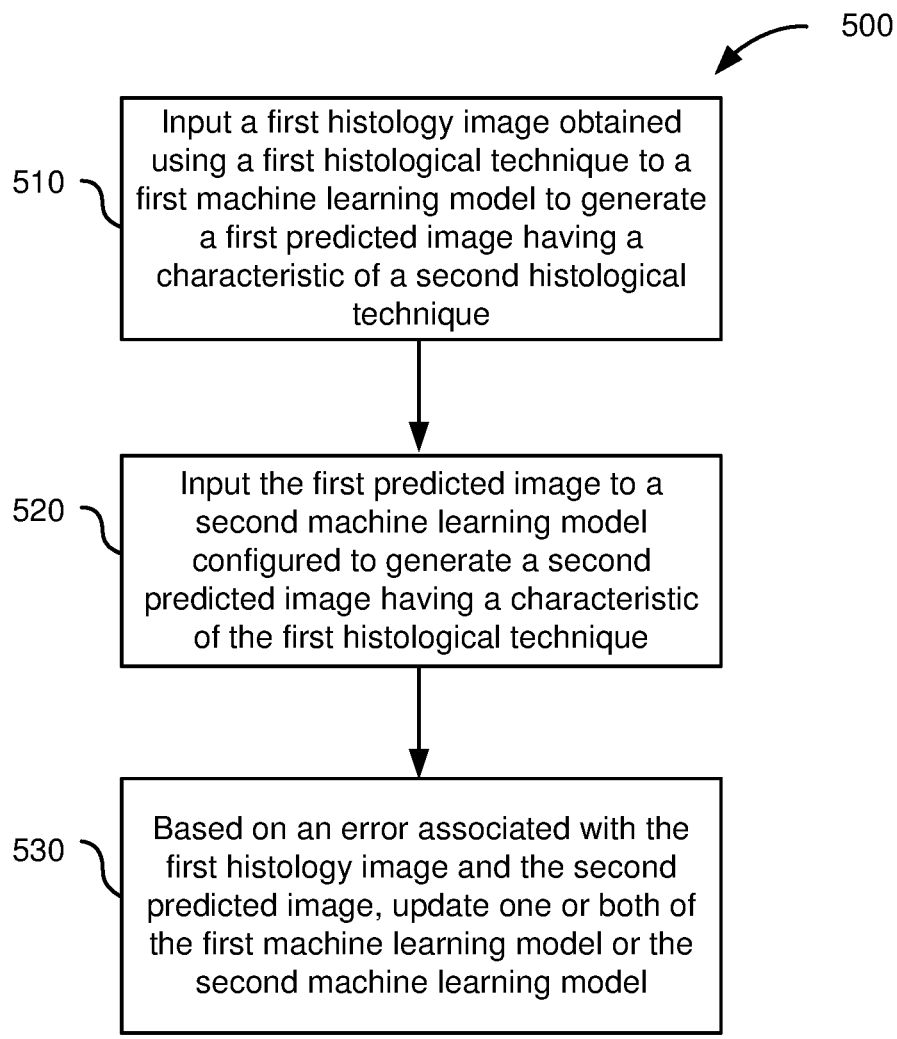
FIG. 5 is a flow diagram illustrating an example method of training a first machine learning model to virtually stain one or more histology images, according to some embodiments.

FIG. 5 is a flow diagram illustrating a method of training a first machine learning model to virtually stain one or more histology images, according to some embodiments. One or more of the functions of the method 500 may be performed by or caused by a computerized apparatus or system. Means for performing the functionality illustrated in one or more of the steps shown in FIG. 5 may include hardware and/or software components of such computerized apparatus or system, such as, for example, a controller apparatus (e.g., a computing device and/or controller 170 and/or its components), a computerized system, or a computer-readable apparatus including a storage medium storing computer-readable and/or computer-executable instructions that are configured to, when executed by a processor apparatus, cause the at least one processor apparatus or a computerized apparatus to perform the operations. Example components of a computerized apparatus are illustrated in FIG. 1, and described in more detail elsewhere herein.

It should also be noted that the operations of the method 500 may be performed in any suitable order, not necessarily the order depicted in FIG. 5. Further, the method 500 may include additional or fewer operations than those depicted in FIG. 5 to train the model.

At block 510, the method 500 may include inputting a first histology image obtained using a first histological technique to the first machine learning model to generate a first predicted image having a characteristic of a second histological technique. In some embodiments, the first histological technique may include photoacoustic (PA) imaging, e.g., using a UV-PAM system such as that described with respect to FIG. 1 or FIG. 2. The first histology image may be a UV-PAM image obtained using the first histological technique. In some embodiments, the first machine learning model may be a generator (e.g., generator G 410 or generator F 450). A discriminator corresponding to the generator may also be implemented, as was discussed above and will be further discussed below. The second histological technique may include hematoxylin and eosin (H&E) staining, and the first predicted image may be a predicted H&E image generated by the first machine learning model.

Characteristics of a UV-PAM image and an H&E image differ. For example, a UV-PAM image may be grayscale, while an H&E image has color in shades of pink (e.g., varying amounts of red per pixel). As discussed above, such UV-PAM image may be virtually stained to produce an image that resembles an H&E-stained image. Hence, in some implementations, the characteristic of the second histological technique may include an amount of red in each pixel (for H&E images). In some implementations, other image parameters may be considered as the characteristic, e.g., intensity value or saturation.

UV-PAM and H&E may also be considered first and second domains, between which a pair of trained generators may produce images of one domain from another domain, e.g., from an image of the first domain (e.g., UV-PAM image or predicted UV-PAM, or H&E image or predicted H&E image) to an image of the second domain (e.g., virtually stained and predicted H&E image, or predicted UV-PAM image).

At block 520, the method 500 may include inputting the first predicted image to a second machine learning model configured to generate a second predicted image having a characteristic of the first histological technique. In some embodiments, the second machine learning model may be another generator (e.g., generator F 450), and the second predicted image may be a predicted UV-PAM image generated by the second machine learning model. In some implementations, the characteristic of the second histological technique may include an amount of black in each pixel (for UV-PAM images). In some implementations, other image parameters may be considered as the characteristic, e.g., intensity value or saturation. Since the At block 530, the method 500 may include, based on an error associated with the first histology image and the second predicted image, updating one or both of the first machine learning model or the second machine learning model. In some embodiments, the error may be determined between the first histology image and the second predicted image, where the first histology image is the input UV-PAM image, and the second predicted image is the predicted UV-PAM image generated by the second machine learning model. In some implementations, the error may be determined on a pixel-by-pixel basis, where the difference between each pixel of the first histology image and the corresponding pixel of the second predicted image is determined. For example, the pixel value and/or another characteristic of the pixel (e.g., amount of color) may be evaluated (e.g., compared) between the two images. Since a generator produces an image having the same resolution via the process of downsampling and upsampling to recover the same resolution (see, e.g., the layers described with respect to FIG. 4), the two images have the same resolution. In some embodiments, a loss function based on a mean-squared error of all the pixel errors may be determined, which may then be minimized using an optimization process such as gradient descent.

Gradient descent inherently involves adjusting one or more parameters of the cost function, which informs the parameters (e.g., weights) of the model associated with the cost function. Minimizing the loss function means that the error is the smallest between the two images evaluated. In some embodiments, the updating of the first machine learning model or the second machine learning model includes updating one or more parameters (e.g., weights), e.g., using backpropagation. A machine learning model such as a generator may thus be trained using the above process.

Similarly, machine learning model such as a discriminator may also be trained by minimizing an error (e.g., a loss function) between the input image that is a generated image (e.g., the first predicted image generated by the first machine learning model, resembling an H&E image) and a reference image (e.g., a real H&E image) using an optimization algorithm or process such as gradient descent. By adjusting the parameters of the loss function for the discriminator, the error can be gradually minimized, and be able to generate an output (e.g., 446, 482) that is closer to either 0 or 1, where 0 corresponds to an image in the first domain and 1 corresponds to an image in the second domain. In other words, training the discriminator means updating its weights such that its predicted output will approach 0.5, where 0.5 indicates that the discriminator cannot differentiate between real and fake images (e.g., real vs. fake UV-PAM images, or real vs. fake H&E images), and moving close to 0 or 1 indicates that the discriminator can determine whether an image is real or fake. In some embodiments, the goal of training the generator is to create images (e.g., virtually stained H&E images) that are unable to be discerned as real or fake.

In some embodiments, the method 500 may further include inputting the first predicted image to a third machine learning model (e.g., a first discriminator, e.g., $D_{HE}$ 440) corresponding to the first machine learning model, the third machine learning model configured to determine a first metric indicative of a likelihood of the first predicted image having been obtained using the second histological technique. The second histological technique may be H&E staining, as noted above. The first discriminator may then be trained according to the above. Similarly, the method 500 may further include inputting the second predicted image to a fourth machine learning model (e.g., a second discriminator, e.g., $D_{PA}$ 480) corresponding to the third machine learning model, the fourth machine learning model configured to determine a second metric indicative of a likelihood of the second predicted image having been obtained using the first histological technique. The first histological technique may be PA imaging, as noted above.

It will be appreciated that, in other embodiments, the first histological technique may be H&E staining and the second histological technique may be PA imaging. That is, method 500 may apply for, e.g., recovering or generating a UV-PAM image (e.g., 330, 350) from an H&E image (virtual or real).

Figure 6:
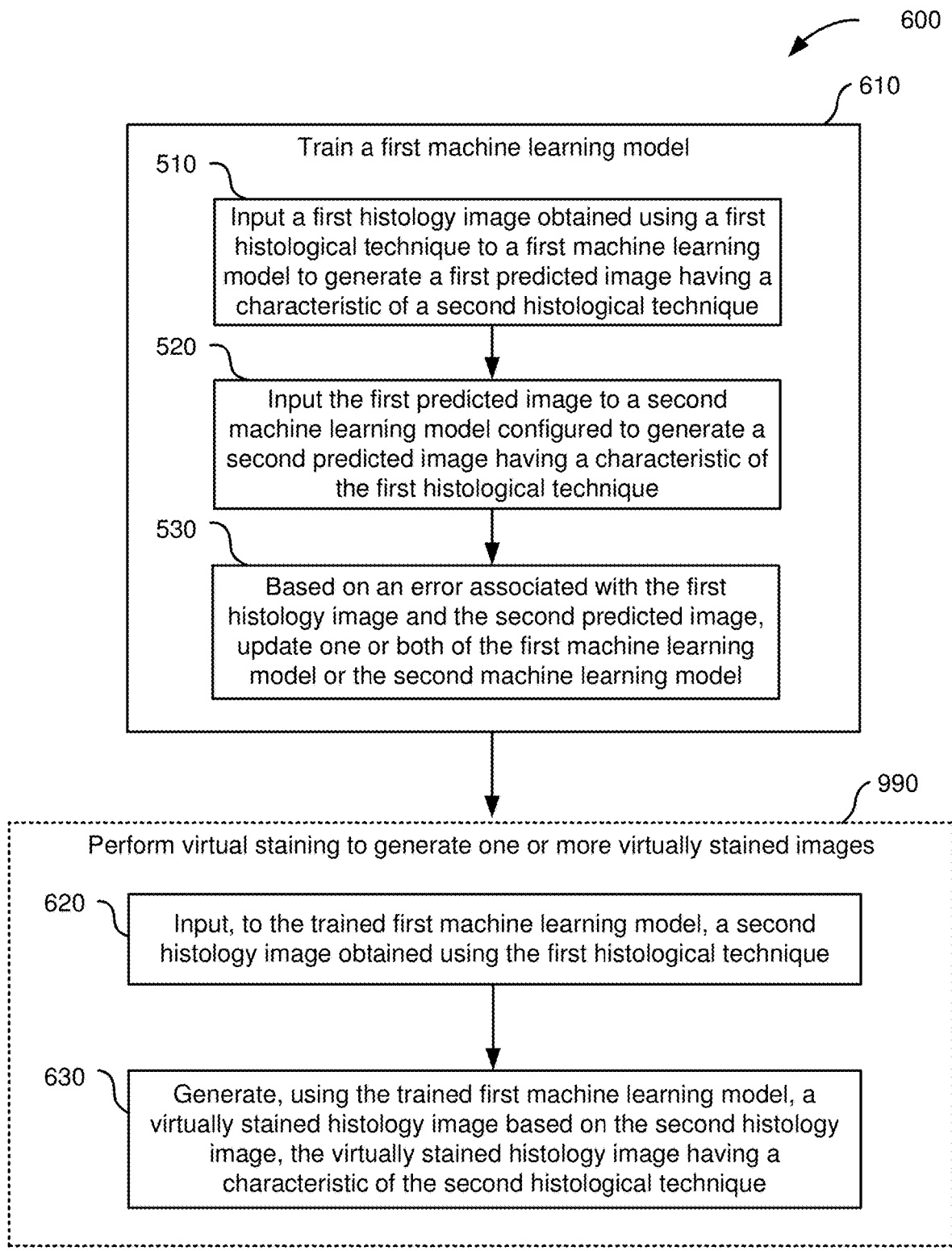
FIG. 6 is a flow diagram illustrating a method of virtually staining one or more histology images, according to some embodiments.

FIG. 6 is a flow diagram illustrating a method of virtually staining one or more histology images, according to some embodiments. One or more of the functions of the method 600 may be performed by or caused by a computerized apparatus or system. Means for performing the functionality illustrated in one or more of the steps shown in FIG. 6 may include hardware and/or software components of such computerized apparatus or system, such as, for example, a controller apparatus (e.g., a computing device and/or controller 170 and/or its components), a computerized system, or a computer-readable apparatus including a storage medium storing computer-readable and/or computer-executable instructions that are configured to, when executed by a processor apparatus, cause the at least one processor apparatus or a computerized apparatus to perform the operations. Example components of a computerized apparatus are illustrated in FIG. 1, and described in more detail elsewhere herein.

It should also be noted that the operations of the method 600 may be performed in any suitable order, not necessarily the order depicted in FIG. 6. Further, the method 600 may include additional or fewer operations than those depicted in FIG. 6 to virtually stain a histology image.

At block 610, the method 600 may include training a first machine learning model. In some embodiments, the first machine learning model may be a generator, such as generator G 410 or generator F 450 as discussed with respect to FIG. 4 above. In some embodiments, the training may include blocks 510, 520 and 530 as discussed with respect to FIG. 5 above. Training the first machine learning model may generate a trained first machine learning model (e.g., a trained generator).

At block 620, the method 600 may include inputting, to the trained first machine learning model, a second histology image obtained using the first histological technique. As an example, the first histology image obtained using a first histological technique (block 510) may be a first UV-PAM image, and the second histology image obtained using the first histological technique may be a second UV-PAM image.

At block 630, the method 600 may include generating, using the trained first machine learning model, a virtually stained histology image based on the second histology image (obtained using the first histological technique), the virtually stained histology image having a characteristic of the second histological technique. In some embodiments, virtually stained histology image is an H&E image generated using the trained generator, while the second histology image is a UV-PAM image. In some implementations, the characteristic of the second histological technique may include an amount of red in each pixel. In other implementations, the characteristic may include intensity value, saturation, or other image parameters.

Hence, the trained first machine learning model (e.g., a generator) may receive another image of the same domain as image(s) the generator was trained on (e.g., UV-PAM), and predict an image of another domain (e.g., H&E).

Figure 7:
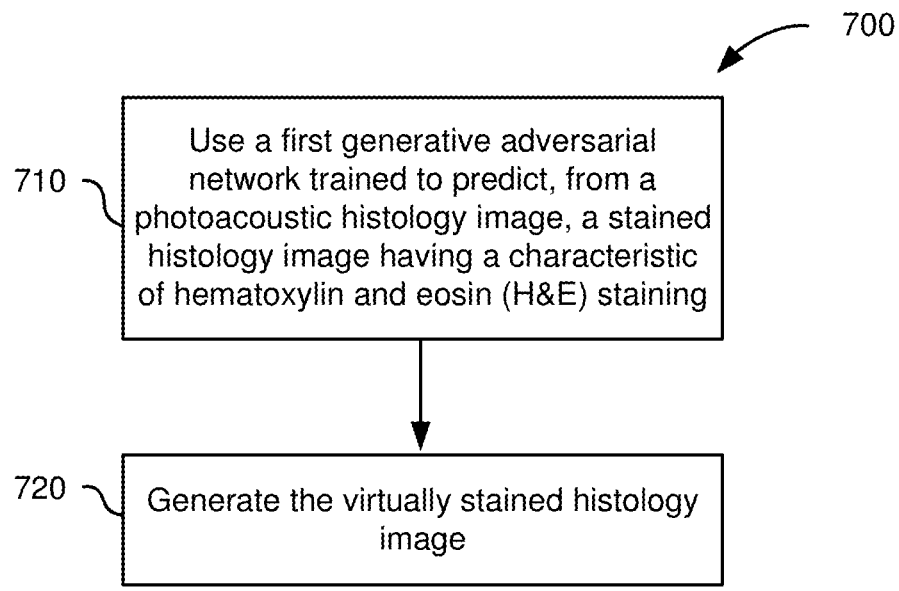
FIG. 7 is a flow diagram illustrating a method of virtually staining one or more histology images, according to some embodiments.

FIG. 7 is a flow diagram illustrating a method of virtually staining one or more histology images, according to some embodiments. One or more of the functions of the method 700 may be performed by or caused by a computerized apparatus or system. Means for performing the functionality illustrated in one or more of the steps shown in FIG. 7 may include hardware and/or software components of such computerized apparatus or system, such as, for example, a controller apparatus (e.g., a computing device and/or controller 170 and/or its components), a computerized system, or a computer-readable apparatus including a storage medium storing computer-readable and/or computer-executable instructions that are configured to, when executed by a processor apparatus, cause the at least one processor apparatus or a computerized apparatus to perform the operations. Example components of a computerized apparatus are illustrated in FIG. 1, and described in more detail elsewhere herein.

It should also be noted that the operations of the method 700 may be performed in any suitable order, not necessarily the order depicted in FIG. 7. Further, the method 700 may include additional or fewer operations than those depicted in FIG. 7 to virtually stain a histology image.

At block 710, the method 700 may include using a first generative adversarial network trained to predict, from a photoacoustic histology image, a stained histology image having a characteristic of hematoxylin and eosin (H&E) staining. In some embodiments, the photoacoustic histology image may be a UV-PAM image. The first generative adversarial network may include a trained generator and a trained discriminator. In some embodiments, the generator has been trained in conjunction with a corresponding trained discriminator and a second generative adversarial network that includes a generator and a corresponding discriminator (which in some scenarios may also be trained). The training of the generator of the first generative adversarial network may be accomplished using the methodology 500 of FIG. 5 (e.g., blocks 510, 520, 530).

At block 720, the method 700 may include generating the virtually stained histology image. In some embodiments, the virtually stained histology image may have the characteristic of H&E staining, e.g., amount of red in each pixel, intensity value, saturation, or other image parameters.

By using a trained generator to generate a virtually stained H&E image from a UV-PAM image which cannot be distinguished from a real H&E image, significant amounts of time and resources may advantageously be saved over conventional methods such as manual H&E staining.

Figure 8:
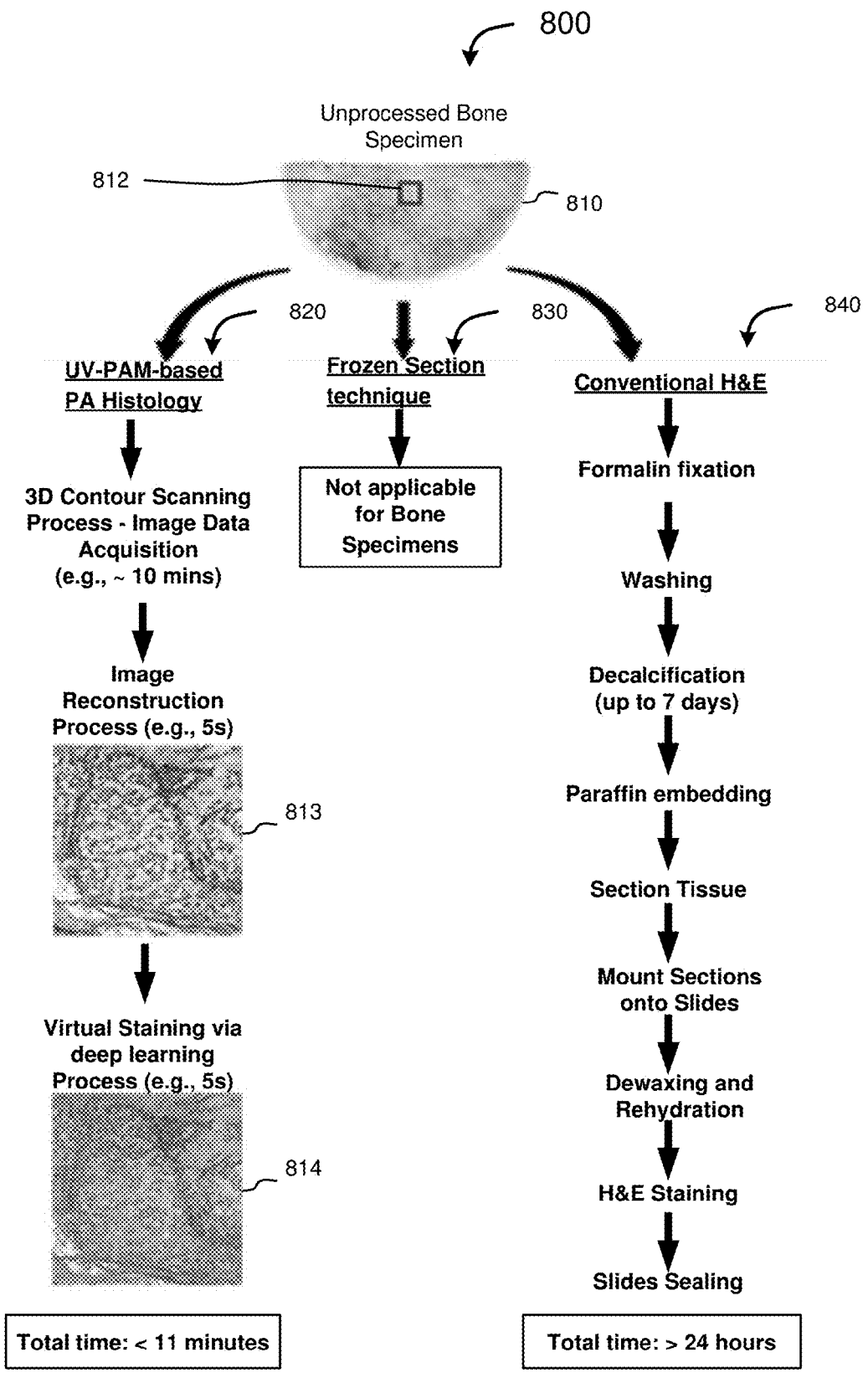
FIG. 8 is a schematic diagram depicting workflows of both an example of UV-PAM photoacoustic histology according to some embodiments and traditional H&E staining histology of bone specimens for comparison.

Certain embodiments pertain to UV-PAM techniques that employ 3D contour-scanning and deep learning-based virtual staining. With the 3D contour-scanning UV-PAM system employing deep learning assisted virtual staining, there is a possibility of intraoperative diagnosis of unprocessed tissue (e.g., bone). FIG. 8 is a schematic diagram depicting workflows of both an example of UV-PAM photoacoustic histology 820 and a traditional H&E staining histology 840 of bone specimens for comparison. Unlike soft biological tissues, hard bone samples cannot be processed by the widely used frozen section technique 830 for intraoperative examination. The traditional H&E histology techniques 840 for bone involve multiple complicated and time-consuming procedures, such as bone decalcification. It can take up to 7 days for some bone specimens to be fully decalcified before sectioning and H&E staining. In contrast, the UV-PAM based histology technique 820 of one example may be able to produce virtually stained images of unprocessed bone for intraoperative examination within about 11 minutes for a 0.625 μm step size with 1×1 $mm^2$ field-of-view (FOV). It may take less than 5 seconds for virtual staining with the trained convolutional neural network (CNN). An example of a grayscale image 813 and an example of a virtually stained image 814 of a portion 812 of an unprocessed bone specimen 810 are shown.

V. UV-PAM Imaging Methods

According to certain embodiments, UV-PAM imaging methods may image a rough surface of unprocessed thick samples like bone tissue specimens by employing a real-time 3D contoured scanning process that does not require previous knowledge of the sample surface. The 3D contoured scanning process uses a 3D contoured scanner (e.g., including a 3-axis motorized stage) that may be configured to maintain consistent lateral resolution within the field-of-view being imaged. In some cases, the distance between the specimen and the optical focus is kept within the depth-of-field (DOF) during scanning for consistent and optimal optical resolution.

In the 3D contoured scanning process of certain implementations, the time-of-flight information of photoacoustic signals may be used to calculate the distance between the specimen and the focal spot of the ultrasonic transducer device, which can be used to adjust the trajectory of the 3D contoured scanner for 3D contoured scanning with z-position compensation. For example, a profile surface curve of the sample surface may be determined from the time-of-flight information. The compensation steps used to determine the trajectory of the 3D contoured scanner can be calculated based on a difference between the focal length of the ultrasonic transducer device and the distance between the ultrasonic transducer device and the profile surface curve.

Prior to UV-PAM imaging, the optical and acoustic foci may be confocally aligned (e.g., in a calibration process), while the propagation time of the acoustic signal from the optical focus is recorded to determine the focal spot position. To extract the ultrasound propagation time (time of flight), the center of positive and negative peak positions in photoacoustic A-line signals may be calculated, which is converted to the sample position to determine the time of flight at each scanning position.

Without needing prior knowledge of the sample surface profile, a seed two-dimensional (2D) scan (e.g., seed B-scan) may be performed without axial movement (e.g., z-movement by the z-motor of a 3D contoured scanner being disabled or not used) to determine the starting contour trajectory for the subsequent first 2D contoured scan. The first 2D contoured scan is then performed using the starting contour trajectory. One or more additional 2D contoured scans are then performed. After each 2D contoured scan, the distances between the sample surface and the ultrasonic transducer device are calculated using the time-of-flight data. These distances are used to compute a surface profile and a contour trajectory for the subsequent contoured scan. Due to a small step (e.g., y step of 0.625 µm) between adjacent 2D contoured scans, each contour trajectory (e.g., z-motor trajectory) is set to follow the surface profile from the previous 2D contoured scan. This process is repeated to acquire additional 2D contoured scans until scanning of the field-of-view is complete. Real-time data processing and system control may be implemented using MATLAB and LabVIEW hybrid programming or the like.

In some cases, to avoid potential noise interference and remove outliers, at least a 100-point moving average may be used in each 2D scan to generate a smooth scanning trajectory. During each 2D contoured scan, the 3D contoured scanner moves in both directions simultaneously along the plane. For example, if the 3D contoured scanner includes a 3-axis motorized stage with an x-axis motor, a y-axis motor, and a z-axis motor, the x-axis motor and the z-axis motor move simultaneously during each 2D contoured scan.

In certain implementations, a 3D contoured scanning photoacoustic method includes real-time three-dimensional contoured photoacoustic scanning of a surface of a specimen using time-of-flight data from one or more photoacoustic signals detected by an ultrasonic transducer device. In some cases, a plurality of 2D photoacoustic scans are performed of the specimen. These 2D photoacoustic scans include at least one seed 2D photoacoustic scan and one or more 2D contour photoacoustic scans. Each contour 2D photoacoustic scan is performed using axial (e.g., z-direction) compensation steps calculated using time-of-flight data of one or more photoacoustic signals detected during a previous adjacent 2D photoacoustic scan of the plurality of 2D photoacoustic scans. For example, a first contour 2D photoacoustic scan may be performed using axial compensation steps calculated using time-of-flight data of one or more photoacoustic signals detected during a seed 2D photoacoustic scan where the seed 2D photoacoustic scan is performed prior to the first contour 2D photoacoustic scan in the previous step (e.g., y-position) scanned. As another example, a second contour 2D photoacoustic scan may be performed using axial compensation steps calculated using time-of-flight data of one or more photoacoustic signals detected during a first contour 2D photoacoustic scan where the first contour 2D photoacoustic scan is performed prior to the second contour 2D photoacoustic scan in the previous step (e.g., y-position) scanned.

FIG. 9 is a flowchart 900 illustrating an example of a UV-PAM method, according to various embodiments. The operations shown in flowchart 900 are for illustration purposes only and are not intended to be limiting. In various implementations, modifications may be made to flowchart 900 to add or omit one or more operations or change the order of operations. The operations in flowchart 900 may be performed using a UV-PAM system such as, for example, UV-PAM system 100 shown in FIG. 1 or UV-PAM system 200 shown in FIG. 2. The two-dimensional (2D) scans (e.g., B-scans) in the UV-PAM method may be performed in reflection mode such as shown in FIG. 2 where the ultrasonic transducer device 240 is located to the same side of the specimen as the direction from which the one more ultraviolet pulses are delivered. In reflection mode, the one or more ultraviolet pulses are provided to the surface of the specimen and photoacoustic signals induced by the one or more ultraviolet pulses at the surface, or near the surface, of the specimen are reflected back from the specimen surface.

Without prior knowledge of the sample surface profile, a seed 2D scan may be performed to calculate the starting contour trajectory for the subsequent first contoured scan. At operation 910, a pre-imaging (seed) two-dimensional scan (e.g., B-scan) is performed at an initial plane (e.g., x-z plane shown in FIG. 9). The pre-imaging 2D scan employs a 3D contoured scanner (e.g., 3D contoured scanner 180 and 3D contoured scanner 280) to scan the specimen in one direction (e.g., along the x-axis shown in FIG. 9) while an ultrasonic transducer device (e.g., ultrasonic transducer device 140 in FIG. 1 or ultrasonic transducer device 240 in FIG. 2) detects one or more photoacoustic signals from the specimen induced by one or more ultraviolet pulses from, for example, a UV laser (e.g. UV laser 110 in FIG. 1 or UV laser 210 in FIG. 2). In addition or alternatively, the ultrasonic transducer device can be moved relative to the specimen. One or more DAQs (e.g., DAQ(s) 160 in FIG. 1 or DAQ(s) 260 in FIG. 2) digitize and record the one or more photoacoustic signals amplified by one or more pre-amplifiers (e.g., pre-amplifier(s) 150 in FIG. 1 or pre-amplifier(s) 250 in FIG. 2).

At operation 920, a surface (profile) curve of the specimen is extracted using time-of-flight data from the photoacoustic signals detected during the pre-imaging 2D scan. FIG. 9 includes an illustration of an example of an image of a pre-imaging 2D scan 921 and a surface curve 922 extracted from time-of-flight data of the photoacoustic signals detecting during the pre-imaging 2D scan 921. The scale bar is 500 µm. The time-of-flight can refer to the time between the photoacoustic signal being generated at the surface of the specimen and the time the ultrasonic transducer device receives the photoacoustic signals. The distance between the specimen surface and the ultrasonic transducer device can be calculated at each scanning position (e.g., x scanning position) of the pre-imaging 2D scan to determine the surface (profile) curve.

At operation 930, a plurality of contour compensation steps (e.g., z-motor steps) are calculated for the first contoured scan. The contour compensation steps are calculated to position the specimen surface at, or approximately at, the focal plane of the ultrasonic transducer device during the subsequent 2D contoured scan. Each contour compensation step is calculated as the difference between the focal length and the distance between the specimen surface, defined by the extracted surface curve, and the ultrasonic transducer device at each scanning position.

Figure 10:
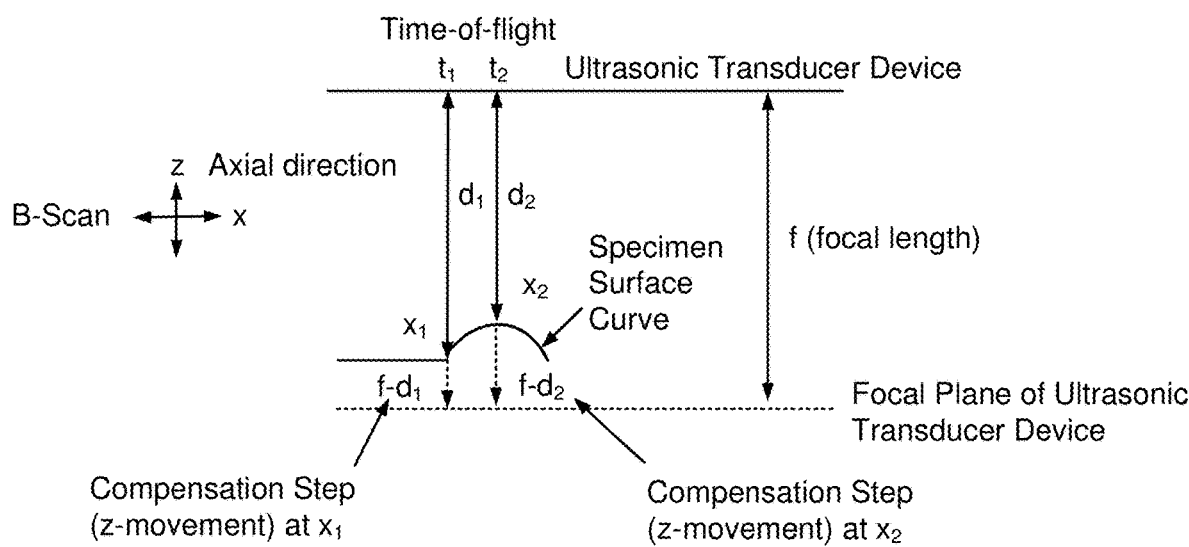
FIG. 10 is a schematic illustration of time-of-flight, surface curve, and compensation steps at two scanning positions, according to various embodiments.

FIG. 10 is a schematic illustration of time-of-flight, $t_1$ and $t_2$, at two respective scanning positions, $x_1$ and $x_2$. In this example, the time-of-flight can refer to the time between the photoacoustic signal generated at the surface of the specimen and the time the ultrasonic transducer device receives the photoacoustic signals. The distance between the specimen surface and the ultrasonic transducer device can be calculated at each scanning position (e.g., x scanning position) to determine the surface (profile) curve. For example, as shown in FIG. 10, the distances, $d_1$ and $d_2$, between the specimen surface and the ultrasonic transducer device can be calculated at respective scanning positions, $x_1$ and $x_2$, using respective time-of-flight, $t_1$ and $t_2$, and the speed of the photoacoustic wave. The contour compensation steps is the difference between the focal length, f, and the distances, $d_1$ and $d_2$, between the specimen surface and the ultrasonic transducer device: $f-d_1$ and $f-d_2$.

At operation 940, the first contoured scan is performed with contour compensation based on the calculated contour compensation steps. The 3D contoured scanner scans the specimen along a trajectory according to the calculated contour compensation steps and the scanning positions. The 3D contoured scanner scans along two directions simultaneously (e.g., a lateral direction such as the x-direction along x-axis and in an axial direction such as the z-direction along the z-axis shown in FIG. 9) along the trajectory while an ultrasonic transducer device detects photoacoustic signals along the plane (e.g., x-z plane) from the specimen induced by one or more ultraviolet pulses from the UV laser. In addition or alternatively, the ultrasonic transducer device can be moved relative to the specimen.

At operation 950, a surface curve of the specimen is extracted using time-of-flight data from the photoacoustic signals detected during the first 2D contoured scan and updated contour compensation steps (e.g., z-motor steps) are calculated for the subsequent contoured scan using the extracted surface curve.

At operation 960, the 3D contoured scanner is incremented by a step and an additional contoured scan is performed with contour compensation based on the updated contour compensation steps. Due to step size between adjacent 2D contoured scans typically being small (e.g., y step of, for example, 0.625 µm), each contour trajectory (e.g., z-motor trajectory) is set to follow the surface profile from the previous 2D contoured scan.

At operation 970, it is determined whether all the planes of the specimen have been scanned in the field-of-view. If all the planes have not been scanned in the field-of-view being imaged, the method returns to operation 960.

If all the planes have been scanned in the field-of-view, the method extracts a surface curve for the current contoured scan and performs an image reconstruction process to form one or more grayscale UV-PAM images (operation 980). To reconstruct the UV-PAM grayscale images, the photoacoustic amplitude of each A-line signal (signal at each scanning position) of each two-dimensional contoured scan may be calculated after the Hilbert transform. The pulse energy measurements taken by a photodiode (e.g., photodiode 130 in FIG. 1 or photodiode 230 in FIG. 2) may be used to normalize the photoacoustic amplitude and compensate for laser pulse fluctuation in the UV laser pulses from the UV laser (e.g., UV laser 110 in FIG. 1 or UV laser 210 in FIG. 2). The axial position (e.g. z-position in scan 921 in FIG. 9) of the specimen surface is calculated by detecting the peak of the A-line signal after the Hilbert transform. Each UV-PAM grayscale image is a 2D MAP (maximum amplitude projection) image that is self-normalized. Since the photoacoustic amplitude of the contrast is proportional to its absorption cross-section, it may be used to effectively differentiate cell nuclei, cytoplasm, and the background. The cell nuclei have the largest absorption coefficient at 266 nm and the highest PA signals.

To reconstruct a UV-PAM image, the photoacoustic amplitude of each A-line signal (signal at each scanning position) of each two-dimensional contoured scan may be calculated after the Hilbert transform. The pulse energy measurements taken by the photodiode may be used to normalize the photoacoustic amplitude and compensate for laser pulse fluctuation in the UV laser pulses from UV laser. The axial position (e.g. z-position in scan 921 in FIG. 9) of the specimen surface is calculated by detecting the peak of the A-line signal after the Hilbert transform. Each UV-PAM grayscale image is a 2D MAP (maximum amplitude projection) image that is self-normalized. A 3D profile image (e.g., 3D profile image in FIG. 13D) may be generated using the calculated axial positions (e.g., z-axis positions) relative to the focal plane.

Optionally (denoted by dashed line), at operation 990, a trained neural network may be used in a deep learning virtual staining process to convert the one or more UV-PAM grayscale images into pseudocolor virtually stained histology images. Examples of deep learning virtual staining methods are described in Section IV.

VI. Demonstrations of UV-PAM Systems and Methods

The UV-PAM systems described herein (e.g., UV-PAM system 100 illustrated in FIG. 1 and UV-PAM system 200 illustrated in FIG. 2) may be used in reflection mode to image unprocessed thick specimens with rough surfaces (e.g., bone specimens) for, e.g., intraoperative evaluation. UV-PAM system 200 in FIG. 2 was used to generate UV-PAM images of unprocessed thick bone specimens (>1 cm) with rough surfaces. The UV-PAM images of both undecalcified and decalcified bone specimens acquired by UV-PAM system 200 were acquired and compared with gold-standard hematoxylin and eosin (H&E) images. In addition, a UV-PAM method including an unsupervised deep learning virtual staining process based on cycle-consistent generative adversarial networks (CycleGANS) was used to convert grayscale UV-PAM images into pseudocolor H&E-like histology images, which provide the pathologist with complementary contrast and help interpret PAM images. The pseudocolor virtually stained images may also allow pathologists the possibility of identifying cancerous features according to existing pattern-recognition rules. The unsupervised deep learning virtual staining process based on cycle-consistent generative adversarial networks (CycleGANS) does not require coupled pairs of stained and unstained images, avoiding the need for well-aligned UV-PAM and H&E-stained images for neural network training, which can be challenging to acquire due to artifacts caused by sample preparation-induced morphology changes. Since the label-free (i.e., free of physical H&E staining) photoacoustic (PA) histology enabled by UV-PAM techniques avoid the need for certain tissue processing (e.g., decalcification and sectioning) and H&E staining, these techniques provide the possibility for rapid intraoperative diagnoses of unprocessed specimens, which may improve orthopedic oncology surgery.

Unprocessed Bone Specimens

To demonstrate UV-PAM imaging of unprocessed thick bone specimens, mineralized primary bone samples were extracted from patients in tumor resection surgeries and immediately fixed in formalin solution after surgical excision to prevent degradation. No further cutting or sectioning was implemented with the bone specimen, avoiding the need for paraffin or agarose embedding. The bone specimens were placed onto water-immersed sample holder 282 in UV-PAM system 200 (shown in FIG. 2) for 3D contour scanning. The left tibia bone specimens were taken from a patient with osteofibrous dysplasia-like adamantinoma, which has a rough surface due to the surgical excision by an oscillating saw. The image acquired by 2D raster scanning without contour compensation (e.g., seed B-scan) shows a large portion of the out of-focus area within the FOV, resulting in an inconsistent resolution and poor image quality. The rough bone surface profile can be reconstructed by the time-of-flight information of photoacoustic signals, revealing a large fluctuation in surface height. In contrast, the UV-PAM image acquired by 3D contour scanning of the same area showed a significantly improved image quality and consistent resolution across the FOV. For the validation of bone photoacoustic histology, the UV-PAM images of decalcified bone specimens were compared with gold-standard H&E images by a traditional optical microscope. The decalcified bone specimen extracted from a patient with metastatic adenocarcinoma was imaged using the UV-PAM and compared with its corresponding H&E image. The UV-PAM image shows almost identical features to the H&E-stained image, in which abnormal tumor glands are readily observable. To match traditional histology images, virtual H&E staining was performed on the grayscale PAM images using a CycleGAN-based deep learning method.

The bone specimens used for UV-PAM imaging were procured from larger specimens in a pathology laboratory, surgically removed from patients. All bone specimens were fixed in 10% buffered formalin prior to any other procedures. For thick undecalcified specimens, the bone specimens were mounted to the sample holder 282 of UV-PAM 200 for imaging without further processing. To decalcify specimens, the bone specimens were treated with decalcifying solution containing chelating agents in dilute HCl, while the treatment time varied depending on the size and hardness of the specimens. After fixation and decalcification, the specimen was embedded in paraffin wax, sectioned into 5-micron thick slices, and placed on glass slides. Specimens with less calcification were sectioned without calcification. These slices were then processed with standard H&E staining and cover-slipped. The H&E-stained slides were imaged using either the standard optical microscope or the digital whole slide scanning using Leica Aperio AT2 with a 40× objective.

Figure 13A:
FIG. 13A is an example image of the undecalcified left tibia bone specimen acquired by 2D raster scanning without contour compensation.
Figure 13B:
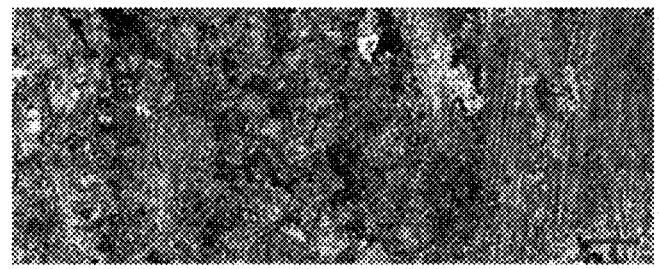
FIG. 13B is an example image of the undecalcified left tibia bone specimen acquired by 3D contour scanning by 3D contour-scanning, according to some embodiments.
Figure 13C:
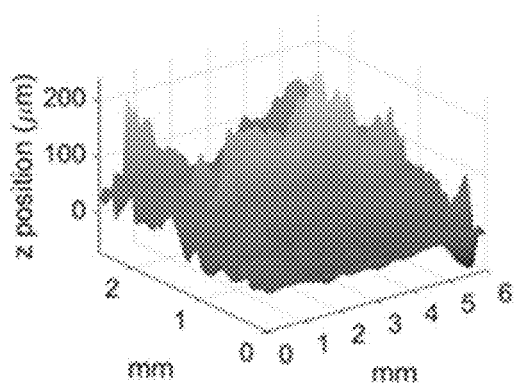
FIG. 13C is a 3D plot of an example of a scanning profile acquired by 2D raster scanning.
Figure 13D:
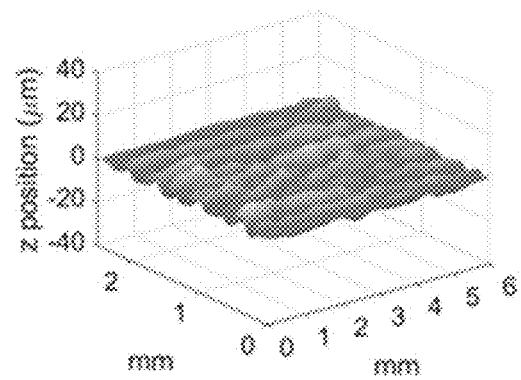
FIG. 13D is a 3D plot of an example of a scanning profile acquired by 3D contour-scanning, according to some embodiments.
Figure 13E:
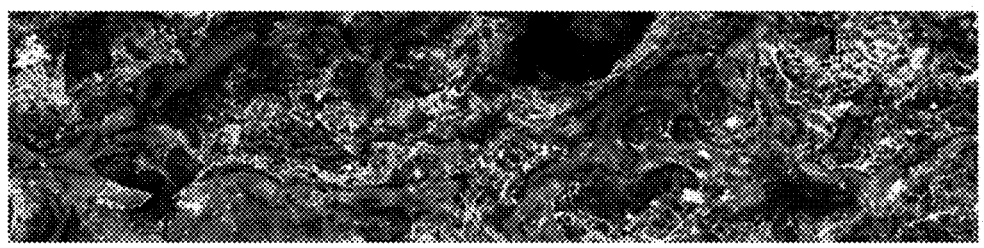
FIG. 13E is an example image of a normal unprocessed thick bone sample acquired by 2D raster scanning without contour compensation.
Figure 13F:
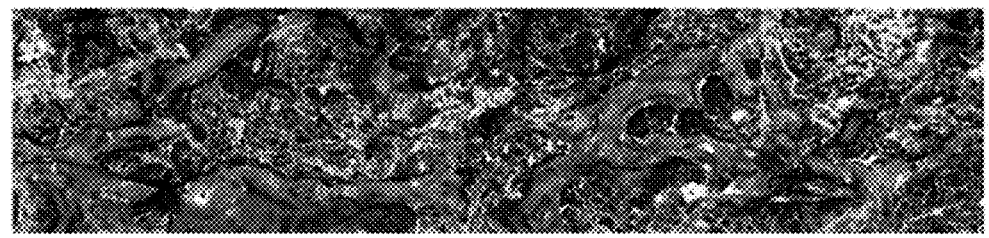
FIG. 13F is an example image of a normal unprocessed thick bone sample acquired by 3D contour scanning, according to some embodiments.

FIG. 13A is an image of the undecalcified left tibia bone specimen acquired by 2D raster scanning without contour compensation. FIG. 13B is an image of the undecalcified left tibia bone specimen acquired by 3D contour scanning by 3D contour-scanning UV-PAM 200. The axial direction relative to the optical focal plane for the contoured scanning profile are calculated by the time-of-flight information of the photoacoustic signal. In comparison with the image in FIG. 13A, the image in FIG. 13B shows an improved image quality by 3D contoured scanning of the undecalcified bone specimen with a rough surface. The image in FIG. 13A acquired by 2D raster scanning without contour compensation shows a large portion of the out-of-focus area within the FOV (2.5×6.25 mm$^2$), resulting in less consistent resolution and lesser image quality. FIG. 13C is 3D plot of an example of a scanning profile acquired by 2D raster scanning. FIG. 13D is 3D plot of an example of a scanning profile acquired by 3D contour-scanning. The rough bone surface profile in FIG. 13C, shows a large fluctuation in surface height and less than 10% of the pixels within the DOF. In contrast, the UV-PAM image acquired by the 3D contour scanning of the same area showed significantly improved image quality and consistent resolution across the FOV with less fluctuation in surface height as shown in FIG. 13D. More than 92% of the surface area in FIG. 13D is within the small DOF during the 3D contour scanning. The specimen surface position in the axial direction relative to the optical focal plane is calculated by the time-of-flight information of the photoacoustic signal. Another comparison between the 2D raster-scanning image and 3D contour-scanning image of unprocessed patient bone can be found in FIGS. 13E and 13F. FIG. 13E is an image of the normal unprocessed thick bone sample acquired by 2D raster scanning without contour compensation. FIG. 13F is an image of normal unprocessed thick bone sample acquired by 3D contour scanning. As shown in FIG. 13F, important bone structures, such as trabeculae and marrow, can be visualized by UV-PAM with specimen integrity.

Figure 14A:
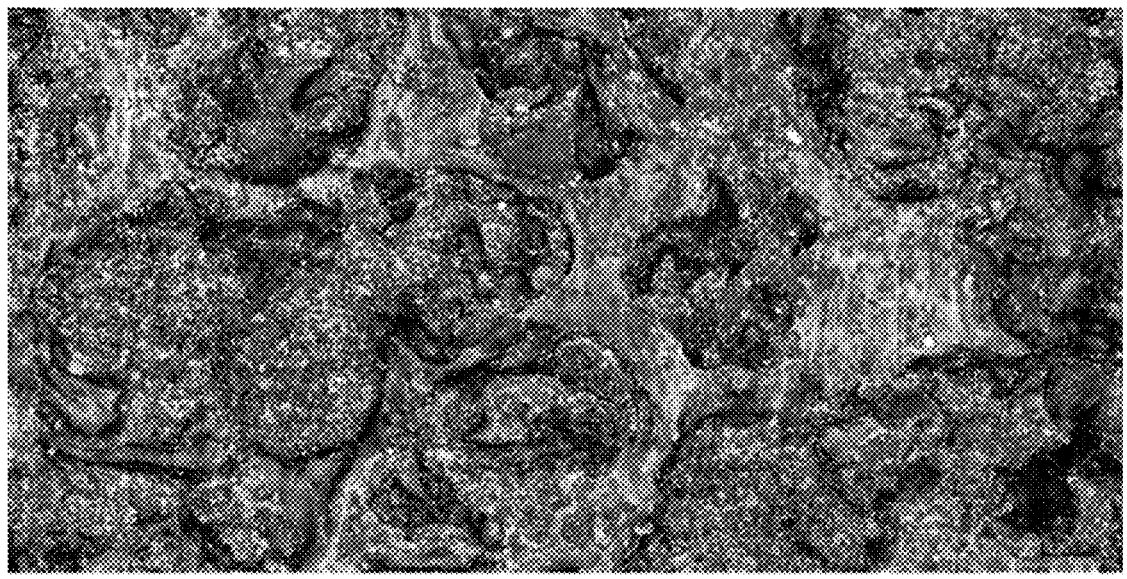
FIG. 14A is an example image of the undecalcified thick bone specimen from a normal area acquired by 3D contour scanning using 3D contour-scanning UV-PAM system, according to some embodiments.
Figure 14B:
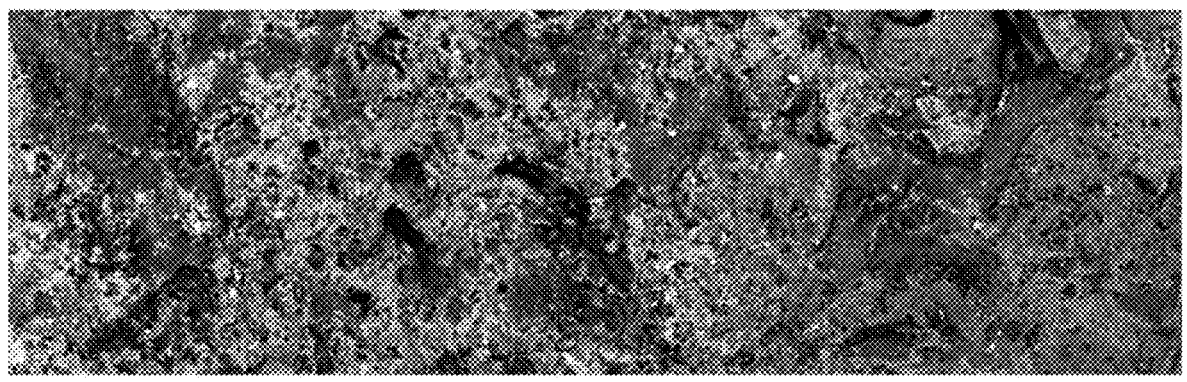
FIG. 14B is an example image of the undecalcified thick bone specimen with an area with metastasized cancer acquired by 3D contour scanning using 3D contour-scanning UV-PAM system, according to some embodiments.

FIG. 14A is an image of the undecalcified thick bone specimen from a normal area acquired by 3D contour scanning using 3D contour-scanning UV-PAM 200. FIG. 14B is an image of the undecalcified thick bone specimen with an area with metastasized cancer acquired by 3D contour scanning using 3D contour-scanning UV-PAM 200.

By comparing the images of the rough surfaces of unprocessed thick bone specimens acquired by raster scanning with the images acquired by 3D contour scanning, the images with have higher quality. Since 3D contour scanning UV-PAM imaging is nondestructive, the unprocessed bone specimens may also be used for further pathological diagnosis.

Label-Free UV-PAM of Decalcified and Undecalcified Bone Specimens

Figure 15:
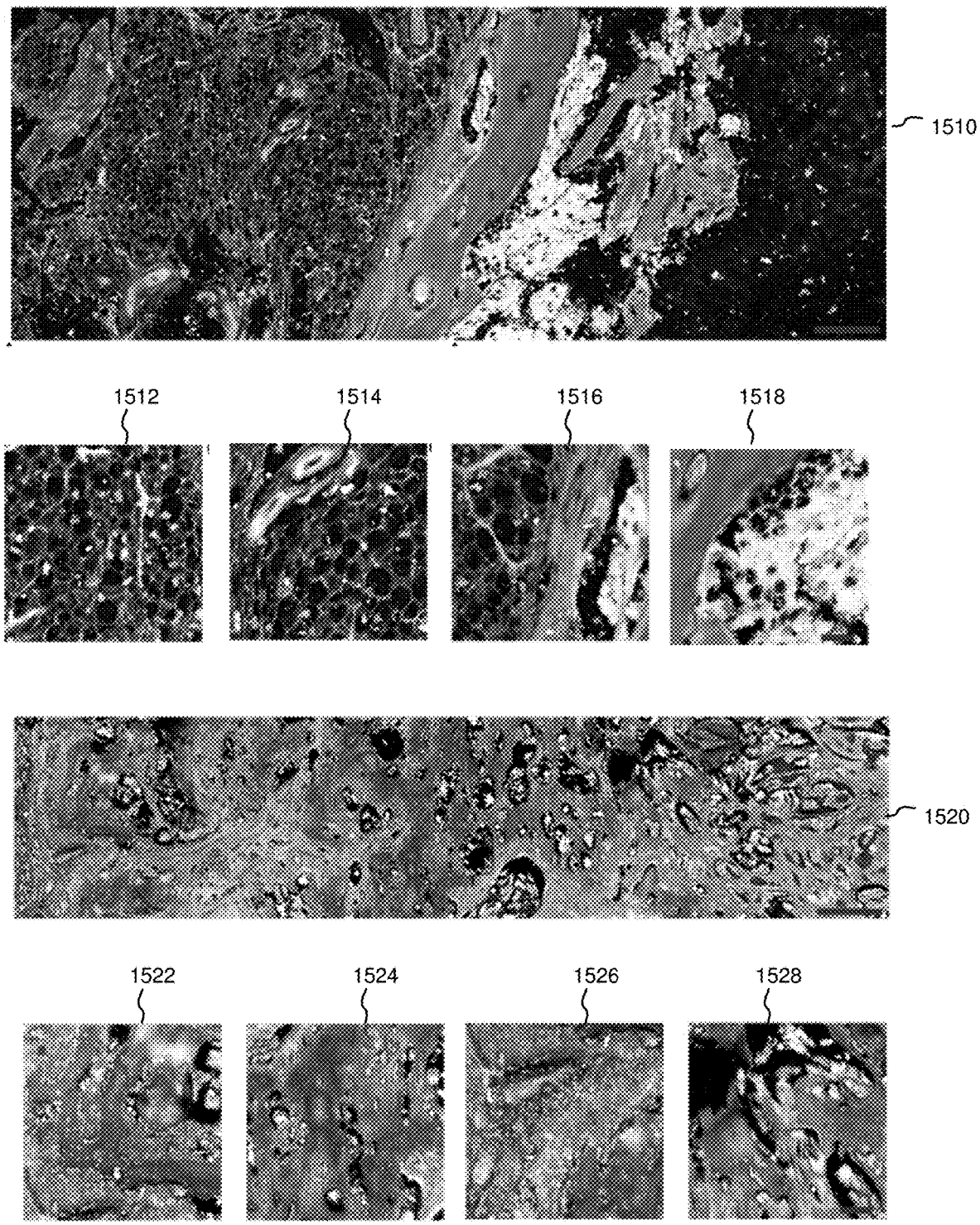
FIG. 15 depicts example images of decalcified bone specimens acquired by 3D contour scanning using 3D contour-scanning UV-PAM system, according to some embodiments.

Since the traditional H&E image of bone usually requires decalcification and cutting into thin sections (e.g., 5-8 μm), 3D contour UV-PAM imaging of a formalin-fixed paraffin-embedded (FFPE) decalcified bone fragment without malignancy on a glass slide was acquired. FIG. 15 depicts example images of decalcified bone specimens acquired by 3D contour scanning using 3D contour-scanning UV-PAM system, according to some embodiments. The images include an image 1510 of the decalcified normal bone fragment without malignancy with scale bar of 500 μm, a closeup image 1512 of marrow cells, with the fatty color in black, a closeup image 1514 showing a vessel in the upper left-hand corner, a closeup image 1516, a closeup image 1518 showing osteoid in the left upper corner, an image 1520 of the FFPE decalcified bone specimen with metastatic poorly differentiated adenocarcinoma of pulmonary origin, a closeup image 1522, a closeup image 1524, a closeup image 1526, and a closeup image 1528. As shown in image 1510, obvious bone structures like mineralized bone can be readily visualized. Close-up images 1512, 1514, 1516, and 1518 reveal clear differentiation of cell nuclei and cytoplasm and the morphology of the bony structure. Close-up images 1522, 1524, 1526, and 1528 show well-differentiated cell nuclei.

Figure 16:
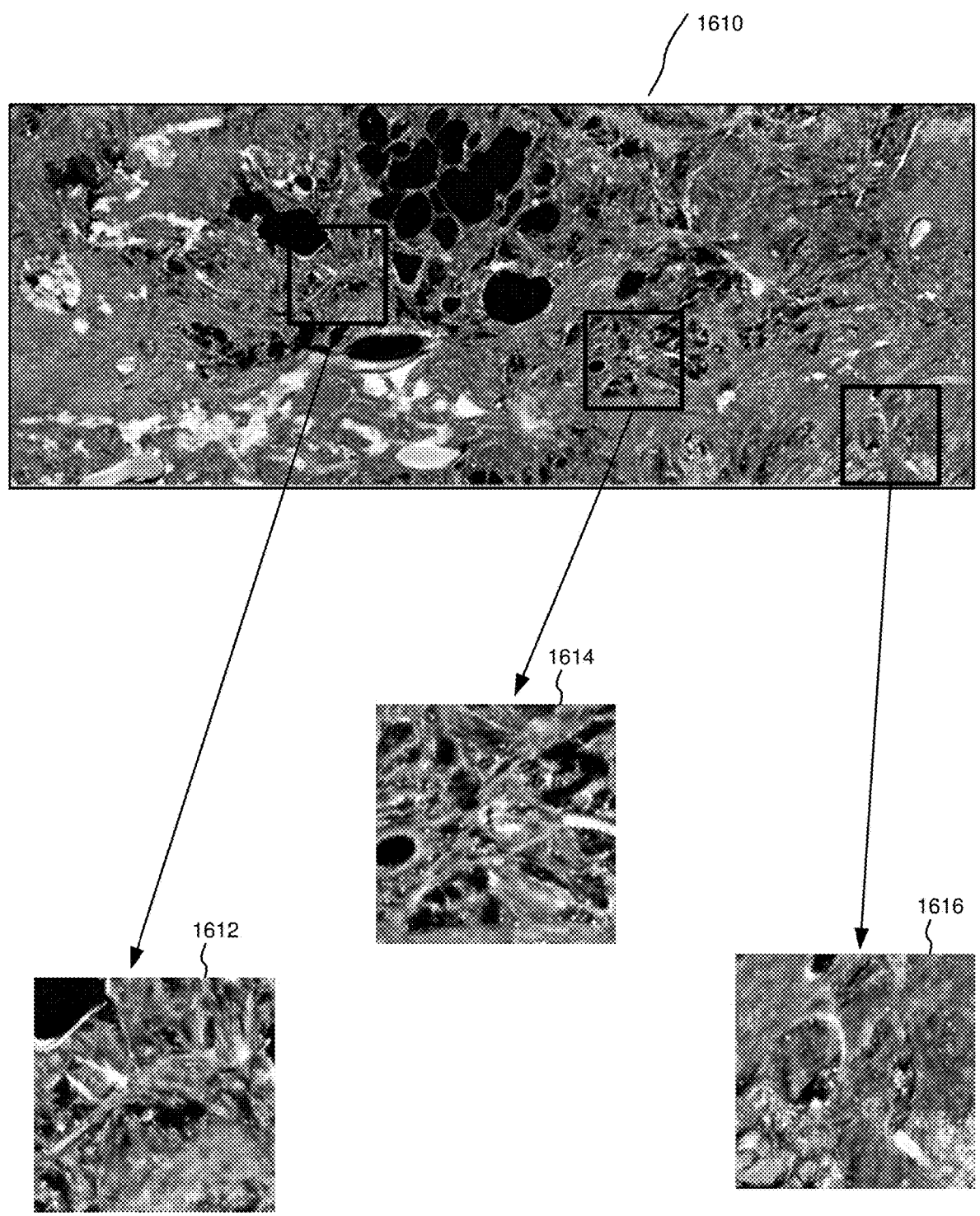
FIG. 16 depicts additional example images of the decalcified bone specimens acquired by 3D contour scanning using 3D contour-scanning UV-PAM system, according to some embodiments.

The decalcified bone specimen from the patient with chondroblastic osteosarcoma is also imaged by UV-PAM and shown in FIG. 16. FIG. 16 depicts additional example images of decalcified bone specimens acquired by 3D contour scanning using 3D contour-scanning UV-PAM system, according to some embodiments. The images include an image 1610 of an undecalcified thick bone specimen with an area with metastasized cancer and close-up images 1612, 1614, and 1616 where the scale bar is 100 μm.

UV-PAM images of both decalcified and undecalcified bone specimens were compared with gold-standard H&E images acquired by a traditional optical microscope. The contrast of some of these UV-PAM images is reversed to highlight the high absorption region in dark color for better comparison with H&E images. FIGS. 17A and 17B are examples of images to show a comparison between the original grayscale image and the image in reversed contrast. FIG. 17A is an example UV-PAM image of a decalcified bone specimen from a patient with moderately differentiated metastatic pulmonary adenocarcinomain in the original grayscale contrast. FIG. 17B is another example of the UV-PAM image of the decalcified bone specimen of FIG. 17A in reversed grayscale contrast.

Figure 18A:
FIG. 18A is an example 3D contour-scanning UV-PAM image in reversed grayscale contrast of a decalcified bone specimen extracted from a patient with metastatic adenocarcinoma, according to some embodiments.
Figure 18B:
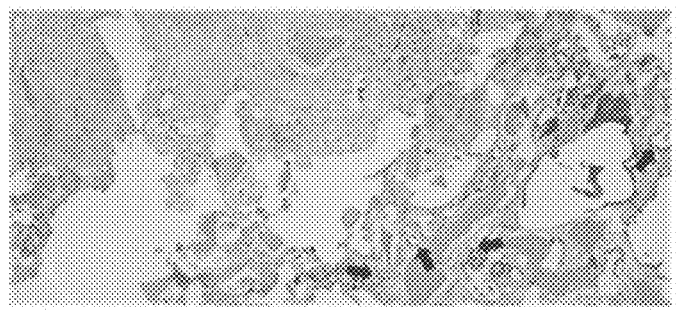
FIG. 18B is an example H&E image corresponding to the UV-PAM image of FIG. 18A.
Figure 18C:
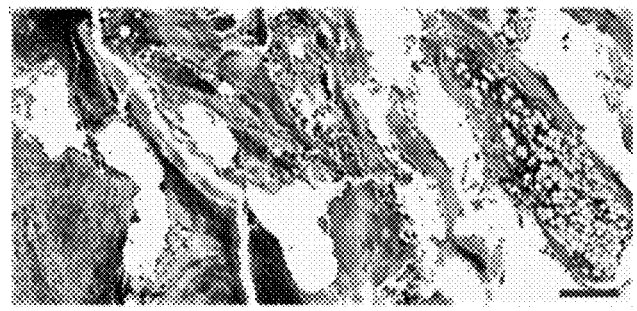
FIG. 18C is an example 3D contour-scanning UV-PAM image in reversed grayscale contrast of the decalcified bone specimen of FIG. 18B with normal bone fragment and hematopoietic marrow, according to some embodiments.
Figure 18D:
FIG. 18D is an example H&E image corresponding to the UV-PAM image of FIG. 18B.

The decalcified bone specimen extracted from a patient with metastatic adenocarcinoma was imaged by 3D contour scanning using UV-PAM system 200 from FIG. 2 and compared with its corresponding H&E images. FIG. 18A is an example 3D contour-scanning UV-PAM image in reversed grayscale contrast of a decalcified bone specimen extracted from a patient with metastatic adenocarcinoma, according to some embodiments. FIG. 18C is an example 3D contour-scanning UV-PAM image in reversed grayscale contrast of the decalcified bone specimen of FIG. 18A with normal bone fragment and hematopoietic marrow, according to some embodiments. FIG. 18B is an example H&E image corresponding to the UV-PAM image of FIG. 18A. FIG. 18D is an example H&E image corresponding to the UV-PAM image of FIG. 18B. The UV-PAM image in FIG. 18A shows nearly identical features to the corresponding H&E-stained image in FIG. 18B, in which abnormal tumor glands are readily observable (indicated by arrows). The UV-PAM image in FIG. 18C of a decalcified fragments of bone and hematopoietic marrow with no evidence of metastatic carcinoma also shows the same structure as its corresponding H&E image in FIG. 18D. Furthermore, the undecalcified bone slices were imaged by UV-PAM techniques, which may avoid potential artifacts introduced by the decalcification procedures. Since these specimens were harvested from a portion of the tumor with low calcification, they did not require the decalcification procedure to section the specimen into thin slices.

Figure 19A:
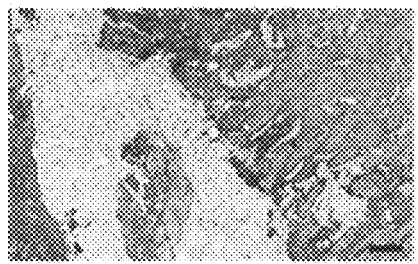
FIG. 19A is an example 3D contour-scanning UV-PAM image in reversed grayscale contrast of an undecalcified bone specimen, according to some embodiments.
Figure 19B:
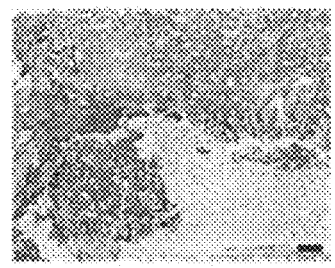
FIG. 19B is another example 3D contour-scanning UV-PAM image in reversed grayscale contrast of the undecalcified bone specimen of FIG. 19A, according to some embodiments.
Figure 19C:
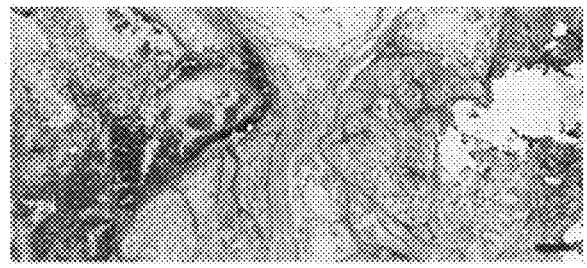
FIG. 19C is another example 3D contour-scanning UV-PAM image in reversed grayscale contrast of the undecalcified bone specimen of FIG. 19A.
Figure 19D:
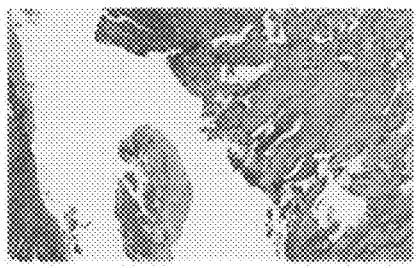
FIG. 19D is an example H&E image corresponding to the UV-PAM image of FIG. 19A.
Figure 19E:
FIG. 19E is an example H&E image corresponding to the UV-PAM image of FIG. 19B.
Figure 19F:
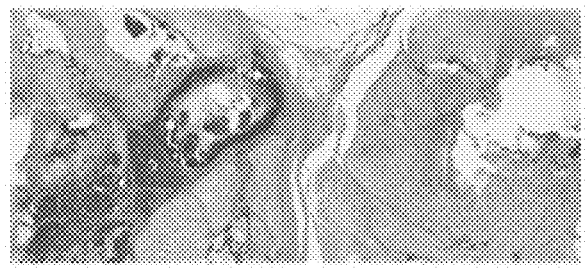
FIG. 19F is an example H&E image corresponding to the UV-PAM image of FIG. 19C.

FIG. 19A is an example 3D contour-scanning UV-PAM image in reversed grayscale contrast of an undecalcified bone specimen, according to some embodiments. FIG. 19B is another example 3D contour-scanning UV-PAM image in reversed grayscale contrast of the undecalcified bone specimen of FIG. 19A, according to some embodiments. FIG. 19C is another example 3D contour-scanning UV-PAM image in reversed grayscale contrast of the undecalcified bone specimen of FIG. 19A. FIG. 19D is an example H&E image corresponding to the UV-PAM image of FIG. 19A. FIG. 19E is an example H&E image corresponding to the UV-PAM image of FIG. 19B. FIG. 19F is an example H&E image corresponding to the UV-PAM image of FIG. 19C. The corresponding H&E images were acquired by a digital whole slide scanning microscope with a 40× objective. The H&E images show nearly identical structures as the UV-PAM images.

Figure 20:
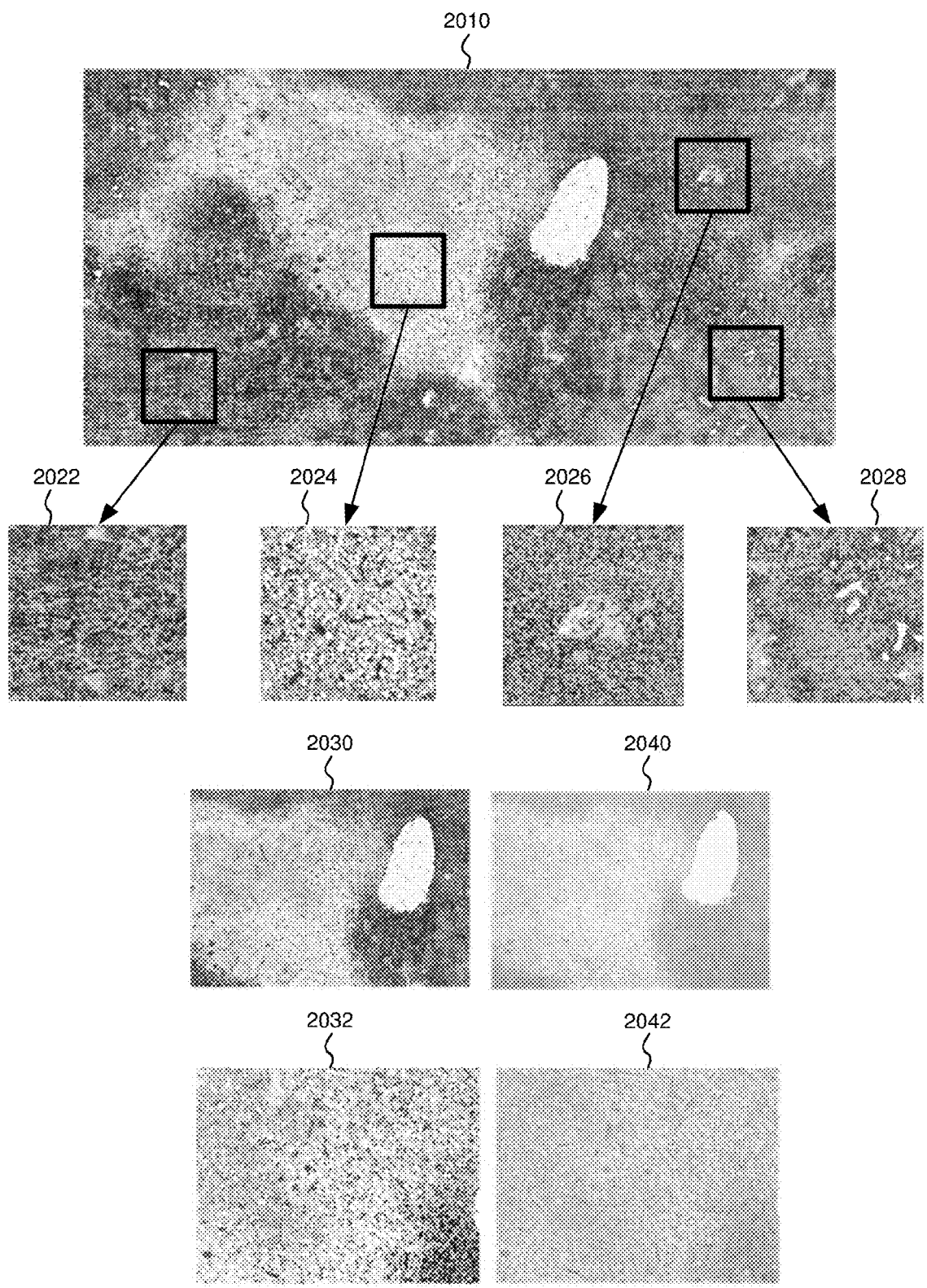
FIG. 20 depicts example images of decalcified bone slice with high-grade osteosarcoma from the femur acquired by 3D contour scanning using 3D contour-scanning UV-PAM system, according to some embodiments, and some corresponding H&E close-up images.

FIG. 20 depicts example images of a decalcified bone slice with high-grade osteosarcoma from a femur acquired by 3D contour scanning using 3D contour-scanning UV-PAM system according to some embodiments, and corresponding H&E close up images. The images include a 3D contour-scanning image 2210 of the decalcified bone slice with high-grade osteosarcoma from a femur, a closeup 3D contour-scanning image 2222 showing the necrotic tumor, closeup 3D contour-scanning images 2224, 2226, and 2228 showing the viable tumor, closeup 3D contour-scanning images 2030, 2032, and closeup H&E images 2240 and 2242 corresponding to closeup 3D contour-scanning images 2030 and 2032.

UV-PAM with Virtual Staining Using Deep Learning

To reconstruct the UV-PAM images, the photoacoustic (PA) amplitude of each A-line signal is calculated after the Hilbert transform. The pulse energy measured by the photodiode may be used to normalize the PA amplitude and compensate for laser pulse fluctuation. The axial position of the specimen surface may be calculated by detecting the peak of the A-line signal after the Hilbert transform. The 2D MAP (maximal amplitude projection) image was self-normalized. Since PA amplitude of the contrast is proportional to its absorption cross-section, the UV-PAM image may be used to potentially differentiate cell nuclei, cytoplasm, and the background. The cell nuclei have the largest absorption coefficient at 266 nm and the highest PA signals. After constructing the one or more grayscale images, a trained neural network may be used to perform virtual H&E staining to form corresponding one or more virtually stained color images.

A cycle-consistent GAN (CycleGAN) architecture may be used, which can learn how to map images from the UV-PAM domain, PA, to the H&E domain, HE, without the need for well-aligned image pairs. An adversarial loss may be used to learn the transformation G: PA→HE, such that the images G(PA) are indistinguishable from HE. To ensure the UV-PAM images are of the same structures, the inverse transformation F: HE→PA may also be learned and a cycle consistency loss may be used to give F(G(PA))»PA and G(F(HE))»HE. The generators are residual networks consisting of an input convolutional layer, two convolutional layer and downsampling blocks, nine residual network blocks, two convolutional and upsampling blocks, and finally, an output convolutional layer. For the discriminator, in some embodiments, a GAN can be used including one or more convolutional layers and one or more downsampling layers, which classify whether the image is real on overlapping pixel image patches (e.g., 70×70 patch size). This patch size is a compromise between promoting high spatial frequency fidelity and avoiding tiling artifacts. The network parameters may be updated and optimized by minimizing one or more losses, e.g., the least-squares adversarial loss and/or the cycle consistency loss.

The training dataset consisted of UV-PAM images of undecalcified bone specimens. These images were converted into 17940 and 26565 286×286 pixel image patches for UV-PAM and H&E histology, respectively. During training, these were further randomly cropped to 256×256 for data augmentation. The training may be performed with the Adam solver with a batch size of 4 and an initial learning rate of 0.0002, decaying to zero over 100 epochs. Once trained, the generator G can be used to transform UV-PAM data in overlapping 256×256 pixel image patches, which were recombined with linear blending.

To match traditional histology images, virtual H&E staining on the grayscale UV-PAM images using a cycle-consistent GAN based deep learning method was performed to generate virtually H&E-stained color UV-PAM images. The virtual staining GAN network architecture implemented is shown in FIG. 4. Details of the procedures for generating virtually H&E-stained PAM images from grayscale UV-PAM images are described in Section IV.

Figure 21:
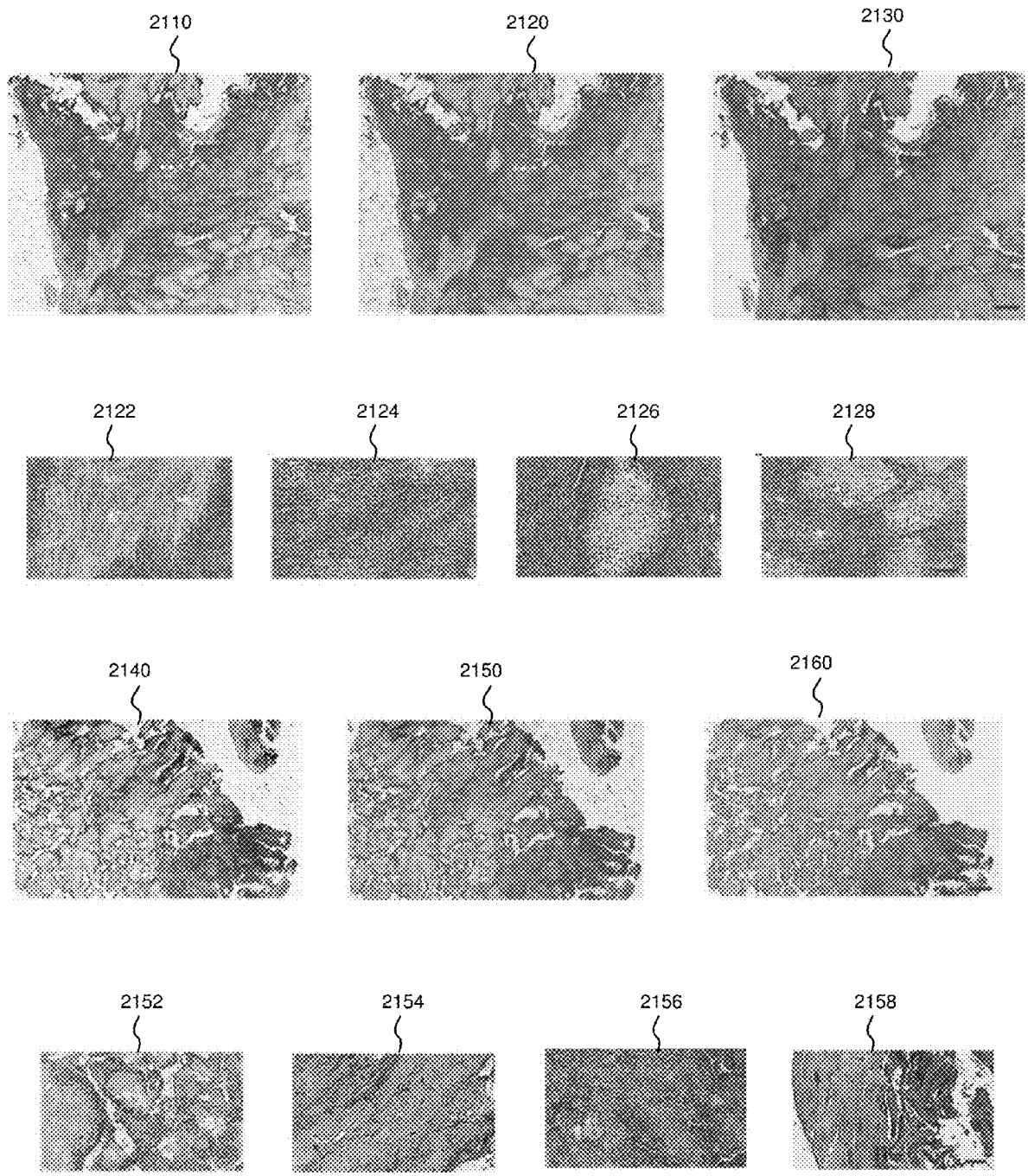
FIG. 21 depicts example 3D contour scanning UV-PAM grayscale images and corresponding virtually stained color UV-PAM images according to some embodiments, and also H&E images of an undecalcified bone fragment specimen, according to some embodiments.

FIG. 21 depicts example 3D contour scanning UV-PAM grayscale images and corresponding virtually stained color (i.e. pseudocolor including one or more colors) UV-PAM images (e.g., histology-like images) according to some embodiments, and also H&E images of an undecalcified bone fragment specimen, according to some embodiments. The depicted images include 3D contour scanning UV-PAM grayscale images 2110 and 2140 of an undecalcified bone specimen, virtually-stained color UV-PAM images 2120 and 2150 corresponding to UV-PAM grayscale images 2110 and 2140, and H&E stained images 2130 and 2160 corresponding to the virtually-stained color UV-PAM images 2120 and 2150 with scale bar 500 μm. The depicted images also include closeup virtually-stained color UV-PAM images 2122, 2124, 2126, and 2128 of virtually-stained color UV-PAM image 2120 with scale bar 100 μm. The depicted images also include closeup virtually-stained color UV-PAM images 2152, 2154, 2156, and 2158 of virtually-stained color UV-PAM image 2150 with scale bar 100 μm. The virtually-stained color UV-PAM images 2130 and 2160 show differentiation of the cytoplasm and the cell nuclei similar to the corresponding H&E images 2130 and 2160. The closeup virtually-stained color UV-PAM images 2122, 2124, 2126, 2128, 2152, 2154, 2156, and 2158 show pathological features that may be used for intraoperative diagnosis of bone tumor.

The development of 3D contour-scanning UV-PAM in reflection mode provides the possibility for rapid pathological examination of bone specimens since it avoids excessive specimen preparation. In contrast, traditional pathological examination techniques for bone involve time-consuming decalcification procedures, and the frozen section technique is not applicable. With the bone mineral as its major component, dense cortical bones can take days to decalcify before it is soft enough to be sectioned into thin slices, which prevents rapid intraoperative diagnosis. Currently, orthopedic surgeons rely heavily on pre-operative CT scans or MRI to identify the bony edge of resection. But these imaging modalities cannot provide accurate diagnosis and intraoperative confirmation of tumor margins. Reflection-mode contour-scanning UV-PAM techniques may provide label-free imaging of unprocessed thick bone samples with rough surfaces, which may provide detailed information for pathological diagnosis and may provide the possibility to identify the tumor margin rapidly, for intraoperative margin analysis.

To diagnose using gold standard H&E histological images, pathologists may examine the morphology and structural distribution of cell nuclei, cytoplasm, and extracellular matrix. H&E staining provides contrast between cell nuclei and cytoplasmic parts by staining them in different colors. Thus, pathologists are trained to use color images of stained tissue samples, which show extracellular matrix and cytoplasm in pink and cell nuclei in blue/purple. At the UV wavelength of 266 nm36, the cell nuclei have a much higher absorption coefficient and PA amplitudes than the extracellular matrix and cytoplasm, allowing the virtual labeling in different colors like H&E staining. The grayscale UV-PAM images were processed and the pseudocolor (one or more colors) for virtual H&E staining was generated by applying the deep learning approach with cycle-consistent GAN, which does not need well-aligned UV-PAM and H&E image pairs for neural network training. The virtually stained pseudocolor UV-PAM images showed abundant detail of cell nuclei and cytoplasm, matching the corresponding H&E images.

In one embodiment, a UV-PAM technique may employ photoacoustic tomography (PAT) to detect either endogenous or exogenous contrast-induced ultrasound signals through light absorption. Wavelength-dependent absorption may allow for quantitative measurements of the concentration and distribution of different optical absorbers, while the less scattering ultrasound detection enables high-resolution deep tissue imaging. The unique advantage of scalable spatial resolutions and imaging depths makes this implementation useful for various applications, ranging from imaging of nanometer-scale mitochondria to millimeter-level blood vessels in deep tissue. Based on the imaging resolution and reconstruction approaches, PAT can be implemented in the UV-PAM techniques.

Although certain examples of UV-PAM techniques are described as employing UV illumination of certain wavelengths, the 3D contour scanning process may be implemented with illumination of other wavelengths according to other embodiments. For example, the UV-PAM system 100 may include an illumination source emitting a different wavelength to excite the specimen. Depending on the illumination wavelength, various contrasts may be imaged using these implementations, including but not limited to hemoglobin, DNA/RNA, cytochrome, water, lipid, and protein.

In one embodiment, UV-PAM techniques implement the nonlinear absorption or Grüneisen parameter.

In one embodiment, the UV-PAM system employs a pulsed 266 nm laser with a pulse repetition rate of up to 50 kHz. In one embodiment, pulse repetition rates of higher than 50 kHz are used and the UV-PAM system includes a one-dimensional galvanometer mirror to improve the speed of optical scanning.

In one embodiment, multichannel parallel imaging can be implemented by a UV-PAM system to improve imaging speed by implementing multiple focal spots and an ultrasound transducer array for image reconstruction. For instance, a microlens array can be utilized to create multiple focal spots for multichannel parallel imaging, may improve the imaging speed of UV-PAM.

In one embodiment, a UV-PAM system may include an electrically tunable lens (ETL) may for faster optical focus shifting with high accuracy. Since the acoustical DOF of the focused ultrasonic transducer is often much longer (i.e., hundreds of microns) than the optical DOF, the optical focus shifting within the acoustic DOF can be used to compensate for the steep height fluctuation, while the time-dependent gain compensation technique can be used to compensate for the transducer sensitivity difference within the acoustic DOF.

In one embodiment, a UV-PAM system may include a light source for emitting one or more non-diffracting beams. A non-diffracting beam may have an extended optical DOF with reduced side lobes. With the extended optical DOF of the one or more non-diffracting beams, the UV-PAM system may have a large tolerance for height fluctuations.

Although many examples are described herein with respect to imaging bone tissues, it would be understood that other biological tissues and other types of specimen may be imaged using UV-PAM techniques.

Modifications, additions, or omissions may be made to any of the above-described implementations without departing from the scope of the disclosure. Any of the implementations described above may include more, fewer, or other features without departing from the scope of the disclosure. Additionally, the steps of described features may be performed in any suitable order without departing from the scope of the disclosure. Also, one or more features from any implementation may be combined with one or more features of any other implementation without departing from the scope of the disclosure. The components of any implementation may be integrated or separated according to particular needs without departing from the scope of the disclosure.

It should be understood that certain aspects described above can be implemented in the form of logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code using any suitable computer language and/or computational software such as, for example, Java, C, C#, C++ or Python, LabVIEW, Mathematica, or other suitable language/computational software, including low level code, including code written for field programmable gate arrays, for example in VHDL. The code may include software libraries for functions like data acquisition and control, motion control, image acquisition and display, etc. Some or all of the code may also run on a personal computer, single board computer, embedded controller, microcontroller, digital signal processor, field programmable gate array and/or any combination thereof or any similar computation device and/or logic device(s). The software code may be stored as a series of instructions, or commands on a CRM such as a random access memory (RAM), a read only memory (ROM), a magnetic medium such as a hard-drive or a floppy disk, or an optical medium such as a CD-ROM, or solid stage storage such as a solid state hard drive or removable flash memory device or any suitable storage device. Any such CRM may reside on or within a single computational apparatus, and may be present on or within different computational apparatuses within a system or network. Although the foregoing disclosed implementations have been described in some detail to facilitate understanding, the described implementations are to be considered illustrative and not limiting. It will be apparent to one of ordinary skill in the art that certain changes and modifications can be practiced within the scope of the appended claims.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain implementations herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or implementations of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

What is claimed is:

1. A method for virtually staining a photoacoustic histology image, the method comprising:
   generating a virtually stained histology image using a first generative adversarial network trained to predict, from the photoacoustic histology image, the virtually stained histology image having a characteristic of hematoxylin and eosin staining;
   wherein the first generative adversarial network has been trained by:
   inputting a training photoacoustic histology image to a first generator configured to generate a first predicted image having a characteristic of hematoxylin and eosin staining;
   inputting the first predicted image to a second generator of a second generative adversarial network, the second generator configured to generate a second predicted image having a characteristic of photoacoustic imaging; and
   based on an error associated with the training photoacoustic histology image and the second predicted image, updating one or both of the first generator or the second generator.

2. The method of claim 1, wherein the generating of the virtually stained histology image having the characteristic of hematoxylin and eosin staining is performed in 5 seconds or less.

3. The method of claim 1, further comprising recovering the photoacoustic histology image using a second generative adversarial network trained to predict, from the predicted virtually stained histology image, a histology image having a characteristic of the photoacoustic histology image.

4. The method of claim 3, wherein the first generative adversarial network and the second generative adversarial network are trained to operate as a cycle-consistent generative adversarial network configured such that the photoacoustic histology image input to the first generative adversarial network matches the predicted histology image having the characteristic of the photoacoustic histology image predicted by the second generative adversarial network.

5. The method of claim 3, wherein the second generative adversarial network is further trained to generate, from a hematoxylin and eosin staining image, a predicted photoacoustic histology image having a characteristic of photoacoustic histology.

6. The method of claim 4, wherein the first generative adversarial network is further trained to recover the hematoxylin and eosin staining image by predicting, from the predicted photoacoustic histology image, a second stained histology image having a characteristic of hematoxylin and eosin staining.

7. The method of claim 1, wherein:
the first generative adversarial network comprises the first generator and a corresponding first adversarial discriminator;
using the first generative adversarial network to predict the virtually stained histology image comprises using the first generator to predict the virtually stained histology image; and
the first adversarial discriminator comprises a classifier trained to output a determination that the predicted virtually stained histology image is real or fake.

8. The method of claim 7, wherein:
the first generator comprises one or more first layers of the first generative adversarial network, the one or more first layers including one or more first convolutional layers, one or more first downsampling layers, one or more first upsampling layers, or a combination thereof;
the first adversarial discriminator comprises one or more second layers of the first generative adversarial network, the one or more second layers including one or more convolutional layers, one or more downsampling layers, or a combination thereof; and
the output of the determination by the first adversarial discriminator is based on the one or more second layers.

9. A method for generating virtual histology images, the method comprising:
using a first generator of a first generative adversarial network to generate a virtually stained histology image having a characteristic of hematoxylin and eosin staining, the first generator trained to generate the virtually stained histology image based on an input of a photoacoustic histology image;
wherein the first generator is trained by:
inputting a training photoacoustic histology image to the first generator, wherein the training photoacoustic histology image comprises a real image or a fake image;
predicting an output image having the characteristic of hematoxylin and eosin staining;
obtaining an initial metric value ranging from 1 to 0, the initial metric value representative of a likelihood that the predicted output image is real or fake generated by a first adversarial discriminator corresponding to the first generator; and
updating the first generator such that a subsequent metric value generated by the first adversarial discriminator is closer to 0.5 than the initial metric value.

10. The method of claim 9, further comprising recovering the photoacoustic histology image by using a second generator of a second generative adversarial network, the second generator trained to predict, based on an input of the virtually stained histology image, a histology image having a characteristic of the photoacoustic histology image.

11. The method of claim 10, wherein the first generative adversarial network and the second generative adversarial network are trained to operate as a cycle-consistent generative adversarial network configured such that the photoacoustic histology image input to the first generator matches the predicted histology image having the characteristic of the photoacoustic histology image predicted by the second generator.

12. The method of claim 10, wherein the second generator is trained to generate, from a hematoxylin and eosin stained image, a predicted photoacoustic histology image having a characteristic of photoacoustic histology.

13. The method of claim 12, wherein the first generator is further trained to recover the hematoxylin and eosin stained image by predicting, from the predicted photoacoustic histology image, a second virtually stained histology image having a characteristic of hematoxylin and eosin staining.

14. A method for generating virtual histology images, the method comprising:
using a first generator of a first generative adversarial network to generate a virtually stained histology image having a characteristic of hematoxylin and eosin staining, the first generator trained to predict the virtually stained histology image based on an input of a photoacoustic histology image;
wherein:
the first generator comprises one or more first layers of the first generative adversarial network, the one or more first layers including one or more first convolutional layers, one or more first downsampling layers, one or more first upsampling layers, or a combination thereof;
a first adversarial discriminator corresponding to the first generator comprises one or more second layers of the first generative adversarial network, the one or more second layers including one or more convolutional layers, one or more downsampling layers, or a combination thereof; and
the first adversarial discriminator is trained to output a determination that the predicted virtually stained histology image is real or fake based on the one or more second layers.

15. A method for virtually staining a photoacoustic histology image, the method comprising:
generating a virtually stained histology image using a first generative adversarial network trained to predict, from the photoacoustic histology image, the virtually stained histology image having a characteristic of hematoxylin and eosin staining;
wherein:
the first generative adversarial network comprises a first generator and a corresponding first adversarial discriminator;
using the first generative adversarial network to predict the virtually stained histology image comprises using the first generator to predict the virtually stained histology image;
the first adversarial discriminator comprises a classifier trained to output a determination that the predicted virtually stained histology image is real or fake;
the first generator comprises one or more first layers of the first generative adversarial network, the one or more first layers including one or more first convolutional layers, one or more first downsampling layers, one or more first upsampling layers, or a combination thereof;
the first adversarial discriminator comprises one or more second layers of the first generative adversarial network, the one or more second layers including one or more convolutional layers, one or more downsampling layers, or a combination thereof; and
the output of the determination by the first adversarial discriminator is based on the one or more second layers.

* * * * *